United States Patent [19]

Besore et al.

[11] 4,221,176
[45] Sep. 9, 1980

[54] PROFILE STITCHING APPARATUS AND METHOD

[75] Inventors: Calvin H. Besore, Mount Airy, N.C.; Charles J. Wampler, deceased, late of Mount Airy, N.C., by Rebecca R. Wampler, administratrix

[73] Assignee: Quality Mills, Inc., Mount Airy, N.C.

[21] Appl. No.: 924,692

[22] Filed: Jul. 14, 1978

[51] Int. Cl.$^2$ .............................................. D05B 21/00
[52] U.S. Cl. ............................................. 112/121.12
[58] Field of Search ................. 112/121.12, 121.11, 112/275, 277, 102; 318/567, 569

[56] References Cited
U.S. PATENT DOCUMENTS

| | | | |
|---|---|---|---|
| 3,970,016 | 7/1976 | Yanikoski | 112/121.12 |
| 4,050,393 | 9/1977 | Welcher et al. | 112/121.12 |
| 4,051,794 | 10/1977 | Herzer et al. | 112/121.12 |

Primary Examiner—Peter P. Nerbun
Attorney, Agent, or Firm—B. B. Olive

[57] ABSTRACT

A program controlled stitching apparatus and method suitable for embroidery operations, and the like, is provided. The typical Jacquard card pin reader, Jacquard mechanism and the two-dimensional pantograph found in conventional embroidery machines are eliminated. A digital motion control replaces the Jacquard mechanism and a high precision X-Y motion table replaces the conventional pantograph. A minicomputer controls both X-Y motions and sewing mechanisms. A unique program control is employed with the minicomputer providing improved means for detecting stitch faults, thread breaks and accommodating to a wide range of pattern variations and operational situations.

75 Claims, 71 Drawing Figures

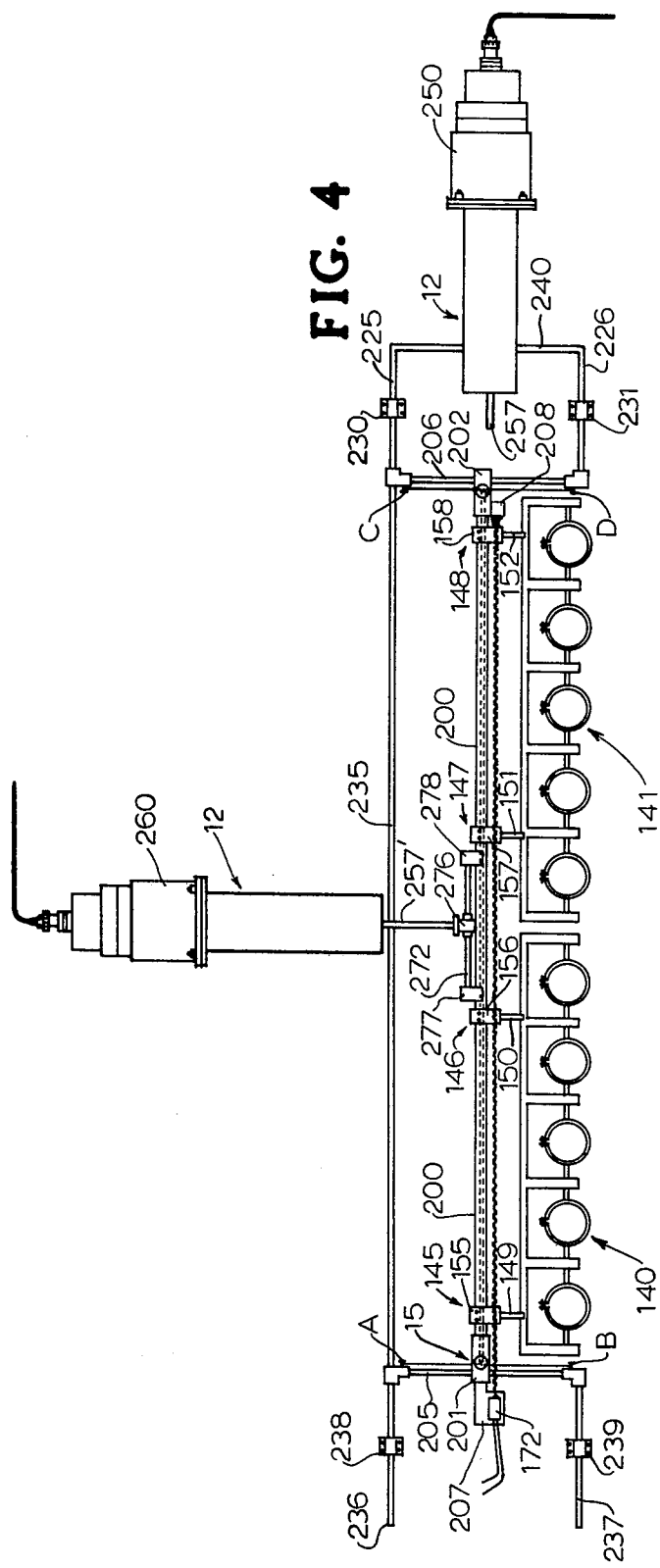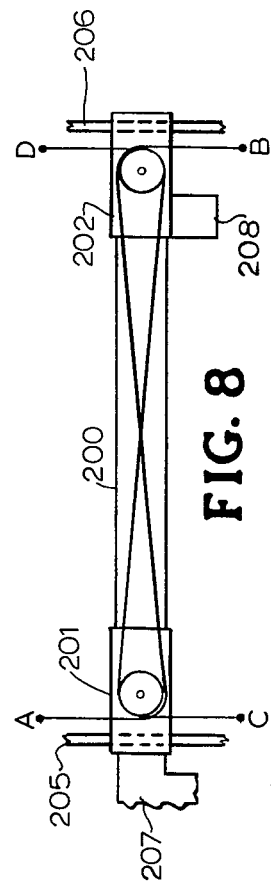

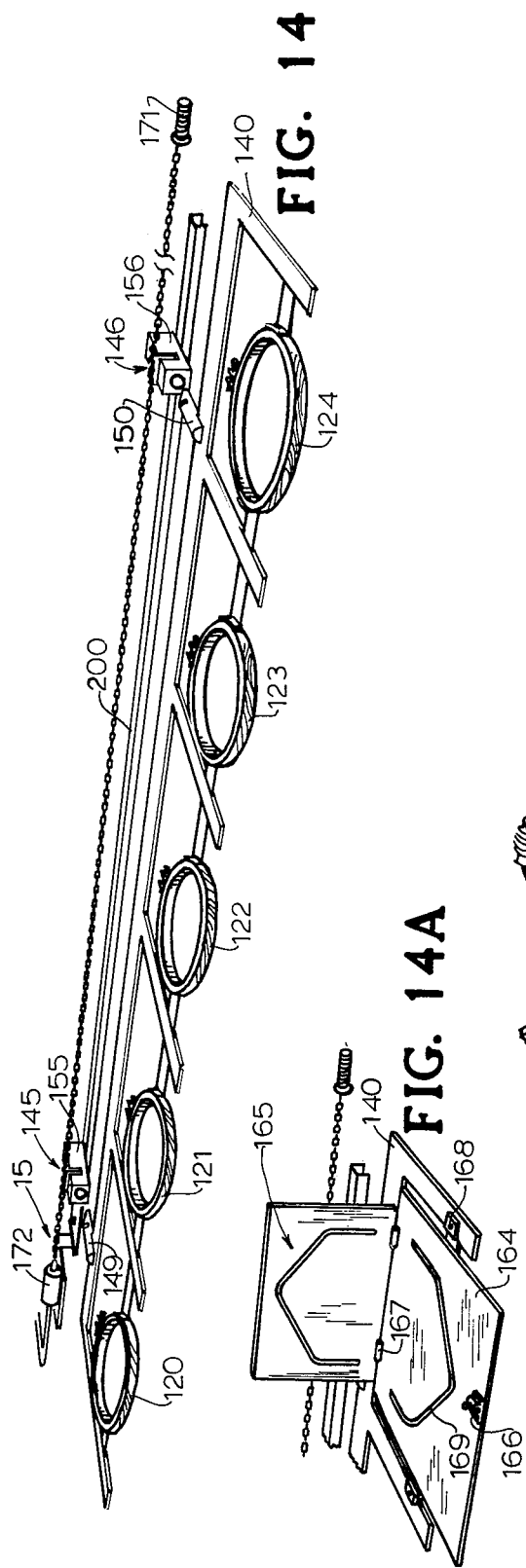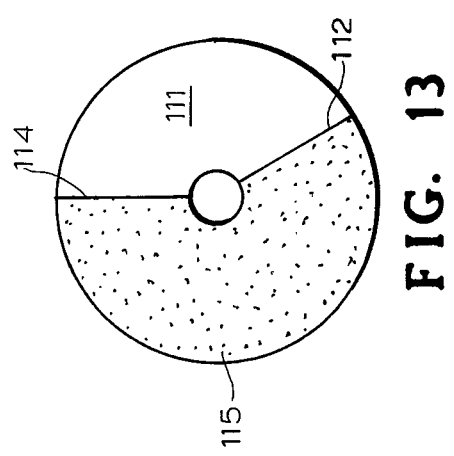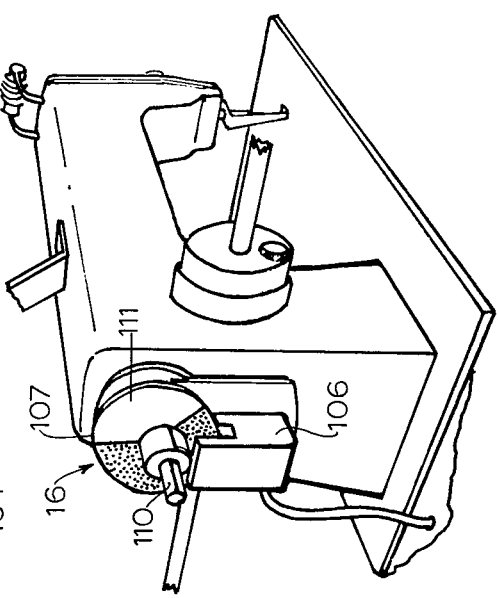

FLOW CHARTING SYMBOLS

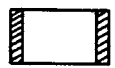 PREDEFINED ROUTINE WHICH EXECUTES STATEMENT CONTAINED WITHIN THE BLOCK.

 PROCESS STEP.

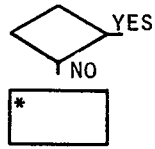 DECISION - TWO WAYS: DIRECTION INDICATED BY YES, NO ANSWERS TO QUESTION WITHIN FIGURE.

 EXPLANATORY COMMENT INCLUDED FOR CLARITY.

 CONNECTOR SHOWING OPERATION SEQUENCE OR DIRECTION OF DATA FLOW.

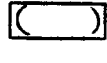 INTERRUPT SIGNAL GENERATED BY A SPECIAL DEVICE, USUALLY EXTERNAL TO THE COMPUTER.

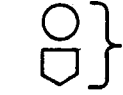 CONNECTORS, USUALLY ON PAGE AND OFF PAGE IN THAT ORDER. CONNECTION IS TO ANOTHER CONNECTOR WITH SAME DESCRIPTOR IN THE FIGURE.

 INTERRUPT CONTROL INTERCHANGE - EXECUTION OF ROUTINE PROGRAM IS HALTED WHILE INTERRUPTING DEVICE IS SERVICED.

 SUBROUTINE

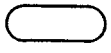 SUBPROGRAM LABEL

FIG. 18

EXAMPLE OF MACHINE COMMAND NESTED IN STITCH DATA

FIG. 19

```
       ACTUAL   PROGRAM
         X         Y
         |         |
         |         |
         |         |
       0100      7700
       7700      0100
       4777      0003  ←——— STITCH PRECEEDING ARROW IS BEING
       4020      0001        EXECUTED. DATA PAIR AT ARROW IS
       0070      0010        READ.
```

SELECTED RESERVE STORAGE LOCATION LEGENDS

| | |
|---|---|
| SRPT | N |
| SCYCLE | NCNT |
| REGISTER A | CT1 |
| REGISTER B | C30 |
| CT5 | C31 |
| SAVX | TX MOVE |
| SAVY | TY MOVE |

REPRESENTATIVE PROGRAM CONSTANTS, INDICATORS AND LABELS

CONSTANTS INITIATED AS ZERO:

| | |
|---|---|
| MASK 13 | B1 THROUGH B3 |
| SRPT | AC |
| SCYCLE | FLAGS |
| CYCLE | CLKCT |
| TEST 1 THROUGH TEST 7 | C18 |
| TEST 9 THROUGH TEST 13 | CT5 |
| SAVX | SAVY |

CONSTANTS INITIATED WITH SPECIFIC VALUES:

| | | |
|---|---|---|
| STITCH = 4002 | LBL22 = 1700 | MASK 16 = 1 |
| C2 = 3001 | BEG = 0200 | MASK 31 = 1 |
| C4 = 4000 | CC1 = 3764 | MASK 32 = 1 |
| C11 = 3760 | C16 = 7775 | MASK 33 = 1 |
| TEST = 1 | C6 = 7000 | NCNT = 7771 |
| TEST 8 = 1 | C27 = 3776 | C12 = 3764 |
| C3 = 3000 | MASK 15 = 1 | C14 = 7774 |

PROGRAM LABELS:

| | | | | |
|---|---|---|---|---|
| TIME | SERNUP | SERSTP | HOLD 2 | MOD |
| SERINP | SERNDN | BACKUP | SERCLK | START |
| SERTRD | SERSTR | HOLD | EXIT | MCOM |

FIG. 18A

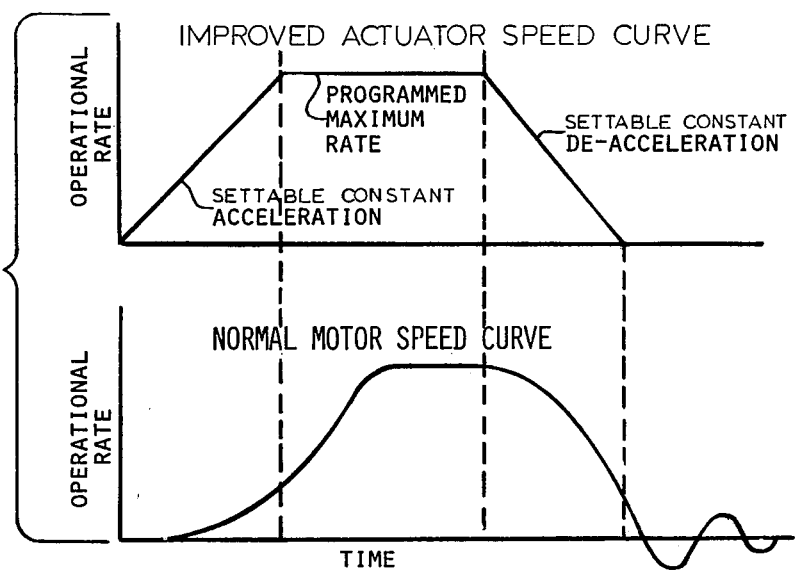
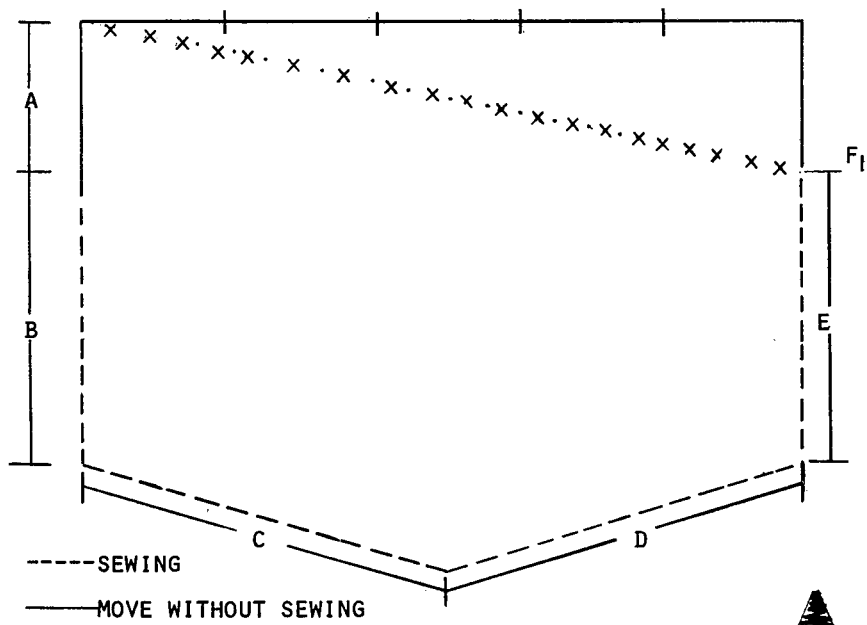
FIG. 21
FIG. 22
----- SEWING
——— MOVE WITHOUT SEWING
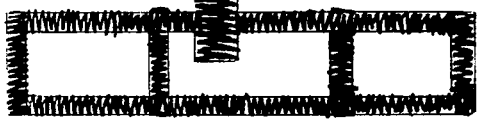
FIG. 23

LEGEND: DSU-DEVICE SELECTOR (UNITS); DST-DEVICE SELECTOR (TENS); FD-FUNCTION DECODER; NENF-NEEDLE ENTER FLAG; IEF-INTERRUPT ENABLE FLAG; NEXF-NEEDLE EXIT FLAG; SFF-STITCH FAULT FLAG; FRCF-FEED RATE CONTROL FLAG; SSF-STOP SIGNAL FLAG; INTR-RQST INTERRUPT REQUEST LINE

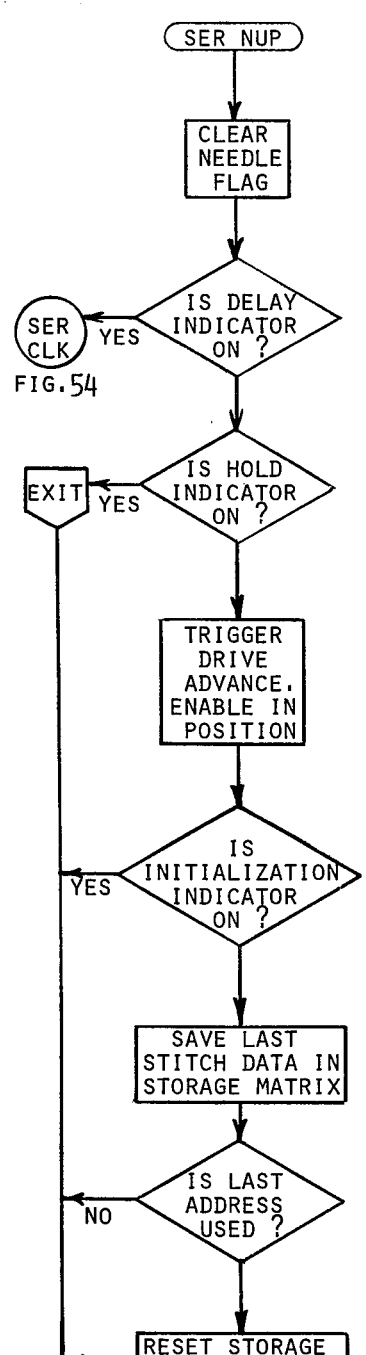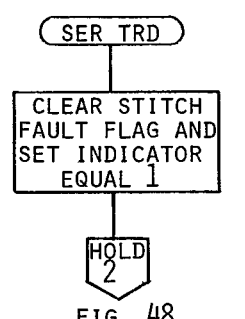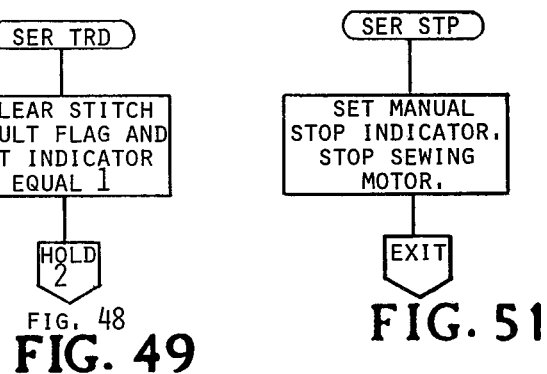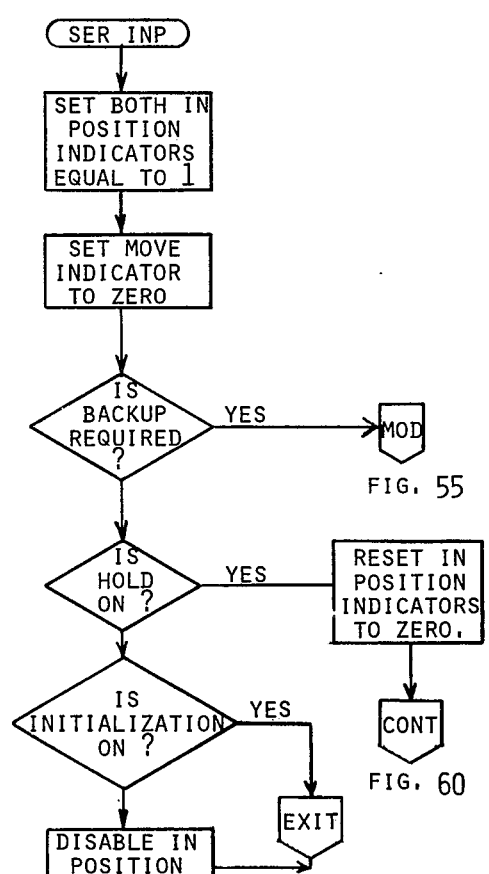
FIG. 48  FIG. 49  FIG. 51  FIG. 50  FIG. 52

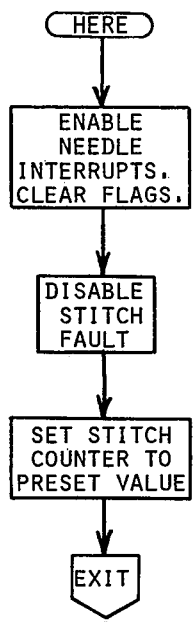
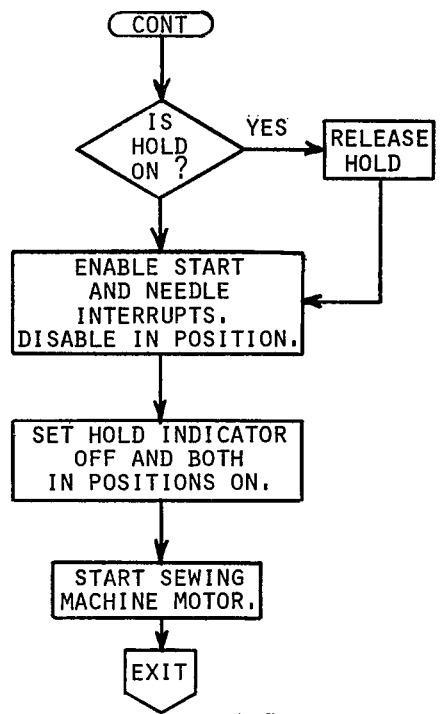
FIG. 59
FIG. 60
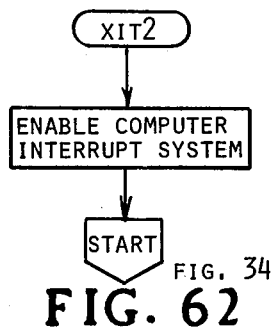
FIG. 62
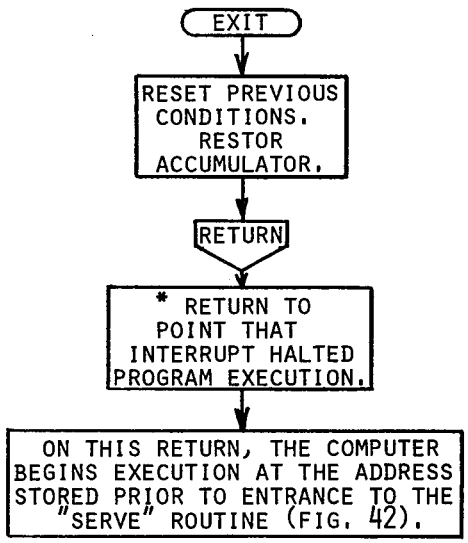
FIG. 61
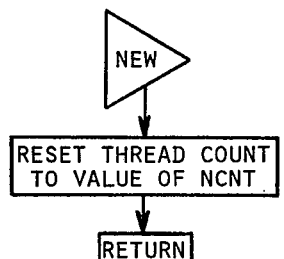
FIG. 63

PROFILE STITCHING APPARATUS AND METHOD

BACKGROUND OF THE INVENTION

1. Field of the Invention

The apparatus and method of the invention are directed to profile stitching such as found in embroidery operations, and the like, and more specifically to program controlled stitching apparatus and methods.

2. Description of the Prior Art

Present embroidery machines may be thought of as comprising five basic components. Such components include a pattern reader, a mechanical motion mechanism, a motion table, connecting devices including a synchronizing device and a stop motion and, finally, the sewing heads. The typical pattern reader is a slow and mechanically unstable pin reader. The mechanical motion mechanism is typically a Jacquard motion mechanism which limits operational speed to about 400 strokes per minute which effectively eliminates incentive operations on a majority of designs. Furthermore, such design inherently causes adjustments to affect the stitch length which results in varying performance from machine to machine. It is also to be noted that the mechanics of the typical Jacquard motion mechanism inherently requires nearly instantaneous acceleration of the pantograph which, in turn, places severe strain on the thread. Other deficiencies of conventional embroidery machines are found in the motion table, i.e., the pantograph, which exhibits varying motions end to end and which increase as the motion table wears from use. Furthermore, as the motion table wears, a lag develops in its ability to reverse and no adjustment is available.

Another deficiency to be found in the conventional embroidery equipment relates to synchronization which with the conventional Jacquard amounts to a trial and error technique resulting in additional down time when repairs are needed. The conventional synchronizing device is typically a mechanical cam on the main shaft of one of the sewing machines. Positioning is, thus, highly restrictive since the shaft-gear machine connection is required to be made through the machine heads. The drag of this mechanism, in turn, requires a jog mechanism to raise the needle to true dead center or at least clear of the fabric on command to stop. The conventional stop motions also exhibit frequent failures which result in either extensive repair or unrepairable garments when threaded breaks occur.

From the foregoing description of the so-called "Gross" and similar machines, it can be seen that there is a need to replace the slot and mechanically unstable pin reader and to provide an embroidery mechanism capable of functioning at higher speeds and with a substantial increase in average time to failure. Further, the capability of self-repairing embroidery and in-house pattern making would be desirable features in an improved embroidery mechanism. Also to be desired is a control mechanism which would allow controlled acceleration and deceleration of the motion table and with improved means for synchronization of the extent and speed of table motion with the sewing head needle speed and position.

Programmable and reprogrammable memory devices have also been used with other types of automatic embroidery machines and sewing apparatus. U.S. Pat. Nos. 3,385,244 and 3,385,245 illustrate the prior art practice of utilizing magnetic tape for pattern storage and reading. U.S. Pat. Nos. 3,872,808; 3,982,491; 3,986,466; 4,051,794 and 4,074,642 illustrate use of solid state memory with program controlled stitching mechanisms. With these more recent developments, there is still a requirement for some better form of electrical drive to replace the mechanical linkages of the older Jacquard-type readers. For example, it may be noted that in U.S. Pat. Nos. 3,385,244 and 3,385,245 an open loop stepping motor arrangement is employed which has many disadvantages, both with respect to the open loop character as well as with respect to use of stepping motors.

A common characteristic of both the old as well as the more recent pattern stitching apparatus is that such apparatus reads and reacts sequentially to pattern data only. It would obviously be more desirable to have the apparatus adapted to react non-sequentially as well in order to react to non-stitching responses such as thread breaks, incomplete X-Y motions, repair needs, power failure, and the like. It would also be desirable for the stitching apparatus not to be limited to special purpose applications and to provide, for maintenance purposes, program routines and mechanism for checking proper operation and locating sources of improper operations and causes of defects. These last-mentioned features have been noticeably lacking in the most advanced known prior art.

In any garment sewing operation involving profile stitching considerable time is involved in placing and removing the work. Prior art multiple head machines have recognized this problem by providing work frames which can be removed and loaded while a sewing cycle is in operation. On single head machines, means have been provided to cause the work holder to open at the end of the cycle but the work holder remains captive to the motion. Sometimes it is not desirable to release the sewn fabric. Therefore, it would be desirable, particularly for multiple head machines, to have a pattern controlled release independent of any particular point in the cycle to fit a variety of sewing conditions.

Another aspect of the prior art of interest to the invention concerns the relation of the table motion to the motion of the needle. In one type of prior art apparatus, the X-Y table is always in motion and this type of apparatus allows for deflection of the needle or the fabric or both since the fabric is in motion during the time of entry of the needle in the fabric. Such needle deflection inherently requires very heavy fabric clamping mechanisms to avoid fabric shifting during stitching. In another type of prior art apparatus, it is known to command X and Y motions when the needle is out of the fabric and this type apparatus therefore theoretically should not subject the needle or the fabric to bending or distortion. However, in the more advanced program controlled prior art profile stitching apparatus stepping motors are employed and no means is provided to insure that X and Y motions are completed prior to needle entrance. Therefore, the same needle deflection and fabric distortion can occur at the terminal part of the X-Y motion. As exemplified in U.S. Pat. No. 3,982,491 (see column 11), an attempt has previously been made to approximate a kind of protection to prevent needle deflection and fabric distortion by imposing severe limitations on maximum stitch length. With the foregoing in mind, it would be desirable to provide a program controlled stitching apparatus designed to insure that needle deflection and fabric distortion cannot occur and without such severe stitch limitations.

Other deficiencies in the prior art may also be observed. For example, since even the most modern program controlled stitching apparatus is basically equipped to read only pattern data and a very limited set of basic machine controls, the translation of the stored pattern data and the machine responses are obtained by handwired electrical circuitry. Therefore, a control pulse must and can only follow a pre-wired path and must provoke a predetermined response established by a wired circuit. Prior to the present invention, there has been no known program controlled stitching apparatus having means for receiving single or plural control pulses, analyzing with stored program logic the relation between such pulses and other operating conditions and using computer control rather than the pulse or pulses to determine the response. For example, the type of automatic sewing machine described in U.S. Pat. No. 4,051,794 requires the workpiece movement to be triggered directly with the needle signal and also requires in each stitch instruction a sew, no-sew command. Such a totally synchronized operation is characteristic of the most advanced known prior art automatic sewing mechanism. Yet, this type of operation imposes many undesirable limitations.

Note may also be taken here of prior art examples of machines which can physically read dimensions of a workpiece or of a drawing of the workpiece and convert such data into stitch coordinates. U.S. Pat. Nos. 4,073,247 and 4,074,642 illustrate this type of operation. While the systems described in these patents utilize a computer architecture or solid logic to translate signals to their positioning drive systems, the systems of these patents continue to exhibit the sequential use of memory as previously mentioned. The systems in these patents also read and react to pattern data only. The systems of such patents also continue the prior art practice of using any control pulses from the sewing apparatus directly to initiate the next stitch cycle. The elimination of all of these prior art limitations, i.e., sequential use of memory, reading and reacting to pattern data only, and using control pulses to initiate the next stitch cycle, constitutes one of the objects of the present invention.

The prior art automatic sewing mechanisms have also been limited because of being dependent on digital responding motors, i.e., stepping motors. For reasons which will become apparent as the description proceeds, such stepping motors are inherently unsuited to a multi-head sewing operation under program control as contemplated by the present invention. In this regard, it can be observed that stepping motors have limited torque, especially when operating at high speeds. Therefore, when applied to control of an X-Y motion table, the motion table mass is critical and must be low. Extremely complex motion table constructions are employed to reduce such mass. While an automatic sewing mechanism such as described in U.S. Pat. No. 4,051,794 has offered an improvement in increased speed as well as improved sewing capability through the substitution of solid state digital memory for the prior art mechanical mechanisms, the dependency on stepping motors and the direct synchronization between the sewing head and the workpiece through wired electrical circuitry has remained.

The more advanced prior art automatic sewing mechanism has employed randomly addressable storage. However, such random capability has not been fully utilized. For example, the prior art automatic program control apparatus has not provided the ability to change patterns in a single memory for execution using a relatively inexpensive storage media for retention. Further, the prior art program controlled mechanisms have not allowed patterns to be modified directly in the machine for correction purposes or for development of new patterns. Additionally, to the extent the prior art program controlled apparatus has utilized memory, such memory has not been conveniently adapted for adding new machine commands as required or for modifying existing program parameters. The sequential reading characteristic of prior art mechanisms has precluded the use of any type of repair cycle or the use of a repeat instruction for data compaction. In prior art apparatus, as illustrated for example in U.S. Pat. No. 4,051,794, the machine is stopped by a thread break signal and the operator must choose either to totally rerun the pattern or allow the gap to remain. A repair cycle would obviously offer an advantage in time and material savings. Furthermore, the open loop positioning control system used in the more advanced sewing mechanism such as in U.S. Pat. No. 4,051,794 does not provide for a signal to be returned from the stepping motors to insure the obtaining of a correct position. Since stepping motors are known to at least occasionally fail to react to one or more pulses, a homing cycle and associated hardware has been necessary to insure a correct start at the beginning of a pattern. It would, of course, be desirable to eliminate the need for such a homing cycle and such becomes another purpose of the present invention.

While controlled acceleration-deceleration closed loop servo controls have been used in various machine tool control systems, it has not been known, so far as applicants are aware, to provide a program controlled stitching apparatus adapted to use of such a control and adapted to the unique conditions encountered in profile stitching. More specifically, the prior art has made no provision in stitching apparatus for use of DC digital control with controlled acceleration independently on the X and Y motions so as to cause the motion table to traverse a least time path in combination with substantially uniform thread tension as opposed to straight line hypotenuse moves traversed by stepping mechanisms of the type found in the prior art. The lack of controlled acceleration has also led to frequent thread breaks due to abrupt stresses on the thread. Program controlled sewing mechanisms of the prior art have also had limitations in stitch speed, stitch length, the ability to make repair motions, the ability to move without sewing, the ability to perform sewing operations which are not "closed" such as in pocket flap operations, and the like, and in the ability to operate with different stitch speeds in different parts of the pattern. While prior art apparatus have used memory for pattern storage and have to some extent controlled fabric motion and stitching action independently, such apparatus have not used stored logic control in the manner of the present invention to provide the ability to control speed as well as movement of the motion table in both X and Y directions, the stitch length and the sewing head speed independently and simultaneously in coordination with the pattern.

Another general observation that can be made, in the light of the many prior art deficiencies enumerated above, is that for the most part all prior art program controlled profile stitching apparatus has been directed to high volume, special purpose applications. In style conscious garment operations there is clearly a need for a program controlled profile stitching apparatus that can rapidly and inexpensively be adapted to a variety of kinds of work without severe size limitations or extensive mechanical modifications.

While other comparisons might be made with the prior art, it is believed that the foregoing is sufficient to illustrate some of the deficiencies of the conventional as well as of the more recent programmable and reprogrammable sewing devices found in the prior art. The overcoming of all such deficiencies and the providing of new features and functions now heretofore achieved constitute objects of the present invention.

SUMMARY OF THE INVENTION

A principal feature of the present invention is the provision of an automatic, multiple-head embroidery machine adapted to profile stitching operations and which through a unique computer and X-Y drive control is able to perform a number of actions unique to the art of embroidery, profile stitching, and the like. The conventional slow and mechanically unstable pin reader has been replaced in the illustrated embodiment by the invention apparatus. The invention apparatus provides the capability of self-repairing embroidery operations; elimination of repair operations due to thread breaks; simplification of repair operations, when necessary; in-house pattern programming and useful maintenance routines.

The invention system does not, as with prior art apparatus, necessarily require the machine to be turned off in the event of a thread break. Provision is made upon occurrence of a thread break to back the material to a point preceding the break and within the pattern. Various conditions can be detected to stop motion of the positioning mechanism which has less inertia than the sewing mechanism and which stop operation can be followed, when required, by stopping the sewing mechanism. These conditions include those in which the positioner mechanism has failed to reach the desired position before the needle reaches the fabric, there is a pattern termination, or there is a stitch fault. The stitch fault can be a thread break; a skip stitch, i.e., a failure to lock the stitch; or depletion of the thread supply which can be either depletion of bobbin thread or needle thread. There can also be a manual-induced operator stop which can be used to stop motion of the positioning mechanism. Further, there can be a pattern commanded stop induced by the machine command section of the pattern language, examples of which can include changing color or making an extended stitch length, e.g., an 8-inch stitch which could be beyond the capability of the positioner to move such amount during the time the needle is above the fabric. There is also a command option to vary the sewing speed to get a low sewing speed for greater X or Y movements or to bring the sewing machine to a stop and make an X or Y movement as required over a long distance and in either direction.

The mentioned minicomputer in the illustrated embodiment controls a closed loop digital motion X-Y drive system which, in turn, operates a precision motion table. A drive controller system enables the motion table to be operated under conditions of controlled, substantially constant acceleration and deceleration. This manner of operation prevents overrun, optimizes speed in relation to stitch patterns, minimizes strain on the thread, and drastically reduces the number of anticipated thread breaks in a particular pattern. Increased and program controlled machine operating speeds, improved stitching accuracy and high reproducibility of stitching patterns are thus achieved and optimized. Stitch speeds in the range of 850 to 1500 stitches per minute are obtainable and stitch lengths may range, for example, in 0.001 inch increments from $\frac{2}{3}$ inch to $\frac{1}{2}$ inch and, with variable sewing speed control, can be as much as 1½ inch or more and bi-directional.

The work holder of the invention apparatus is selectively released by program control at the end of a job. This allows the operator to quickly remove a work holder with finished work and substitute another work holder fabric to be stitched and which can be prepared during the time the previous work is being stitched. Other features of the invention include the ability to move one machine out of a line of machines without affecting the operation of the remaining machines. This feature is achieved primarily through employment of a unique optical sensing machanism for detecting stitch faults which does not depend on the presence of all the sewing heads in the set. Unique limit switches are provided and are adapted to accommodate to various shapes of work holders and to protect against excess X or Y motions. Patterns can be modified or corrected on the machine. Also, the pattern for a copy of a new embroidery pattern can be simply read into the program storage by reading the X-Y coordinates of the needle entry points. Thus, a new pattern can be very quickly programmed and made available for use in minimum time. Routine maintenance checks for correct operations as well as system fault location is facilitated by various maintenance program routines that can be actuated as required.

In contrast to program controlled prior art apparatus, the system of the invention does not use means for reading data words and forming signals representing the data words. Rather, in command and repeat structures the invention system acts to read the data word and use its contents to arithmetically modify the program logic address registers and then a sequence of program logic commences at that assigned address. This may or may not generate signals dependent on the particular address sequence selected. Furthermore, in the system of the invention, the entire data format is used for instruction, for repeat commands and for data.

Another aspect of the invention method and apparatus resides in an improved system for obtaining fabric motion independent of a stitching action. This feature of the invention also enables the machine sewing to be stopped between parts of a design, for example. This feature furthermore provides a capability for performing sewing operations which are not closed. Thus, the material can be returned to the starting point without sewing taking place. Also, there is now provided a capability for sewing pocket flaps, and the like, where stop and start points are different. The ability to move the material without performing a sewing operation also allows practical employment of metal templates, guide devices, and the like, to assist in positioning the material during sewing. It also now becomes possible to bring the machine to a stop and move the material a substantial distance and then resume the sewing operation, all under automatic control.

While adapted to use of a volatile memory, the invention preferably makes use of an involatile and randomly addressable, read/write-type memory which allows extensive storage and eliminates bank switching as employed in prior art apparatus. (See, for example, U.S. Pat. No. 4,051,794.) In the system of the invention, counters associated with pattern data selection are memory locations incremented, decremented or reset to a value by program logic which full utilizes the randomly addressable feature of the memory employed with the invention apparatus. Initialization of an operation at a fixed location occurs automatically through program logic at machine start-up and at pattern end. The need for a homing sequence, as in the prior art apparatus, has been eliminated.

Needle position is detected by means of a zero speed, electromagnetic pickup which generates a high signal only during the period the needle is in the fabric. Logic, internal to the computer and controlled by program logic, interprets the rising and falling edge of the signal as needle entry and needle exit, respectively. The needle exit and entrance signal is responded to only by the fault detection program. Logic steps in the program determine whether or not a command to move will be issued. The fault detection program prohibits any move if the needle is in the fabric and provides protection even if the needle positioning device fails.

Since pattern data may contain machine commands, repeat instructions and stitch coordinates, multiple pattern data sets may be required to be read in order to obtain the next stitch coordinate data. Multiple reads are generated by program logic and can vary from two up, dependent upon the number of embedded instructions. Substantial compaction of the data is provided by the repeat instruction capability to avoid memory overrun. A given sewing or actuator speed level can be commanded independently and optimized for a particular stitching operation. Machine sewing speed as well as actuator speed is commandable at any point in the pattern. Excessively long stitches can be executed at a lower sewing speed and then sewing speeds can be returned to the highest values. Extended moves without sewing can be accomplished at a reduced motion table speed to prevent thread breakage and then the motion table speed can be elevated after the move to maintain sewing efficiency. Machine instructions can be superimposed on top of encoded pattern data, e.g., speed of sewing, speed of movement, stopping of machine for long material movement, and command cut thread. A pattern can not only be repeated but can be repeated a predetermined number of times without operator intervention and then can go to another pattern.

The method and apparatus of the invention also enables a single computer to control more than one set of sewing apparatus, provides a unique level of interrupt control to suppress some signals during the special conditions encountered during fault detection, and provides the ability to move the drive controller "matching" circuitry interior to the computer as and when desired. Further features will become apparent from the following description and from the appended claims.

DESCRIPTION OF THE DRAWINGS

FIG. 1A is an enlargement of the stitch fault control box with a disable key switch.

FIG. 1B is an enlargement of the manual work release, start and stop signal box.

FIG. 4 is a top view of the drive actuators and motion table-work clamp mechanism.

FIG. 8 is a diagram illustrating the cable train employed with the X-Y motion table mechanism.

FIG. 12 is a rear perspective view of a sewing head equipped with an electromagnetic-type needle position sensor employed in the invention.

FIG. 13 is a front view of the sensor disc employed in the needle position sensor apparatus of FIG. 12.

FIG. 14 is a perspective view of the motion table-work clamp mechanism shown in FIG. 3.

FIG. 14A is a perspective view of a type of pocket flap template work holder that can be substituted for the type of work holders illustrated in FIG. 14.

FIGS. 18 and 18A illustrate the flow charting symbols, legends and selected programming symbols.

FIG. 19 illustrates an example of a machine command nested in stitch data.

FIG. 21 illustrates a comparison of the normal motor speed curve with the improved actuator speed curve obtained according to the invention.

FIG. 22 is a pocket flap stitch diagram illustrating various fabric motions with sewing and fabric motions without sewing obtainable with the invention.

FIG. 23 is a Christmas tree-fence diagram illustrating other stitching functions achieved with the invention.

FIGS. 34-66 collectively comprise a set of flow diagrams which, when read in figure number sequence, comprise an overall flow diagram for the principal programming associated with the illustrated embodiment of the method and apparatus of the invention.

Figure 2:
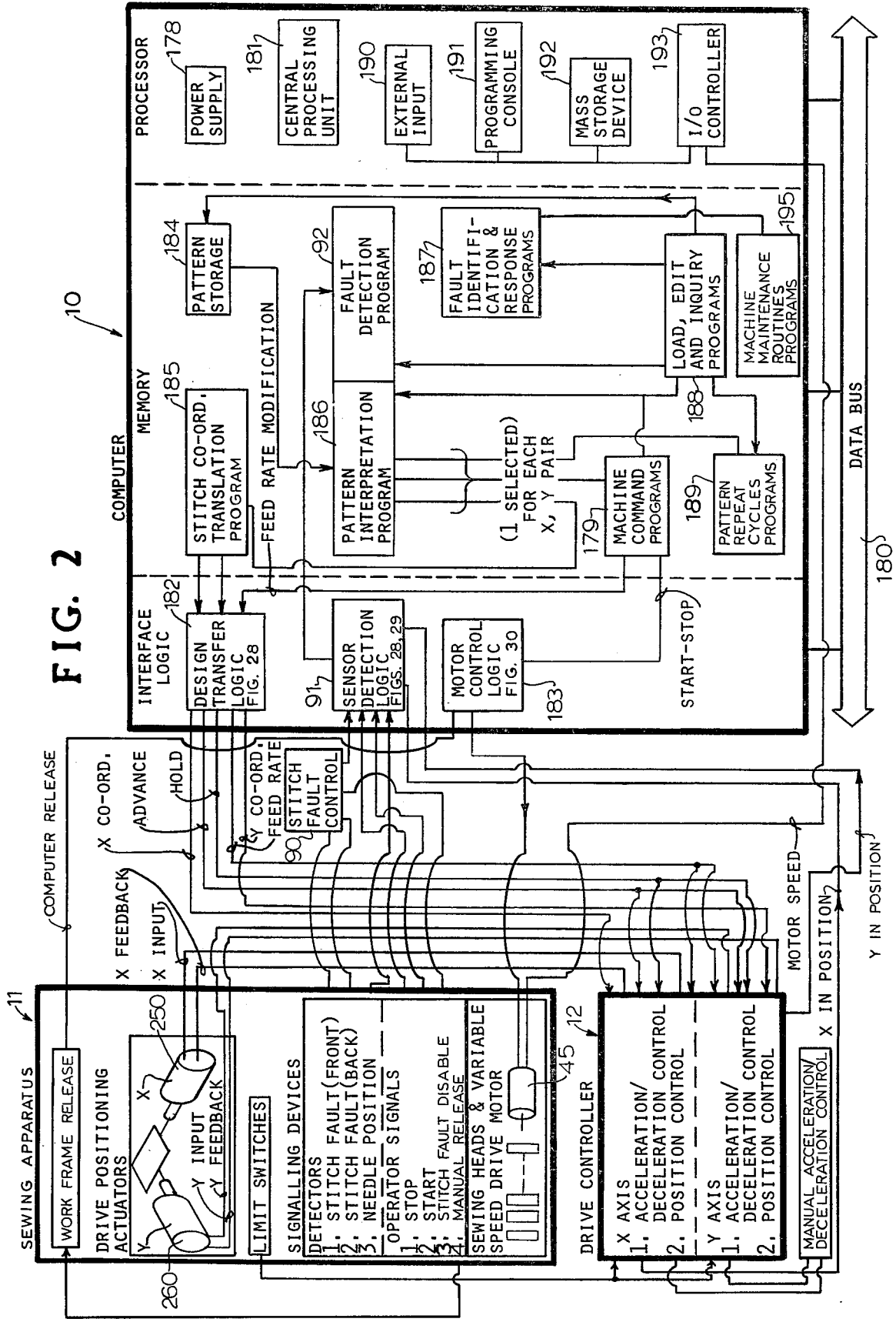
FIG. 2 is a block diagram of the control and signaling circuit employed with the apparatus of the invention.

The flow chart illustrated in FIGS. 34-66 can be noted as being generally divided into various programs and subprograms, some of which will be understood as overlapping. The Main Operating Program consists of (a) Pattern Interpretation, (b) Stitch Coordinate Translation, and (c) Pattern Repeat Cycles, and is illustrated in the flow diagrams appearing in FIG. 34. The Machine Command Subprograms consist of (a) Command Identification and (b) Command Responses and are illustrated in the flow diagrams appearing in FIGS. 35-41 and 44. The Fault Identification And Response Subprograms consist of (a) Fault Identification and (b) Response Subprograms and is illustrated in the flow diagrams appearing in FIGS. 42-43, 45, 46, 48-58 and 60. The Machine Maintenance Routines are illustrated in the flow diagrams appearing in FIGS. 64 and 65. Miscellaneous Routines, some of which are contained in the Load, Edit and Inquiry Subprograms of FIG. 2 are illustrated in the flow diagrams appearing in FIGS. 47, 59, 61–63 and 66.

DESCRIPTION OF THE PREFERRED EMBODIMENT

GENERAL DESCRIPTION

The apparatus of the invention comprises a computer portion, generally designated 10; the sewing apparatus, generally designated 11; and the drive controller apparatus, generally designated 12. Computer 10, in general, provides a means for program storage and signal interpretation providing command control over the sewing apparatus 11 and the drive controller apparatus 12. The sewing apparatus 11, in general terms, is of conventional construction operation for performing the required stitching operations. The drive controller apparatus 12, under the direction of the computer 10, in general terms, controls the required X-Y motions of the work fabrics on which the stitching operations are performed and in a bi-directional manner.

Figure 1:
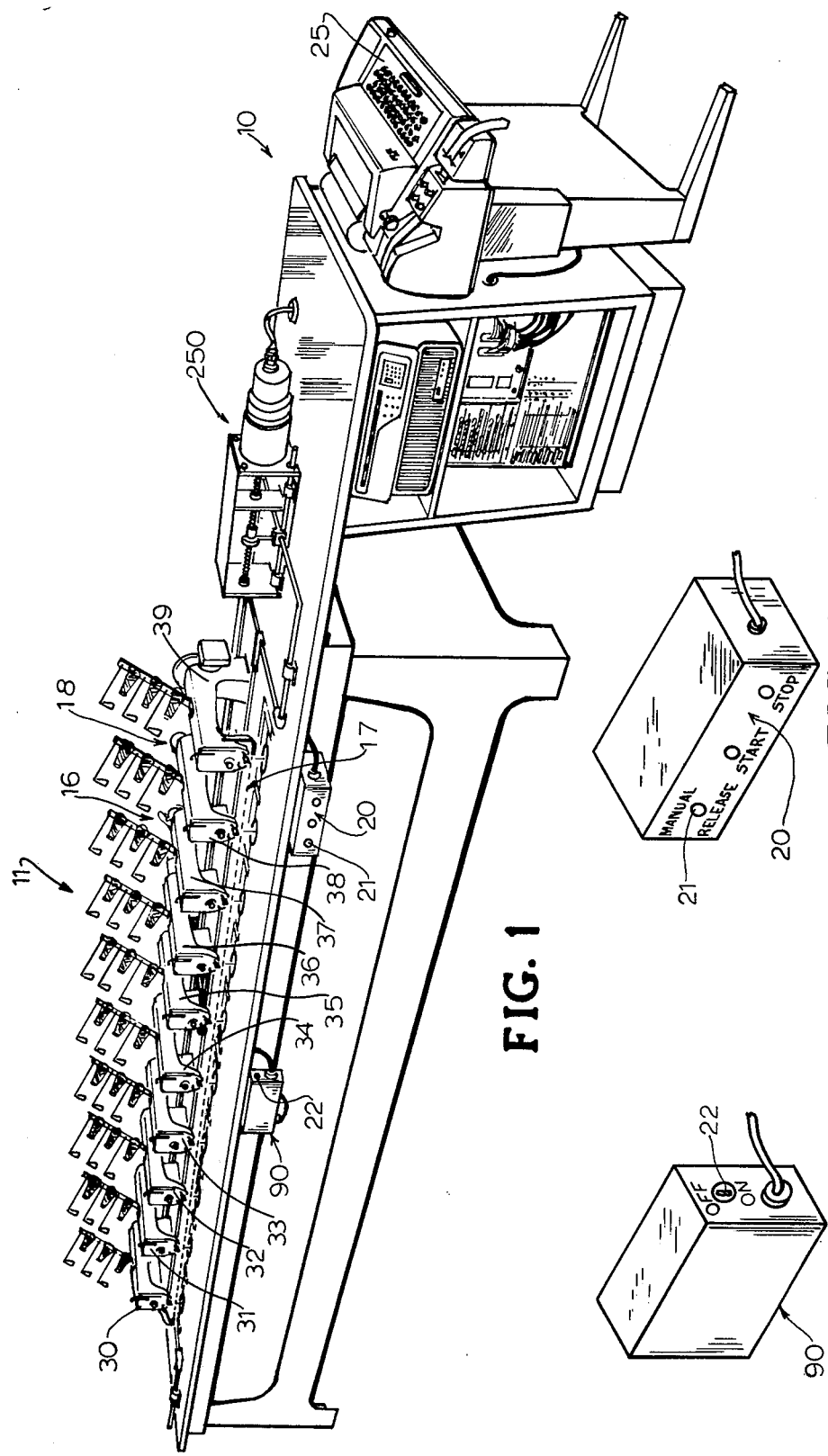
FIG. 1 is a perspective front view of a multi-head embroidery apparatus according to the invention.
Figure 2A:
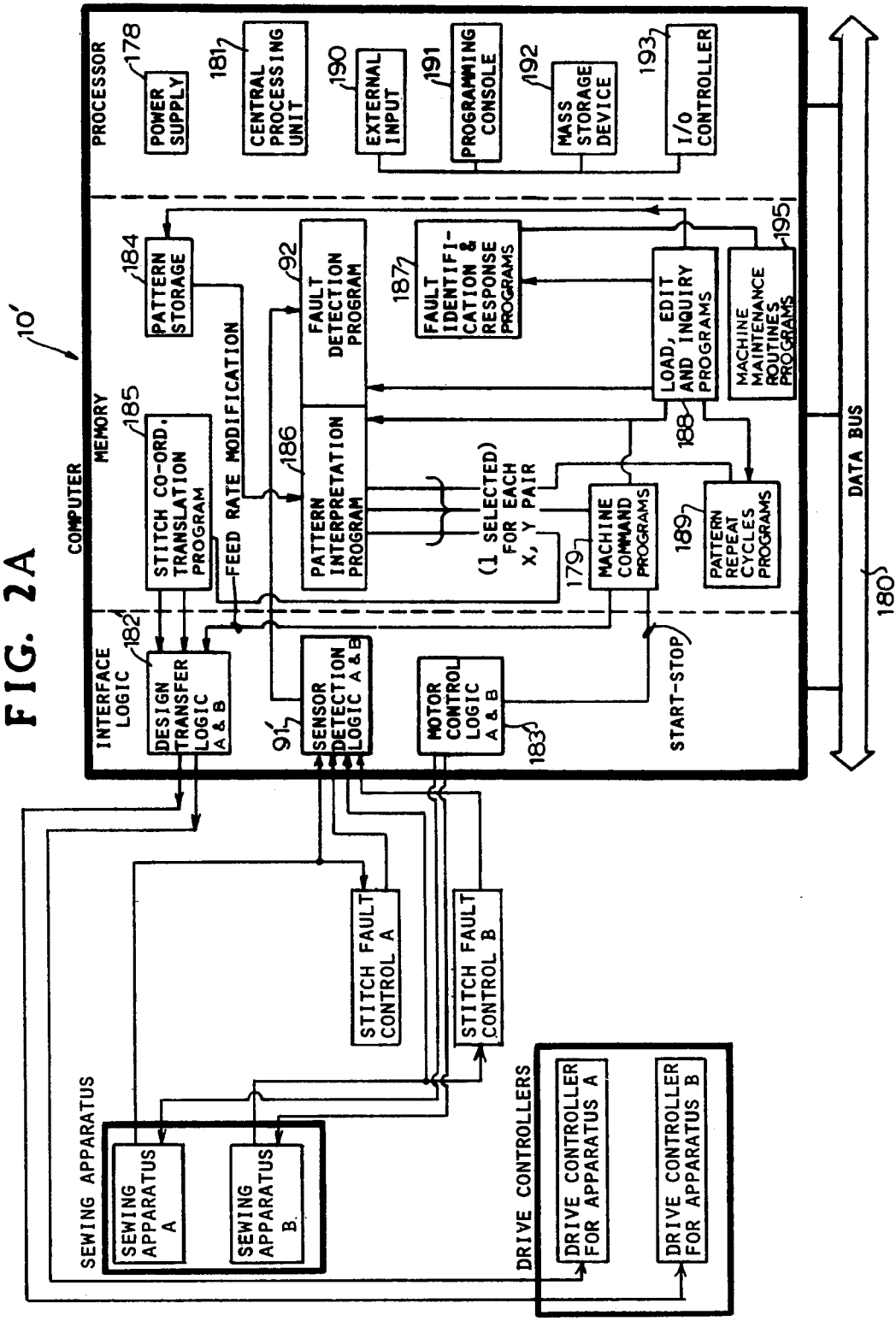
FIG. 2A is a block diagram similar to FIG. 2 and illustrating employment of a single computer to control plural sewing apparatus.
Figure 3:
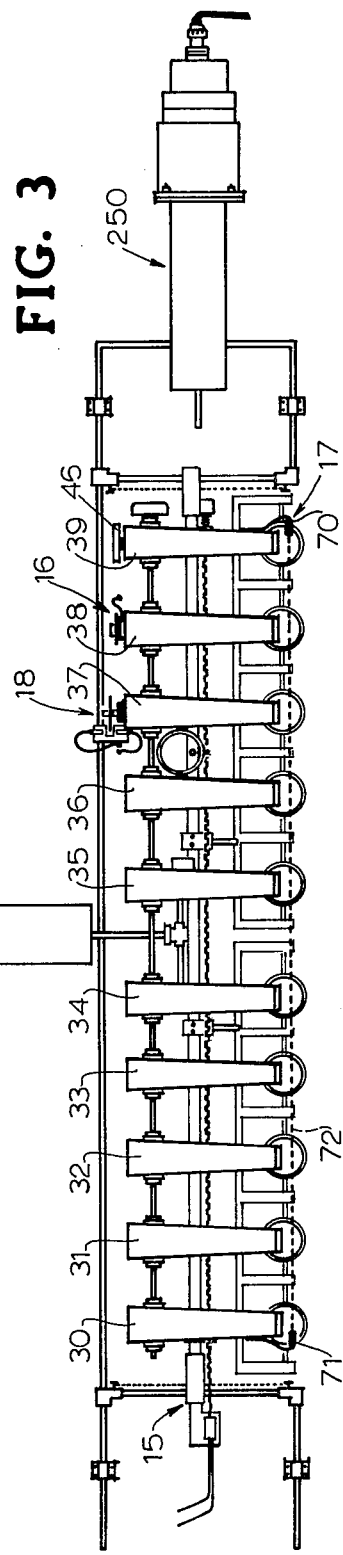
FIG. 3 is a top view of the X axis and Y axis drive actuators, the sewing heads, the thread break and needle position sensors and the motion table-work clamp mechanism.
Figure 10:
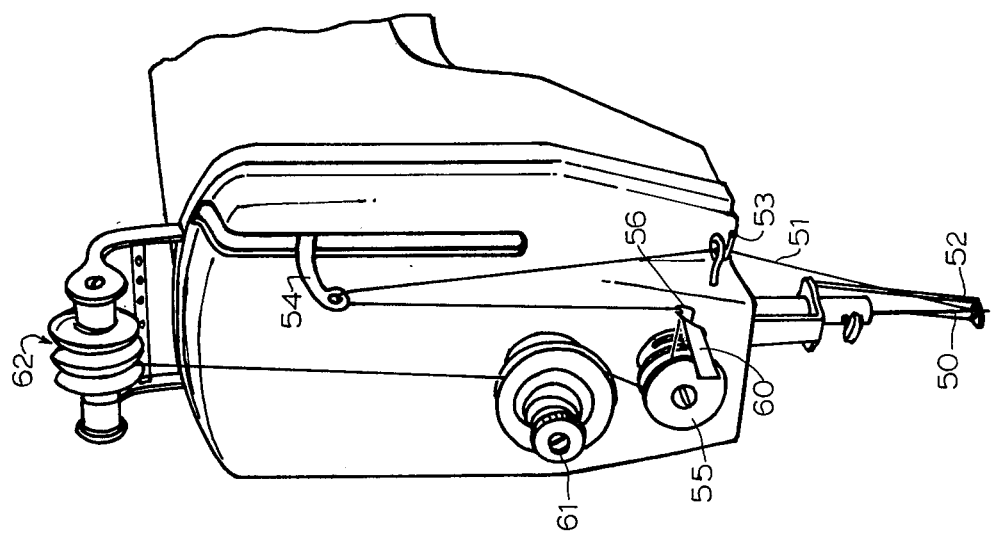
FIG. 10 is a perspective view of the signaling flag arrangement used with the optical sensor of FIG. 9.

An overall view of the physical apparatus is best seen in FIG. 1. FIG. 2, in block diagram form, illustrates the interrelation of the computer portion 10, sewing apparatus 11, and drive controller apparatus 12. FIGS. 3 and 4 illustrate in more detail the physical interrelation of the sewing apparatus 10; X and Y actuators 250, 260; the program controlled work clamp release mechanism, generally designated 15, (also illustrated in FIGS. 14–16); the needle position signaling device, generally designated 16, (also illustrated in FIGS. 12–13); the front stitch fault signaling device, generally designated 17, (also illustrated in FIGS. 9-10); and the back stitch fault signaling device, generally designated 18, (also seen in FIGS. 9 and 11). The operator momentary contact, stop-start signaling devices are generally designated 20 and are physically depicted in FIGS. 1 and 1B. The manually-operated work clamp release switch 21 is also shown in FIG. 1B and the key-operated on-off fault detection disable switch 22 is seen in FIG. 1A on the stitch fault control 90. Common control of two sewing apparatus is seen in FIG. 2A.

As later described in more detail, the program control work release mechanism 15 enables the work clamps to be automatically released at the end of each job thus facilitating the removal of completed work and insertion of new work to be performed. The needle position signaling device 16, the front stitch fault signaling device 17, and the back stitch fault signaling device 18 collectively provide a detector and signaling system for providing information to the computer for interpretation to indicate stitch faults, thread breaks, the need for repair operations, and the like, as later explained in more detail. The operator signaling device 20 provides means for initiating stop and start request signals to the computer and which are under the manual control of the operator. Unlike the typical stop-start switch, it should be understood that the operator signaling device 20 merely initiates requests to stop or start the invention apparatus with the actual stopping or starting function being dependent upon program control as later explained.

Having given a somewhat overall description of the apparatus of the invention, the description will next be directed to a more detailed discussion of each of the three major components mentioned above after which the description will return to a more detailed discussion of various stitching, repair, pattern modification, pattern repeat, maintenance, and other operations for which the apparatus and method of the invention are believed to be uniquely adapted.

DESCRIPTION OF SEWING APPARATUS

Figure 6:
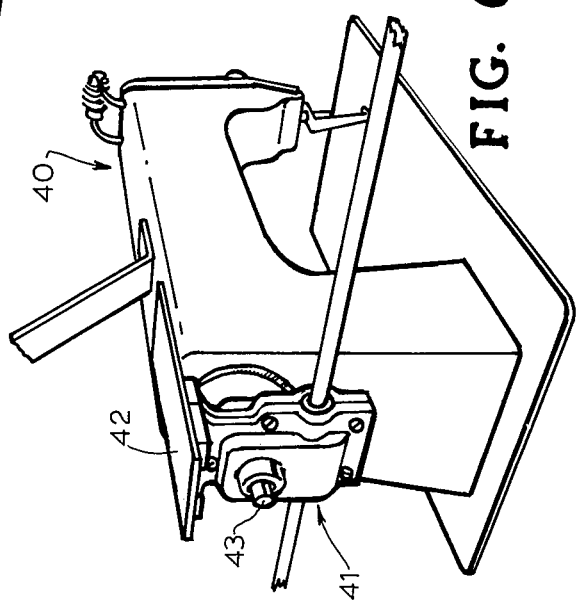
FIG. 6 is a rear perspective view illustrating a sewing head without internal gears such as might be adapted to a multiple head drive system useful with the invention.

While the invention apparatus and method could be adapted to computer control operation of a single sewing head which has been the dominant emphasis in prior art memory controlled sewing apparatus, the more important application of the present invention apparatus and method is that of controlling a bank of sewing heads. Ten such heads are used by way of example and are identified as sewing heads 30–39, as illustrated in FIGS. 1 and 3. The invention apparatus and method basically adapt to any conventional type sewing head and an internal gear type is illustrated in FIGS. 1, 3, 9, 11 and 12. In contrast, FIG. 6 indicates another type of sewing head to which the invention is adapted and which incorporates a right angle drive 41 external of the sewing head 40 and suspended from a mounting plate 42 for driving the main shaft 43 of the sewing head. Since the construction of sewing heads having internal gears as well as sewing heads without internal gears is well known, this brief description is deemed sufficient to show those skilled in the art how the invention apparatus adapts to both type of sewing heads.

The drive motor 45, indicated only in FIG. 2, drives the sewing heads 30–39 through a conventional handwheel and drive pulley 46. As brought out in later description, drive motor 45 can be utilized in different ways. Depending on the application it can be a single speed, multi-speed or variable speed motor of commercially available types. As seen in FIGS. 9-12, each sewing head includes a needle 50 carrying the thread 51, a presser foot 52, a bottom guide 53, a thread take-up lever 54 which acts to pull the thread 51 to lock the stitch, a front thread guide 55 having a swinging arm 56 mounting a radiated beam, e.g., infrared, interrupter flag 60, as later referred to, and a thread tensioning device 61. The presser foot 52 is regarded as being necessary only in sewing operations using an embroidery hoop-style work holder. On top of each sewing head there is mounted a top guide 62 from which the thread 51 feeds through guide 63 and then to a cone guide 64 feeding from a cone 65, three of which are shown for illustration, mounted on a cone support bracket 66. Utilization and control of the speed and stopping of the sewing apparatus with respect to normal stitching operations as well as with respect to thread breaks and other stitch fault situations as well as routine maintenance operations will be better understood as the description proceeds.

FRONT AND BACK STITCH FAULT SIGNALING DEVICES

The signaling devices are treated in the description from two viewpoints. First, there will be given a physical description of the signaling devices indicating how the signaling devices are constructed and how signals are produced. In later description there is a description of the control of response to such signals by program logic which allows construction of responses to meet various and different kinds of situations which may be encountered within a single sewing pattern. As later explained, all signals to and from the computer 10 are terminated at the computer without connection to other parts of the invention apparatus. When a sensor signal is detected, the computer halts its normal program execution, identifies the source of the sensor signal and executes a predetermined sequence of program logic, all of which is dealt with in later description.

For stitch fault detection purposes, there is provided the previously-mentioned front stitch fault signaling device 17 and the back stitch fault signaling device 18. The stitch fault devices 17-18 are basically optical in nature and utilize transmitter-receiver sets of the modulated infrared-type sensitive only to selected wavelengths and frequency and substantially insensitive to other ambient conditions. Sets of this type are made by Opcon, Inc., of Everett, Washington. The modulated infrared sensor set employed requires only a single unit for multiple sewing head machines. The sensor set frequency tuning and spectral sensitivity enables such sensing to be essentially insensitive to any ambient condition at the machine and can be aimed over the distance required to observe all heads by observing small flags on the spring of one thread guide per machine head, as next explained. An important advantage of the system response to the thread break signal is that the operator is not required to rerun the pattern or allow a gap to remain as with prior art systems. Also, the optical system itself offers a unique construction.

The front stitch fault signaling device 17 is illustrated and related circuitry is diagrammed in FIGS. 1, 2, 3, 9, 10 and 32. Front signaling device 17 includes a beam source 70 which is located at one end and in front of the bank of sewing heads 30-39. A beam sensor 71 is located in front of and at the opposite end of the bank of sewing heads so as to allow the beam 72 to pass immediately in front of the sewing heads and through the path occupied by the flags 60 (FIG. 9-10) when such flags are in their lowest position. That is, as the take-up arm 54 moves up and down during stitching, the various flags 60 will be caused to move up and down and in and out of the path of beam 72 as the take-up arm 54 reciprocates during stitching. This arrangement also allows any of the intermediate heads 31-38 to be removed such as for repair without affecting the operation of the front signaling device 17 as to the remaining heads.

Since the beam 72 is intermittently interrupted in normal stitching operations, provision is made for producing a machine position signal which will indicate whether or not the interruption of beam 72 by a flag 60 is or is not indicating a true thread break or other stitch fault desired to be detected. Such machine signal source is produced by the back stitch fault signaling device 18 illustrated and diagrammed in FIGS. 1, 2, 3, 9, 11 and 32. The back stitch fault signaling device 18 is arranged on the rear of one of the machine heads and includes a disc 80 driven by a sewing head shaft 81. Disc 80 has a beam interrupting tab 82 which, on each revolution, breaks the light beam passing between source 83 and sensor 84 mounted on a suitable bracket 85. The position of the tab 82 on disc 80 is such that tab 82 interrupts the beam between source 83 and sensor 84 during the fractional part of a millisecond at which the thread take-up lever 54 reaches the maximum position. The position of disc 80 on shaft 81 is also such that if any flag 60 is down, indicating a stitch fault and, thus, interrupting the beam 72 in front of the machine heads and tab 82 is simultaneously interrupting the beam passing between source 83 and sensor 84, a stitch fault signal will be generated.

Figure 9:
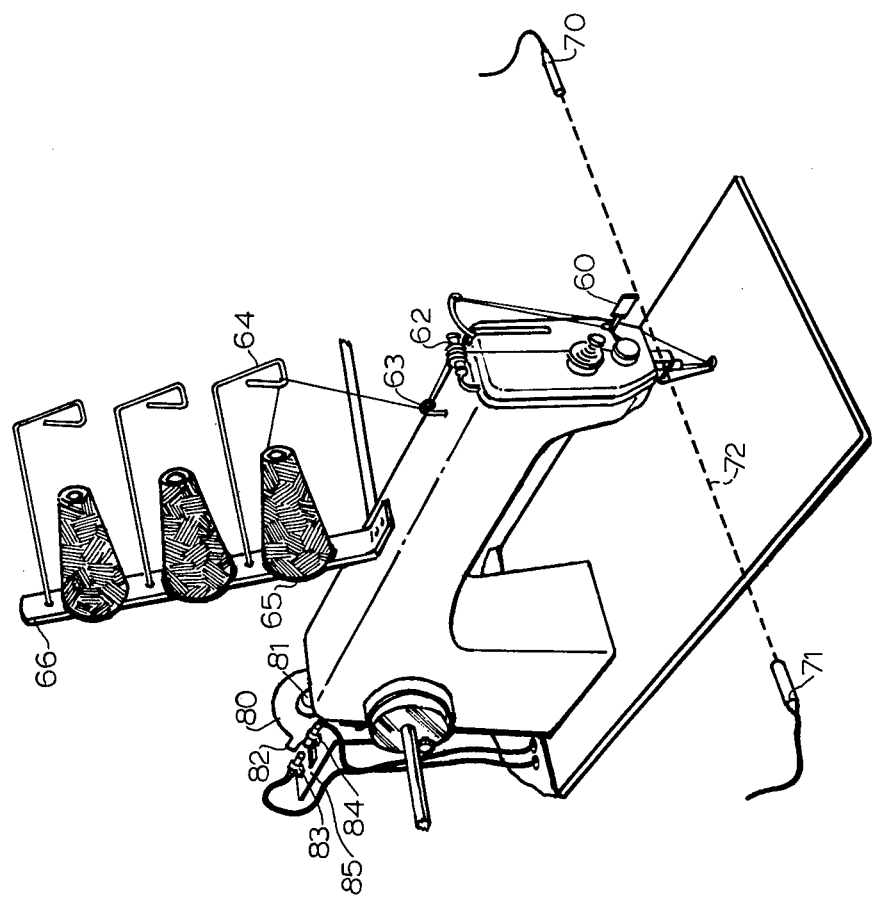
FIG. 9 is a front perspective view of a sewing head equipped with an optical stitch fault sensor employed in the invention.
Figure 32:
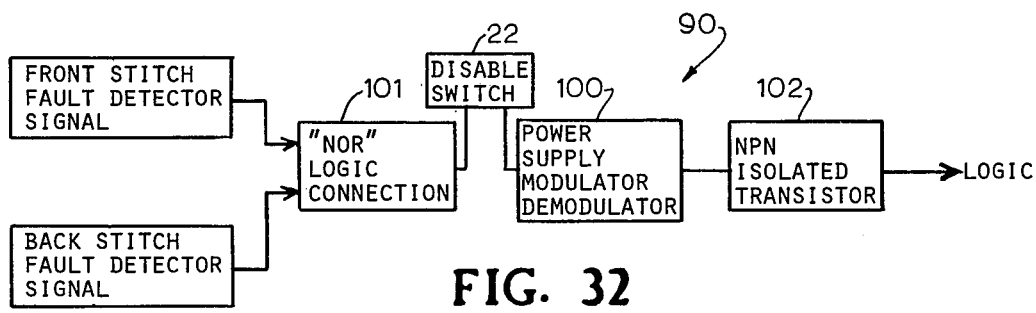
FIG. 32 is a schematic diagram of the stitch fault signaling comparison circuitry.

The stitch fault machine position signal produced by interruption of the beam at the rear of the machine head, as illustrated in FIG. 9, as well as the signal produced by the interruption by a flag 60 of the beam 72 at the front of the machine head, as also illustrated in FIG. 9, are transferred to an appropriate circuitry, illustrated in FIG. 32 and which in FIG. 2 is labeled as the stitch fault control 90. For maintenance purposes, stitch fault control 90 is mounted on the front of the apparatus as indicated by reference numeral 90 in FIG. 1 and includes the previously mentioned disable switch 22 also represented in FIGS. 1 and 19. The stitch fault control 90 as diagrammed in FIG. 32 represents a commercially available OPcon device and contains the power supply modulator, demodulator 100 and appropriate "NOR" circuit 101 and an output device 102 to produce a stitch fault signal, when appropriate, for passing to the sensor detection logic 91 shown and later described in connection with FIG. 2.

The stitch fault control unit 90 provides output energy properly modulated for both front sensor 71 as well as back sensor 84 and receives and demodulates the input from the two sensors, i.e., sensors 71 and 84. It will also be seen from the FIG. 32 diagram that the signals produced by the two sensors reach the stitch fault control 90 in such a way that absence of a signal from both sensors generates a thread break or stitch fault signal.

During normal machine cycles, the respective impact guide springs 56 (FIG. 10) on the machine heads are oscillating up and down as the thread take-up levers 54 travel their prescribed paths. This causes the beam 72 of the front stitch fault signaling device 17 to be interrupted intermittently. At the point the thread take-up lever approaches its apex, the previous switch will have been locked and the thread will have been pulled through the tension device 61. In correct operation, the force of the pull provided by the take-up levers 54 against the drag of the tension devices 65 raise the impact springs 56 out of their rest positions thereby allowing the sensor 71 in front of the bank of sewing heads to view its opposed source 70. At that moment, the beam between the source 83 and sensor 84 is interrupted by tab 82 and no break or stitch fault-type signal will be issued. If, however, a thread should break or a stitch fail to lock, whether due to machine malfunction, bobbin thread breakage, or the like, little or no thread draw will occur as the thread take-up levers 54 approach their apex. As a result, one or more of the impact springs 56 will remain at rest with the respective flag or flags 60 interrupting the front sensor beam 72. When the beam between the back source 83 and sensor 84 is interrupted by the tab 82, both front and back beam paths will be obscured and a stitch fault signal will be generated and directed from stitch fault control 90 to the computer 10 for interpretation and processing, as later described. Also, later description will deal with the aspect of how the invention apparatus responds to such stitch fault signals and provides the ability to sense loss of tension and to stop the table motion in one stitch to minimize repair and enable a self-repairing feature to function as illustrated, for example, in the flow diagram of FIG. 26. Reference will also be made to how false signals are avoided during the first few stitches whenever new sewing or repair cycles commence.

NEEDLE POSITION SIGNALING DEVICE

As will be more fully appreciated from later description, one of the important advantages of the invention resides in the fact that the sewing head and the motion table operate independently and are separately controlled. That is, the actions of the two asychronous mechanisms, the sewing apparatus and the X-Y motion table, are coordinated through the computer. No direct connection is supplied and, therefore, no signal related to one mechanism triggers or causes the other to position except indirectly through program logic. The sewing heads 30–39 of the apparatus of the invention run totally asynchronous with respect to table motion and movement coordination or fault detection is supplied by computer logic. This is further illustrated by the fact that according to the invention apparatus and method, a commandable X-Y motion speed can be applied during sewing operations as well as during non-sewing moves. Furthermore, it may be noted that the invention apparatus is adapted for an extremely high stitch speed, for example, 850 to 1500 stitches per minute. When appreciation for the extremely short amount of time that the needle is out of the fabric during normal stitching, it should be noted that the system of the invention effectively makes decisions between each stitch as to whether there is or is not a broken thread or other stitch fault, whether the needle is or is not in the fabric, whether the last stitch was or was not made and whether or not the operator-controlled stop signal has or has not been initiated. Motion only occurs and normally can only occur when the needle is out of the fabric. Thus, needle position signaling and detection becomes critical and important to the invention.

The previously-mentioned needle position signaling device 16, illustrated in FIGS. 1, 2, 12 and 13, is mounted on the back of one of the sewing heads and includes an electromagnetic pick-up head 106, such as is available from Dynapar Corporation of Gurnee, Illinois, which is designed to detect the presence of metal in its air gap. A thin, non-metallic disc 107 mounts on and rotates with the shaft 110 of the sewing head on which the pick-up head 106 is mounted. A metallic surface 111 is bounded by a leading edge 112 and trailing edge 114 with the remaining portion 115 being non-metallic. Surface 111 comprises the surface which is detected by pick-up head 106. Dics 107 is mounted on shaft 110 so that as the leading edge 112 enters the pick-up head 106 with the direction of rotation indicated in FIG. 12 there is a corresponding entry of the needle 50 into the fabric. Correspondingly, as needle 50 exits the fabric, disc 107 is positioned so that trailing edge 114 is simultaneously leaving pick-up head 106.

Figure 31:
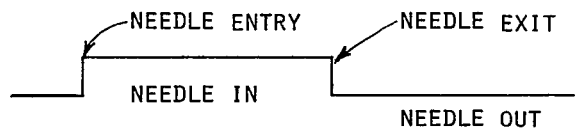
FIG. 31 is a pulse diagram associated with the needle position sensor of FIG. 12.

The needle position signaling device and sensor arrangement 16 is a two-state device. A logic level positive voltage (hereafter referred to as high) is achieved at the time the needle enters the fabric as illustrated in FIG. 31. This high is maintained until the neelde exits the fabric as is also illustrated in FIG. 31. At needle exit, the output voltage drops to approximately zero for low and this low is maintained until the needle reenters the fabric. This signal enters the sensor detection logic 91, indicated in FIG. 2 and shown in more detail in FIG. 29. As further illustrated in FIG. 2 and from later description, the same sensor detection logic 91 also receives signals indicating the X-Y positioning of the motion table, as later explained, and which enables the invention apparatus to react to both proper X-Y functions as well as various X-Y malfunctions such as a reaction to a failure of the motion table to reach position, as later described in reference to FIG. 27.

AXIS IN-POSITION SIGNALS

As covered in more detail in later description, the drive positioning actuators 250, 260 feed back movement data to the drive controller 12. It, in turn, matches the feedback data against the desired movement. At the point a match is reached on one or both axes, the drive controller 12 issues a signal for each axis as required. The X and Y in-position signals are generated independently as the movement match is attained on each axis. This pair of signals is received by the sensor detection logic 91 diagrammed in FIG. 28. These signals generally provide movement confirmation to the computer as later dealt with in more detail.

OPERATOR SIGNALING DEVICES

Figure 28:
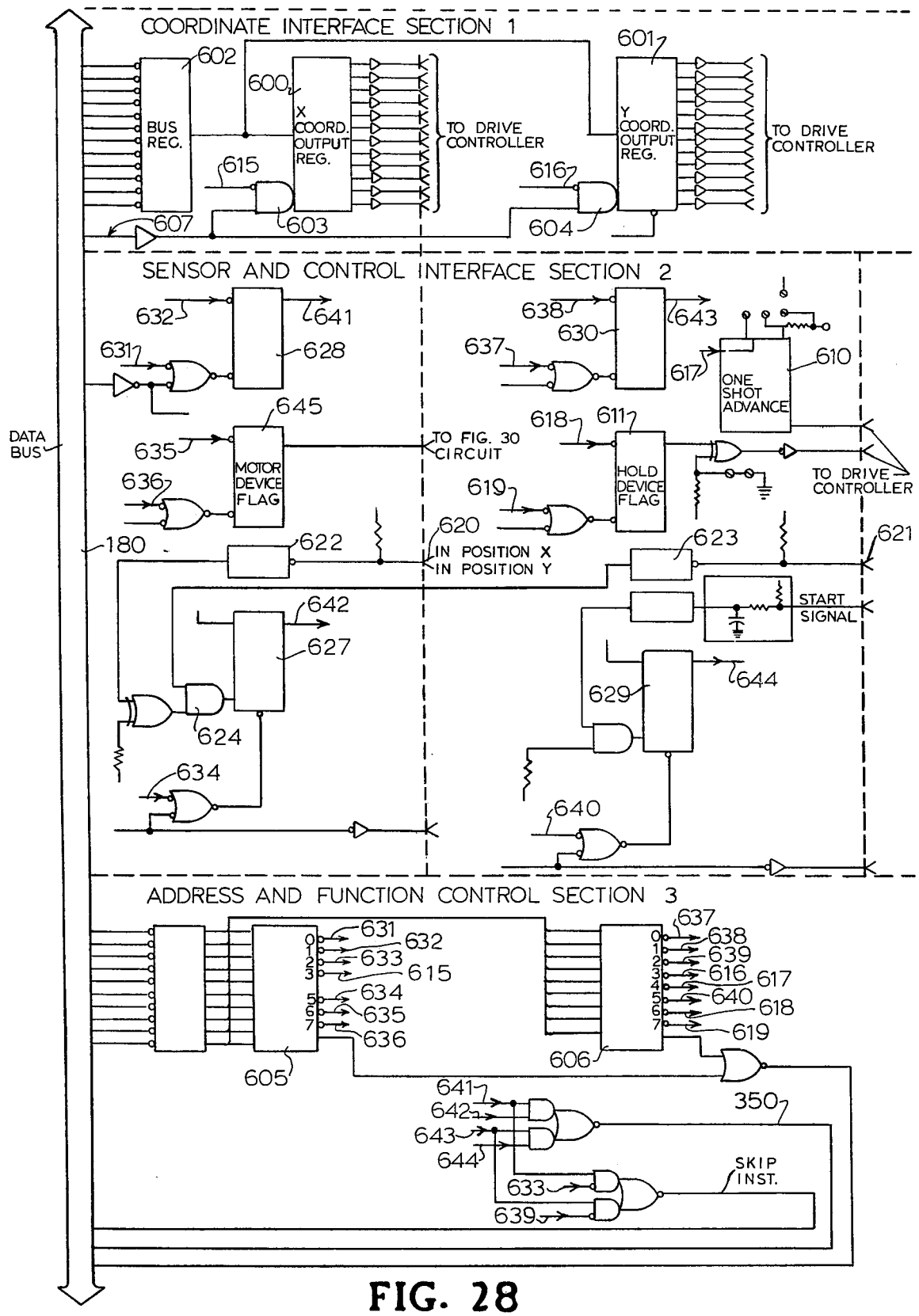
FIG. 28 is a schematic circuit diagram for the design transfer logic illustrated in FIG. 2 together with some of the sensor detection circuitry identified in FIG. 2.
Figure 29:
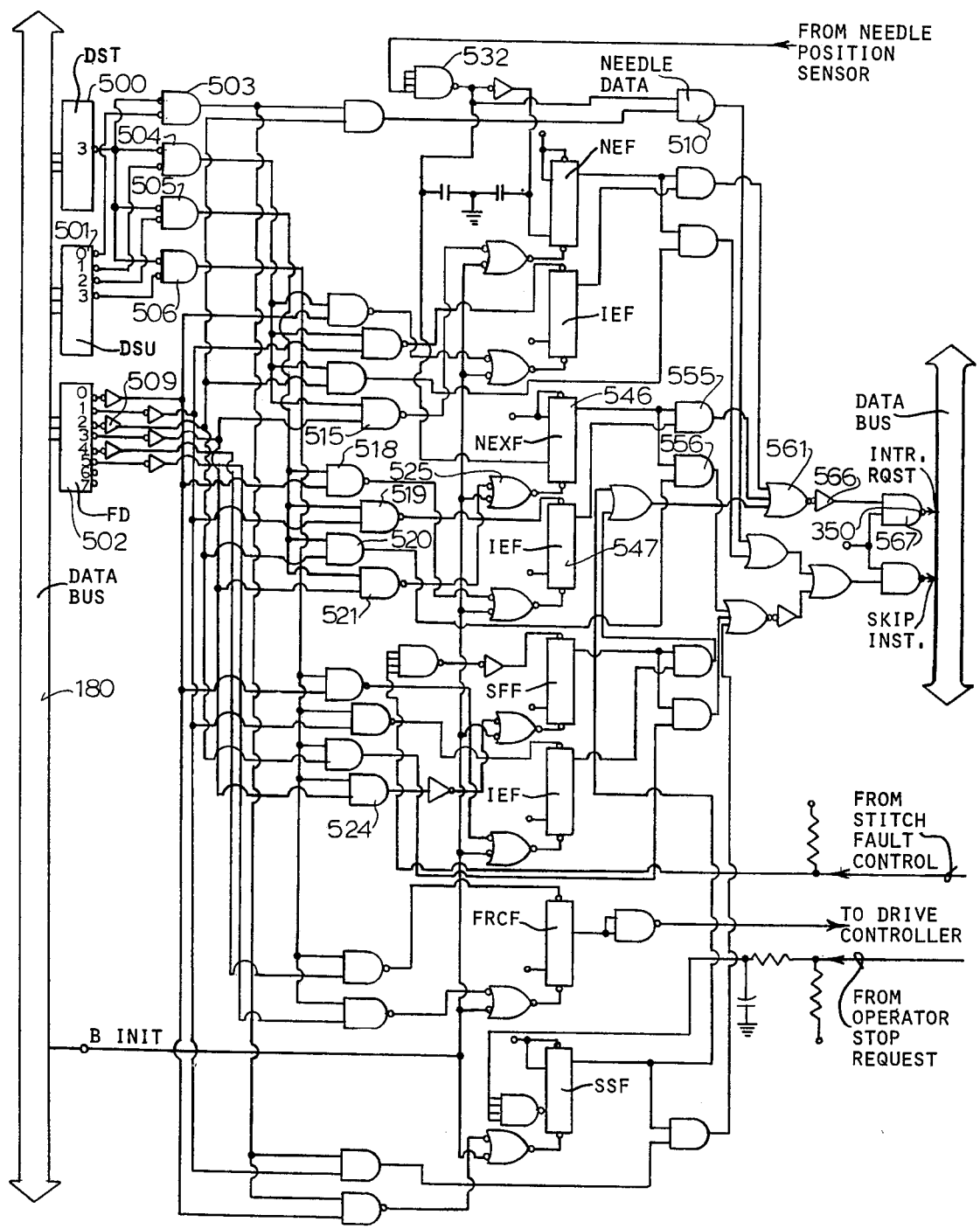
FIG. 29 is a schematic circuit diagram for the sensor detection logic illustrated in FIG. 2 together with speed control for the X-Y motion table drive controller.
Figure 42:
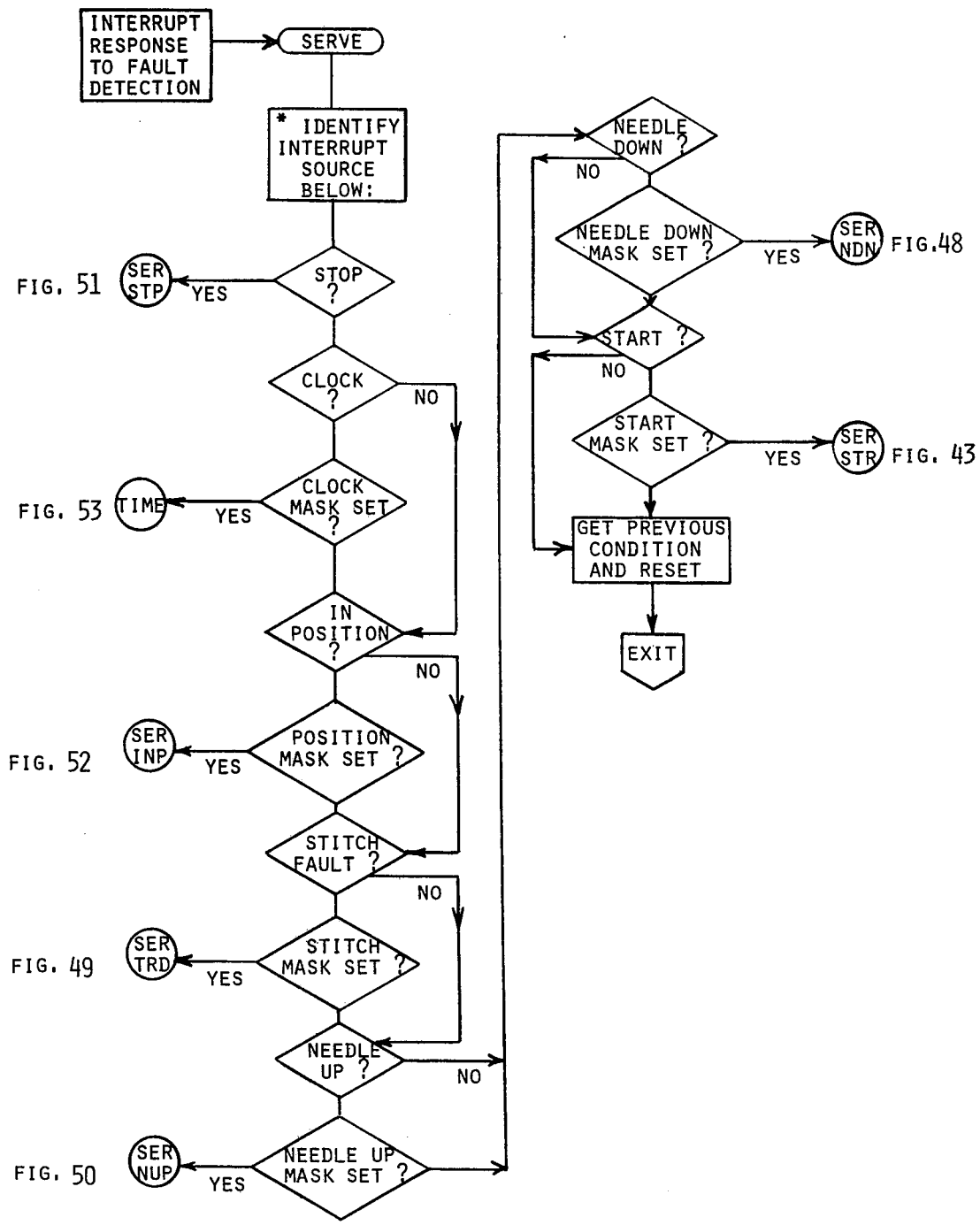

While the operator of the apparatus of the invention is given access to the computer 10 by a programming console, illustrated in FIG. 1 and diagrammed in FIG. 2, in normal operating conditions only two controls are necessary for operation by the operator, namely, a momentary contact start button and a momentary stop button arrangement 20, as illustrated in FIGS. 1 and 1B and diagrammed in FIG. 2. Momentary contact type switches are preferred for both start and stop signaling to avoid repetitive servicing by the computer. Depression of the start button causes a signal to be sent to the computer 10 which evaluates the reason for the stop preceding the start signal. The start signal input is seen in FIG. 29. Having determined a reason, the computer programming initiates execution of a program logic string necessary to start up after that identified stop. If no apparent stop reason is registered, the start signal will be ignored: The stop button has been provided as a necessary safety precaution and to provide means for the operator to signal the computer to stop execution for inspection, replenishing the thread supply, or the like. The stop signal input is seen in FIG. 28. However, all normal stops are controlled by program logic from the machine command structure of the pattern language. Depression of the stop button is detected by the fault program and immediately stops the sewing heads and work piece movement mechanism. This is a first priority response and is reacted to over all other program logic, as illustrated by FIGS. 42 and 51.

Another operator control, a key operated, off-on, stitch fault control disable switch 22, shown in FIGS. 1 and 1A, may be used for later-described maintenance and other routine checks when it is desirable to disable the stitch fault control 90 illustrated in FIG. 32. This stitch does not signal the computer but merely prevents transmission of a stitch fault signal to the computer.

A further manual operator control is also provided and is designated as a manually-operated work clamp release control 23 seen in FIG. 1B. Control 23 is intended to represent a manual switch, which is appropriately wired to operate the later-described program controlled work clamp release solenoid 172 (FIG. 15) in the event of program failure.

DRIVE POSITIONING ACTUATORS, DRIVE CONTROLLER AND WORK CLAMP RELEASE

In the ten head embodiment being described, there are provided ten work clamps 120-129 which are employed to hold ten separate pieces of fabric being stitched and which might, for example, be ten separate pockets being stitched with a selected embroidery design. Clamps 120-129 may be of any desired shape such as the typical elliptical, square and circular shapes shown in FIG. 5. One set of five clamps 120-124 are mounted in a releasable work frame 140 and the other set of five work clamps 125-129 are mounted in a separate releasable work frame 141.

An important timesaving feature of the invention resides in the provision of means to release work frame 140 and work frame 141 by the computer controlled load release mechanism 15 best illustrated in FIGS. 3, 4 and 14. The load release mechanism 15 enables work frame 140 and work frame 141 to be completely released at the end of each job by pattern command so that the operator can quickly remove both such work frames with finished work and immediately substitute another pair of work frames having ten other pieces of fabric to be sewn. The work frames are, thus, not captive to the machine but are completely removable at the end of each job and the release operation requires no manual task by the operator. FIGS. 14, 14A illustrate interchangeable frames.

Figure 15:
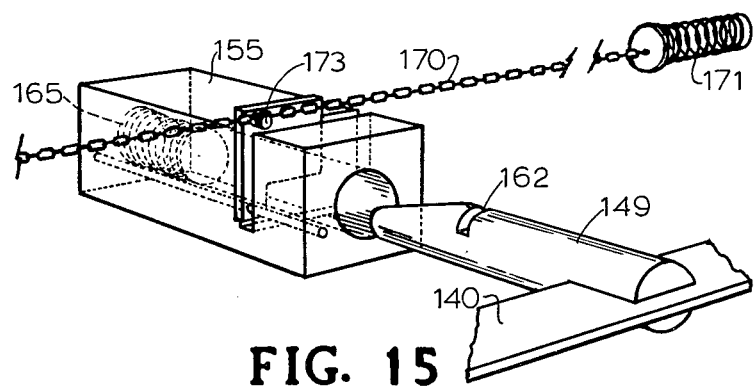
FIG. 15 is a perspective view of a release block arrangement used with the motion table-work clamp mechanism.
Figure 16:
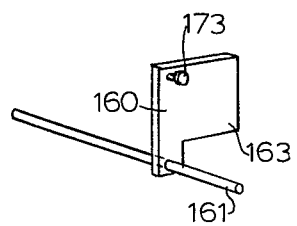
FIG. 16 is a perspective view of a detent plate used with the motion table-work clamp mechanism.

Work frame 140 is provided with a pair of spring-loaded, detent-type connections, generally designated 145, 146, and work frame 141 is provided with a similar pair of detent connections, generally designated 147, 148, as seen in FIG. 4. Work frame 140 mounts a pair of registration pins 149, 150 and work frame 141 mounts a pair of registration pins 151, 152, as seen in FIG. 4. A pair of detention blocks 155, 156 are mounted on Y-axis bar 200 to receive registration pins 149, 150 of work frame 140. A similar pair of detention blocks 157, 158 are mounted on Y-axis bar 200 to receive registration pins 151, 152 on work frame 141. Each of the detention blocks 155-158 includes a detent plate 160 pivoted on a pin 161 as best illustrated in FIGS. 15 and 16. Each of the registration pins 149-152 is provided with a notch 162, illustrated in FIG. 15, and which is adapted to receive the lower edge portion 163 of each respective detent plate 160 in a releasable detent connection. Using registration pin 149 as an example, as seen in FIG. 15, it will be noted that insertion of registration pin 149 in detention block 155 causes an internally mounted ejection spring 165 to be compressed. It will also be seen that a release cable 170 is secured between a spring 171 and a solenoid 172 and makes connection to each detent plate 160 by the respective connecting pin 173, seen in FIGS. 15 and 16. Energization of solenoid 172 is under program control as later explained. Thus, it can be seen that with solenoid 172 de-energized, the respective work frame 140, 141 can be releasably secured in the respective detention blocks 155-158 and held by means of the tension provided by spring 171 applied to release cable 170 maintaining all of the respective detention plates 160 in their respective notches 162 in the various registration pins 149-152. However, when solenoid 172 is energized under program control, release cable 170 is pulled against the tension of spring 171 and causes each of the respective detent plates 160 to move out of the respective registration pin slots 162 allowing the respective compressed ejection springs 165 to force the respective registration pins 149-152 outwardly. This releases both of the respective work frames 140, 141 so that they are no longer captive to the machine. This automatic and computer controlled work release operation can, thus, take place at the end of each pattern and with no manual release operation of any kind being required of the operator. However, in the event of a failure of the program release, solenoid 172 can be energized by the operator momentarily pressing the work clamp release switch 23 previously mentioned.

For pocket flaps, collar operations, and the like, the respective work frames 140, 141 can be equipped with an appropriate number of template-type work clamps. One type pocket flap template is illustrated in FIG. 14A. In FIG. 14A there is shown a slotted base template member 164, a hinged slotted top template member 165, a manual release latch 166 and a pair of hinges 167. Appropriate brackets 168 support the template on the work frame. In this embodiment, the pictured slots 169 represent a typical pocket flap stitch profile. In use, the operation would follow the sequence of the operator loading and latching a set of templates on each work frame with pocket fabric blanks, inserting the work frames as previously explained, executing the stitching operation, loading additional template equipped work frames while such stitching is being done and then, when such stitching is completed, unlatching and removing the completed work and repeating the sequence as before.

A set of captive clamps could in some sewing operations be desirable. In such a situation, the described program controlled work release arrangement could be readily adapted to release of a set of captive claps.

The Y-axis mounting bar 200 on which the detention blocks 155-158 are mounted is provided with precision slide-fit connections 201, 202 which ride respectively on bars 205, 206. Solenoid 172 mounts on a mounting plate 207 secured to connection 201 and spring 171 mounts on mounting plate 208 secured to connection 202. Thus, the computer controlled work release mechanism 15 is able to travel in correspondence with the X-Y motions. Bars 205, 206 form part of a rigid frame which includes bar sections 225, 226 which are precision ground and slide in precision bearings 230, 231, respectively. Another main bar section 235 extends between bars 205, 206. Additional bar sections 236, 237 slide in precision bearings 238, 239 and are joined to a further bar section 240 running parallel to bar 206.

Figure 7:
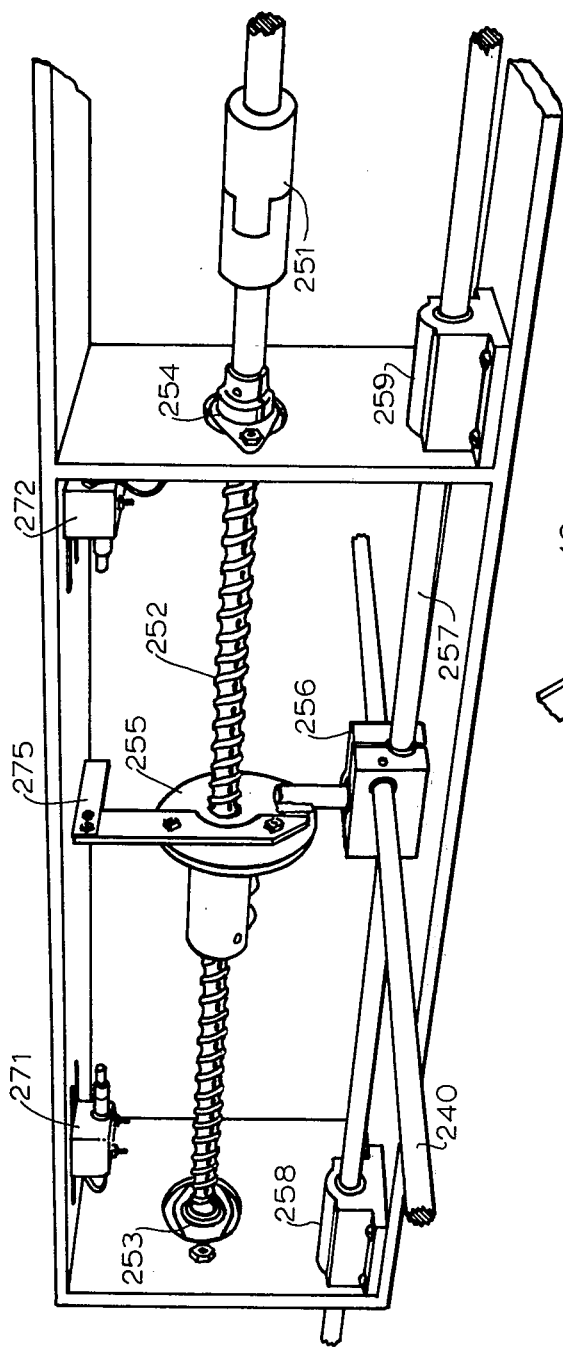
FIG. 7 is a perspective view of a drive-sliding mechanism employed with the X-Y motion table mechanism.

X motion is provided by a drive positioning actuator 250 and Y motion is provided by a drive positioning actuator 260. X motion is transferred from drive actuator 250 to bar 240 of the motion table frame illustrated in FIGS. 3 and 4 by means of a traveling screw mechanism. Referring to FIG. 7 and the traveling screw mechanism, X drive positioning actuator 250 connects through a flexible coupling 251 to a screw member 252 mounted in precision bearings 253, 254 and having a screw block 255 which travels thereon. Screw block 255 connects to a lower block 256 which secures to a lower guide rod 257 mounted in precision bearings 258, 259. Lower block 256 also mounts the rod section 240 forming part of the motion table frame. Thus, as X motion is transferred to screw member 252, such motion is transferred through screw block 255 and lower block 256 to rod section 240 and is maintained precise by means of the precision mounted lower guide rod 257.

With continued reference to FIG. 7, a suitable mounting enclosure 270 supports the mentioned components of the traveling screw mechanism and also supports a pair of X-axes, normally closed front and rear limit switches 271, 272 which are actuated by means of the bracket 275 secured to screw block 255 and which prevent overtravel of the X motion in either direction. Since other limit switch protection is provided, further explanation will be given later in the description in reference to FIG. 17 in which the limit switch circuitry is illustrated.

Figure 17:
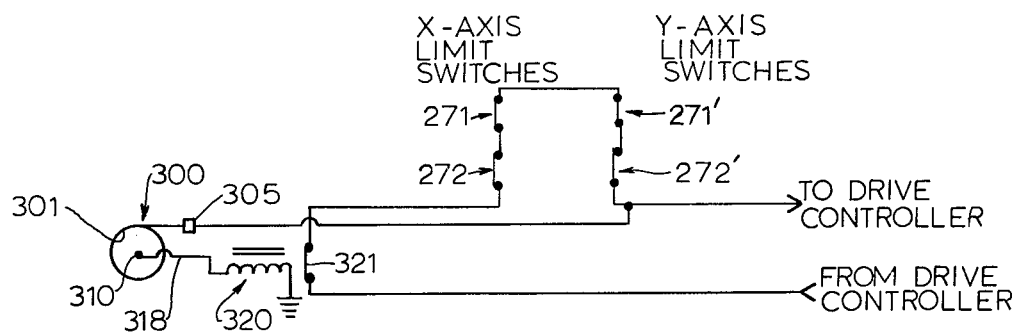
FIG. 17 is an electrical diagram of the limit switch circuitry.

A traveling screw mechanism similar to that illustrated and described in reference to FIG. 7 is also employed by transferring the Y motion to the motion table frame. In this regard, the drive rod 257' corresponds to drive rod 257 shown in FIG. 7 and mounts a sliding connection 276 which rides on guide bar 272 rigidly attached to its ends by connections 277, 278 to Y-axis bar 200. Thus, the traveling screw mechanism employed for the Y motion is essentially identical to the traveling screw mechanism employed for the X motion as seen in FIG. 7 with the exception that the bar section 240 shown in FIG. 7 is not employed in connection with transfer of Y motion. It should also be understood that a second pair of normally closed Y-axes limit switches, designated 271', 272', not shown, are employed to prevent over-travel of the Y motion traveling screw mechanism and these are also illustrated in FIG. 17 showing the limit switch circuitry.

Alignment of the Y-axis bar 200 is maintained by means of a cable train arrangement illustrated in FIG. 8 and referenced to the attachment points A, B C, and D identified in FIG. 4. This type of cable train is very similar to that employed on an ordinary draftsman's table and thus will be readily understood by those skilled in the art.

The drive controller 12, diagrammed in FIG. 2, operates in association with the X-Y drive positioning actuators 250, 260 to provide a closed loop, absolute control, digital positioning system adapted to operate under digital commands. By absolute control is meant that the system measures each actual move and compares it to the desired move to insure movement accuracy. Furthermore, acceleration and deceleration control as well as position control are provided. Systems of this general type are made by Control Systems Research, Inc., 1811 Main Street, Pittsburgh, Pennsylvania 15215 and have been used for other applications. The type of system which has been uniquely adapted for use in the embodiment of the invention being described is identified as a CSR System 500 by the manufacturer. Such a system exhibits high peak torque at start-up and high constant acceleration rate both of which are of unique utility in the present system since moves are made only when the needle is out of the fabric and can be in either direction.

Drive controller 12 includes for each of the two drive actuators 250, 260 a respective actuator, appropriate revolution counting, digital to analog conversion, amplification and accelerometer circuitry and mechanisms. This type of system is adapted to automatically compute the precise point where deceleration must begin which provides linear deceleration to the commanded position without overshoot. Thus, the amount of time required to decelerate from the positioning speed to the commanded position is substantially reduced. The described drive controller 12 is also used in a manner to provide substantially precise and uniform acceleration which lends itself to optimizing thread handling and stitching operations to minimize stitch faults.

One of the unique values in using the type of drive control described is that drive controller 12 may be set so as to adjust the acceleration rate to minimize and essentially prevent breakage of the thread due to tension. This is not programmable but is manually adjusted for particular thread conditions by adjusting a regenerative DC controller gain amplifier forming part of controller 12. The invention gives recognition to the fact that force on the thread by linear acceleration of the motion table as previously explained provides a near constant force on the thread rather than a peak force which reduces thread breaks. Further, on large moves, the invention provides means whereby actuator speed can be adjusted under program control to minimize thread breaks due to overheating, as later discussed with reference to FIG. 22. The reciprocatory motion of the take-up lever 54 in conjunction with the discontinuous X-Y motions of the motion table places great stresses on the thread 51. The pull on the thread goes through a maximum during acceleration of the motion table and is both a product of the acceleration and of the thread tensioning device. In gear style driven devices such as the mechanical pantographs, instantaneous acceleration occurs at the moment the typical gear play is removed. In stepping motor motion table mechanisms, the thread is subjected to a maximum tension with each pulse on the motor. The application of a constant acceleration to the motion table as achieved in the invention spreads the thread stress over the entire acceleration period. More importantly, with the ability to control such motion table acceleration, the acceleration can be adjusted to limit stress within the tolerances of the thread and thus minimize thread break due to tension variations.

The drive controller 12 receives as input a position command, a direction command and a speed command in digital form. (FIG. 2) The direction command determines polarity of current to be applied to the actuator. The speed command determines the maximum running speed of the actuator. The direction and feed rate command data are coded by an analog output board and this is fed to a regenerative DC controller wired to the analog board circuitry. The acceleration rate is balanced to the load being pushed for essentially linear acceleration. This is set by experimentation as explained in an instruction book available from the mentioned manufacturer. During acceleration, the acceleration rate is measured and the DC controller receives feedback from the tachometer in the actuator and causes the controller to adjust the current provided to the actuator to maintain constant acceleration. The controlled and preset acceleration is independent on both the X and Y axes. The deceleration control is of the same type for both X and Y axes and can be preset in the same way. It should also be noted that the X actuator pushes both the X and Y mechanism and therefore must generate more torque to maintain the same acceleration rate as the Y axis and must provide a higher braking action than is provided on the Y axis on deceleration.

In operation, drive controller 12, under computer program command, switches one or both of the drive positioning actuators 250, 260 on as the pattern requires. Drive controller 12 has a counter set to a value equal to the move in thousandths of an inch. For each rotation of 1.8°, the actuator revolution counter feeds back a pulse which in turn decrements the counter until zero is reached. That is, the drive positioning actuator counts off the distance it moves. Obtaining of the desired position for each move is obtained by feeding pulses back from the actuator through an encoder signal conditioner which goes through a logic board and decrements the preset counter down to zero. Additionally, the drive positioning actuators, i.e., the revolution counter, the actuator and the accelerometer, measure the acceleration and feed this back. The drive controller 12 compares actual acceleration against the preset acceleration corresponding to the preset gain and varies the current to hold acceleration a constant as depicted in FIG. 21. In this manner, acceleration and deceleration times are minimized consistent with no overrun. Equally important, the invention circuitry provides means to command a drive positioning actuator motor speed level. With the respective actuator motor sending back 1.8° revolution pulses, the controller times pulse frequency, calculates the actuator motor speed and then modifies current input to meet the command speed value.

It is particularly significant to note that the type of drive positioning actuator and drive controller system described above offers many advantages over prior art stepping motor systems. In particular, the rapidly falling torque with speed characteristic of a stepping motor is no longer a controlling factor. Timed and critically-spaced motor operating pulses are not required as in prior art stepping motor systems, e.g., as in U.S. Pat. No. 4,051,794. Actuator acceleration is not nearly as dependent on motor torque and workpiece mass as before. Also, controlled and uniform actuator motor acceleration and deceleration is now achieved.

LIMIT SWITCH CONSTRUCTION AND OPERATION

Mention has previously been made in connection with FIGS. 7 and 17 concerning the provision of a pair of limit switches 271, 272 for limiting X axis movement of the traveling ball screw mechanism illustrated in FIG. 7 and by means of a separate pair of limit switches, 271', 272', limiting the Y axis overtravel. The mentioned X axis and Y axis limit switches are mounted as previously described and illustrated in FIG. 7 and each is adjustable toward the center of the respective ball screw movement with which it is associated. Thereby, each pair, by their respective placement, limits independently the length of travel and position of that travel on one axis. The two limit switch pairs, i.e., X axis limit switch pair 271, 272 and Y axis limit switch pair 271', 272', thereby define a rectangular area in which the workpiece will be allowed to move. The X-Y axes limit switches are normally closed, single pole units and are wired in series as illustrated in FIG. 17 to a supply voltage from the drive controller 12 and which is arranged such that the limit switch signals are directed to an enable circuit on the drive controller 12. Breaking of this circuit by opening of any of the mentioned limit switches generates through an inverter in the drive controller enable circuit a hold condition which acts to immediately stop the workpiece movement. No command is provided to the sewing heads or to the computer since, if the sewing heads are running, the logic of the fault detection program 92, FIG. 2, will detect the movement failure and respond by shutting down the sewing heads and attempting corrective action as later illustrated in reference to FIG. 27. While rectangular limit switching has been known, it is believe to be unique to provide means for activating a response to the limit switch trippage in the manner described. FIG. 2 illustrates how the limit switches connect only to the drive controller 12 to control the position actuators 250, 260.

Figure 5:
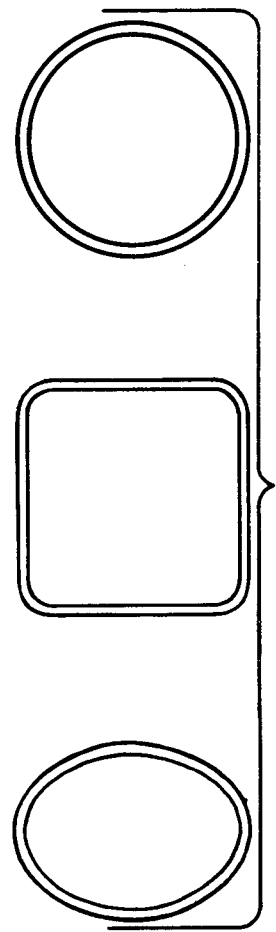
FIG. 5 is a diagrammatic view of various shaped work holders.
Figure 11:
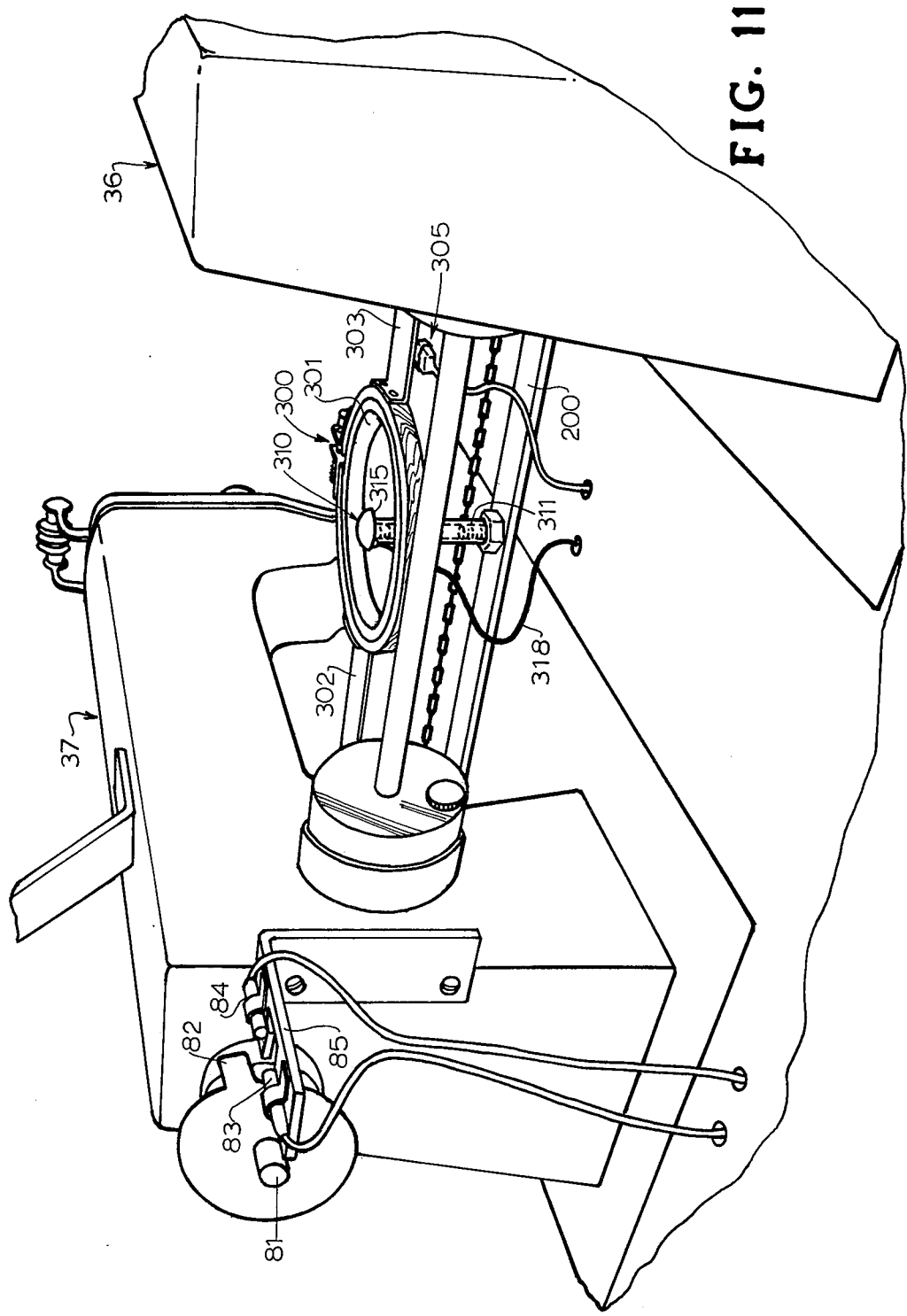
FIG. 11 is a perspective view of a work holder shaped limit switch arrangement employed with the invention.

Embroidery and other profile stitching operations for which the invention apparatus and method are adapted require the employment of nonrectangular-shaped work clamps as well as rectangular-shaped work clamps with typical elliptical, square and circular-shaped work clamps being illustrated in FIG. 5 for reference. The mentioned rectangular limit switches do not fully protect nonrectangular-shaped work clamps or, if adjusted so that they do, prevent usage of some portion of the area within the clamp. A special limit switch is provided which is fashioned from a regular work clamp of the type used on the machine and which could be, for example, either elliptical, square or circular-shaped as illustrated in FIG. 5. Referring more specifically to FIG. 11, this special limit switch 300 is illustrated as a circular work clamp which has been modified to include an electrically conductive inner surface 301 which is electrically isolated from a pair of mounting brackets 302, 303 which support the clamp-shaped limit switch 300 above the workpiece movement system between two sewing heads 36-37 and outside the work area. Surface 301 is electrically connected by a quick disconnect 305 illustrated in FIG. 11 and in the circuit diagram in FIG. 17. A vertical electrically conductive pin or probe 310 is supported on an electrically insulating and flexible tube 311 which is in turn secured at its lower end to Y axis bar 200 as illustrated in FIG. 1. The top head portion 315 of probe 310 is so vertically positioned that this portion will contact the inner electrically conducting surface 301 of the clamp limit switch 300 when a movement extreme occurs. The center point of the probe 310 occupies a position relative to the clamp used in limit switch 300 which position is identical to that relative position of the needle on any sewing head to the actual workpiece clamp on such sewing head. Further, the dimensional cross section of the top portion 315 of the probe 310 is scaled to slightly exceed the cross sectional dimensions of the presser foot 52. A single wire connection 318 (FIG. 17) extends between probe 310 and a control unit 320, also seen in FIG. 17. Control unit 320 is a normally closed, solid state switch which is wired in series with the other limit switches as best illustrated in FIG. 17. Whenever contact between probe 310 and the conducting surface 301 is made, meaning that the presser foot edge has nearly reached the work clamp edge, a signal is generated which breaks the series circuit by opening contacts 321, shown in FIG. 17, after which action proceeds as with the opening of any of the other limit switches shown in FIG. 17. Thus, the described limit switch system provides protection for the plurality of work clamps while allowing full use of the work clamp area regardless of the geometric configuration of the clamp. It will, of course, be understood that the special limit switch 300, which has been described in connection with FIG. 11 showing a circular-shaped work clamp configuration, could partake of any geometric shape that might be employed in any particular stitching operation utilizing the apparatus and method of the invention.

SEWING MOTOR AND NEEDLE POSITIONER CIRCUIT

Figure 35:
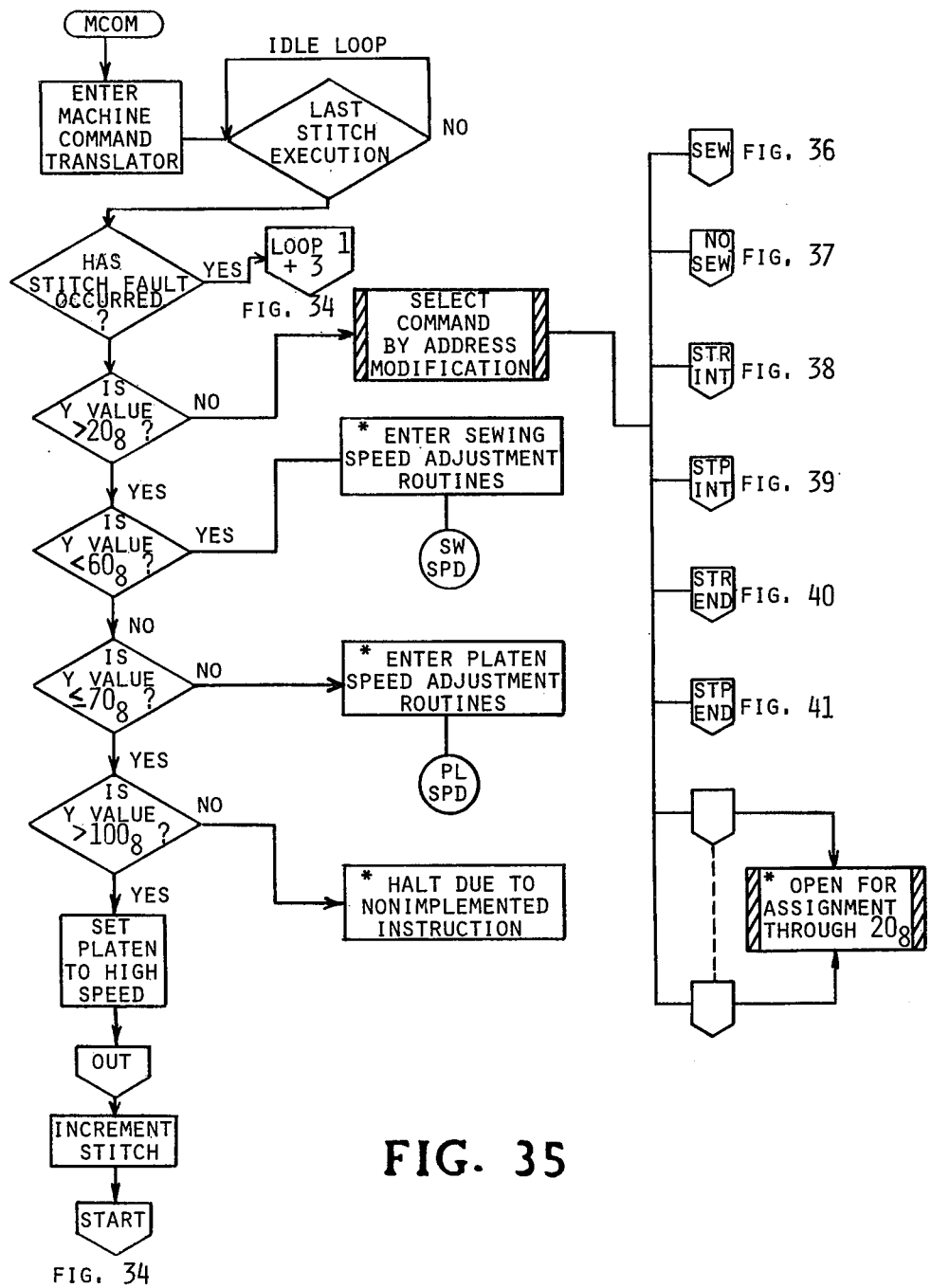
Figure 36:
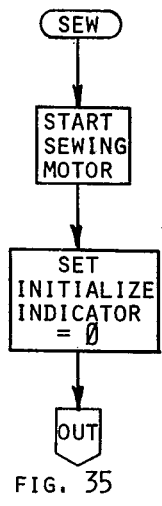
Figure 37:
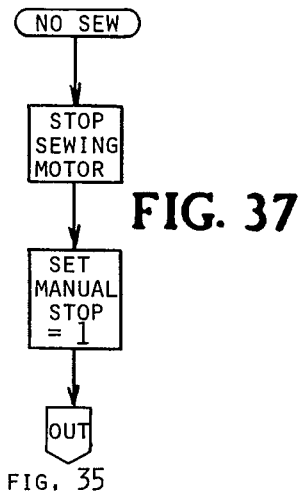

Mention has already been made of the operation of the fault detection program 92 to prohibit any move of the fabric if the needle is in the fabric and this characteristic of the invention program thus provides protection even if the previously described needle position detector 16 fails. This is illustrated by observing that the invention system depends on receiving in sequence the transition of the needle signal from low to high and then from high to low in order to command a single fabric move. It should also be noted that the programmed logic utilized in the invention circuitry interrogates the needle position detector 16 before a move after a stop as illustrated by FIG. 35. Another related operation concerns the need for stopping the needle in the up position or at least out of the fabric on each occasion that a complete stop of the needle is required. The sewing head motor drive and needle positioner circuitry used for this purpose is a somewhat conventional mechanical cam and breaker point relay type circuit as described in FIG. 33.

Figure 33:
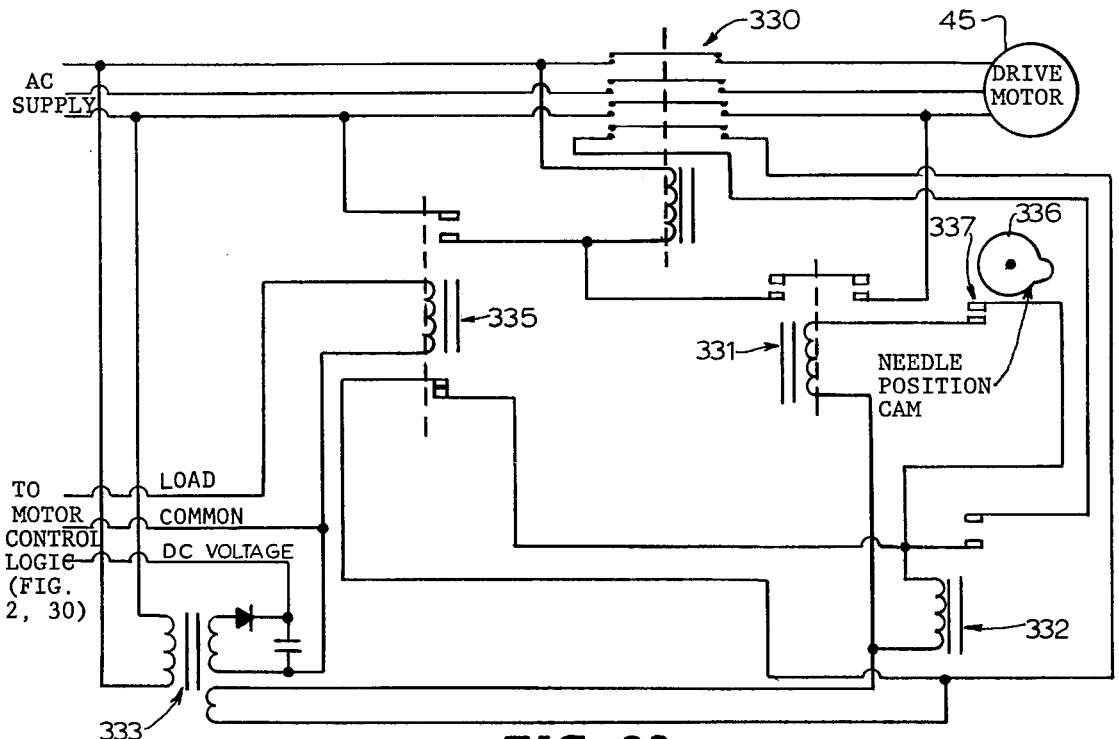
FIG. 33 is a circuit diagram of the sewing head drive control circuitry associated with the circuitry of FIG. 30.

Referring specifically to FIG. 33, the sewing head drive motor 45 is shown connected to a main relay 330, auxiliary relays 331, 332 and 333 and a control relay 335. The contacts illustrated in FIG. 33 as closed are normally closed and the contacts illustrated as open in FIG. 33 are normally open. The needle position cam 336 acts to open and close the set of breaker points 337 on each revolution of the main drive shaft 43. When control relay 335 is energized, main relay 330 closes and motor 45 runs. When control relay 335 is de-energized by computer command from the motor control logic 183 diagrammed in FIG. 30 and relays 332 and 331 cause main relay 330 to remain energized until contact set 337 is mechanically closed by cam 336. Cam 336 is so arranged that closure of such contacts occurs at such a position that the sewing heads will stop with the needle 50 out of the fabric and approximately at top dead center. What is important to be recognized is that if the circuitry of FIG. 33 fails in operation for some reason, the program logic of the invention is so arranged as to recognize that the needle has re-entered the fabric and an appropriate block of X and Y motions will occur until the needle is appropriately positioned. After any commanded stop, program logic interrogates needle position by means of the needle data 510, shown in FIG. 29, basically to insure that subsequent X-Y moves can be safely performed. This needle stop protection is provided in addition to the fault detection logic protection.

COMPUTER AND COMPUTER OPERATION—GENERAL

The digital computer 10 provides, in an integrated unit, all monitoring and control functions necessary to direct the actions of external devices while maintaining a required degree of coordination among them. The overall design of the invention apparatus also lends itself to utilizing a type of memory offering unique advantages with respect to programming, reprogramming and low initial investment.

As best shown in FIG. 2, the computer 10 is divided into three functional areas labeled in FIG. 2 as "Interface Logic", "Memory", and "Processor". All of these areas are served by a common communications channel which in FIG. 2 is identified and labeled as Data Bus 180. Data bus 180 carries signals to and from each device within an area. In all cases, communication is executed between a device and the Central Processing Unit 181 shown in FIG. 2 and which is hereafter designated as the CPU. The functions and operation of each area are now more fully explained with the illustrated embodiment being based on a PDP-8 minicomputer made by Digital Equipment Corporation of Maynard, Mass.

INTERFACE LOGIC—GENERAL

Interface Logic, as herein discussed, is intended to include those necessary circuits (electrical) required to transmit data and/or signals between any external device and the computer data bus 180. This logic contains electrical circuits designated in FIG. 2 as Design Transfer Logic 182 which executes the transfer of movement requirements from the computer data bus 180 to drive controller memory; electrical circuits designated in FIG. 2 as the previously-mentioned Sensor Detection Logic 91 which records the occurrence of sensor detected events; and electrical circuits designated in FIG. 2 as Motor Control Logic 183 that provide signals to start, stop or modify the operational speed of the sewing apparatus. Associated with each of these interface logic circuits are device selectors and function decoders which direct information through the data bus 180 and provide control of the interface logic. While the current embodiment illustrates sensors producing digital signals, it will be apparent that sensors developing analog signals could be employed with a modified interface logic and using the illustrated digital based computer 10.

MEMORY—GENERAL

Memory, as designated here is a form of electronic, random access storage having a plurality of locations capable of storing data "words". In this invention, data words may be the Pattern Storage 184 in FIG. 2, a plurality of CPU instruction sequences called programs or arithmetic constants associated with the programs. Pattern storage is denoted by the block so labeled. The remaining indicated elements of Memory are instruction sequences and the associated arithmetic constants which direct the CPU operations and are labeled in FIG. 2 with titles generally indicating their functional use. These titles as illustrated in FIG. 2 include programs designated Stitch Co-Ord. Translation 185; Pattern Interpretation Program 186, the previously mentioned Fault Detection Program 92; Machine Command Programs 179; Fault Identification and Response Programs 187; Load, Edit and Inquiry Programs 188; Pattern Repeat Cycles Programs 189; and Machine Maintenance Routines Programs 195.

In the described embodiment of the invention, involatile core (read/write) memory has been used which gives programming and reprogramming advantages while retaining program involatility. Volatile solid state read/write memories are also acceptable and especially low power draw types that can be sustained by battery backup for short periods since recovery of memory is a known technique if a mass storage device such as disc storage is attached to the processor. Programmable read only (PROM) or read only (ROM) Memories can also be used. However, any use of PROM or ROM in conjunction with read/write memories must be limited since each application of read only memory would necessarily restrict features of the invention which depend on the read/write capability. Total PROM or ROM memory is, therefore, not deemed desirable for purposes of the invention. The terms PROM, ROM, "core", "volatile", "read/write" are all common terms in computer technology and are defined, for example, in Chapter 4 of the booklet "PDP8/A Minicomputer Handbook", (1976) Digital Equipment Corporation of Maynard, Massachusetts.

PROCESSOR—GENERAL

The Processor area is composed of the computer Power Supply 178, an External Input control unit 190 which receives input from computer compatible devices, including those designated in FIG. 2 as Programming Console 191 and Mass Storage Device 192, a general Input/Output Controller 193 and the previously mentioned CPU.

The CPU is the administrative or switching segment of the computer. Operations performed by this unit are directed by the Memory stored programs noted previously. Such operations may include arithmetic computations, generation and routing of commanded output signals or storage and retrieval of data from random storage and interface devices and are performed by CPU components.

The CPU's program registers, operations registers and state generators provide retrieval and translation of program instructions while maintaining program execution in the required order. The CPU also has means to serialize the control instructions which means that the CPU can execute such instructions one at a time and in some CPU selected order which can vary dependent on the controlling conditions. Details of CPU operation vary slightly from manufacturer to manufacturer but are known to one skilled in computer science. One such CPU is written up in the previously cited "PDP8/A Minicomputer Handbook", and is included here by reference.

INTERFACE—SENSOR DETECTION LOGIC

Figure 54:
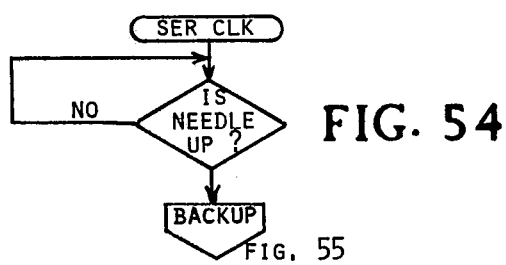
Figure 55:
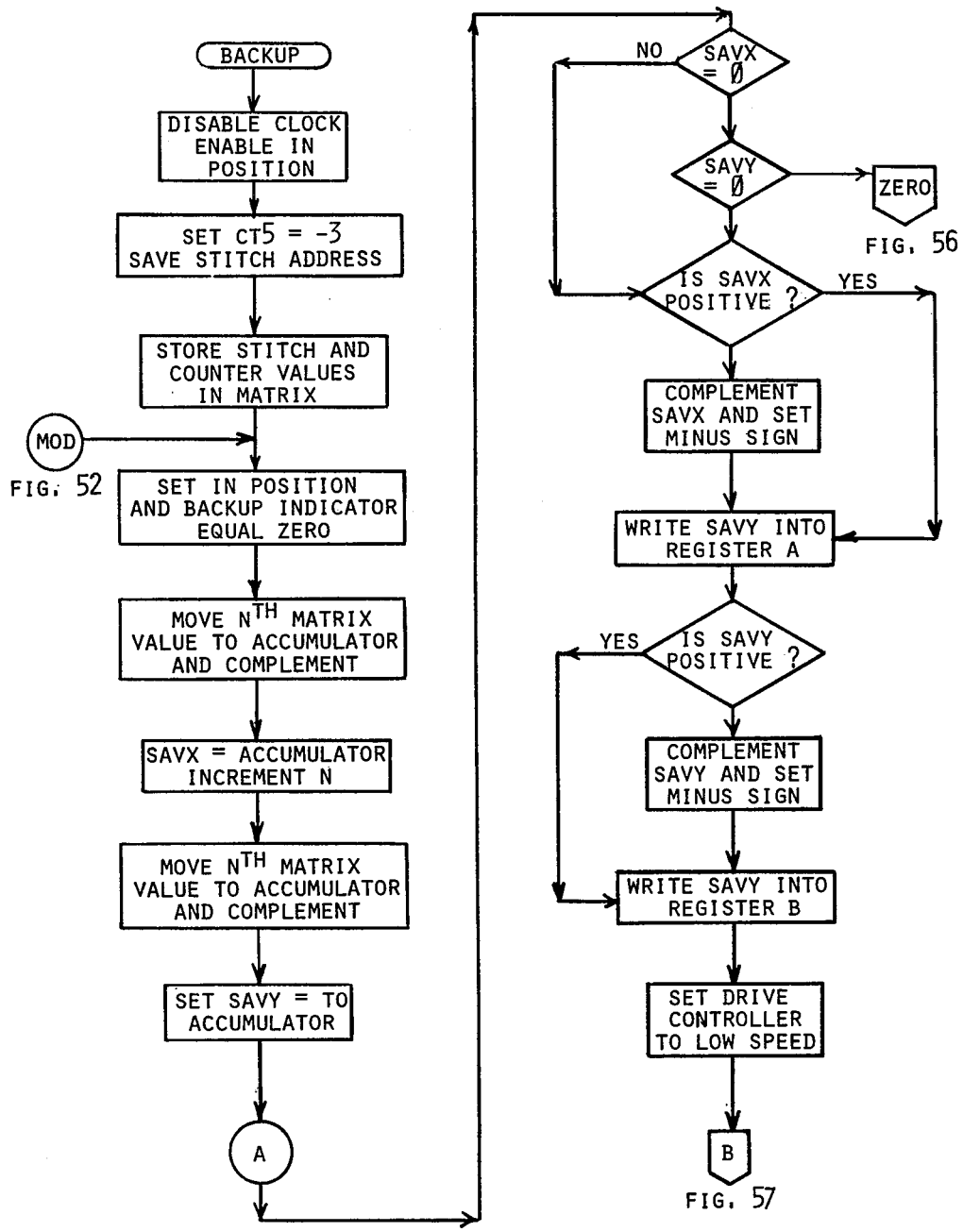
Figure 56:
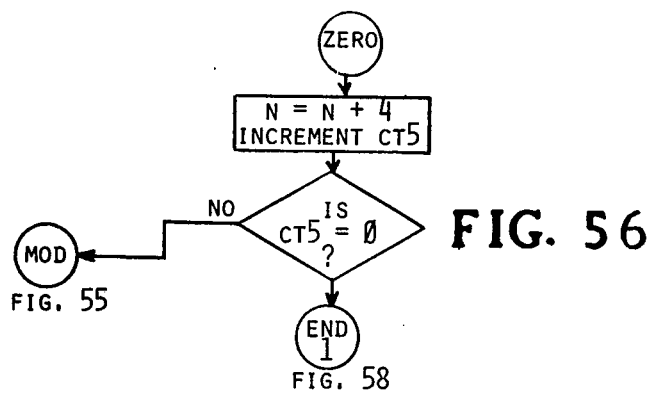
Figure 57:
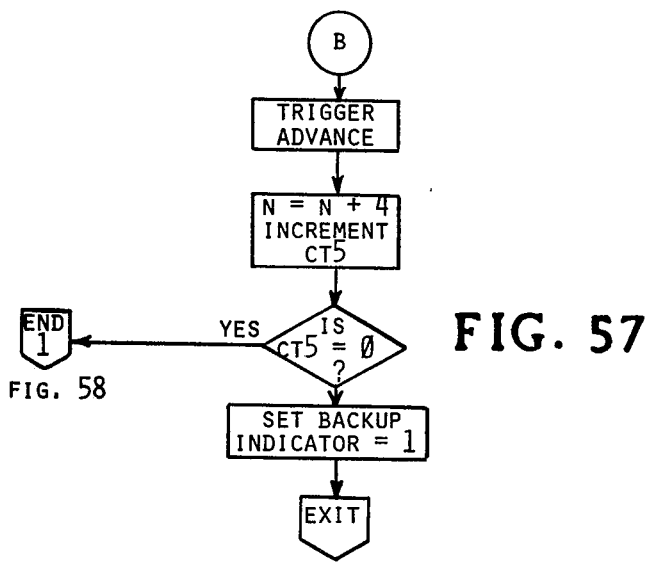
Figure 58:
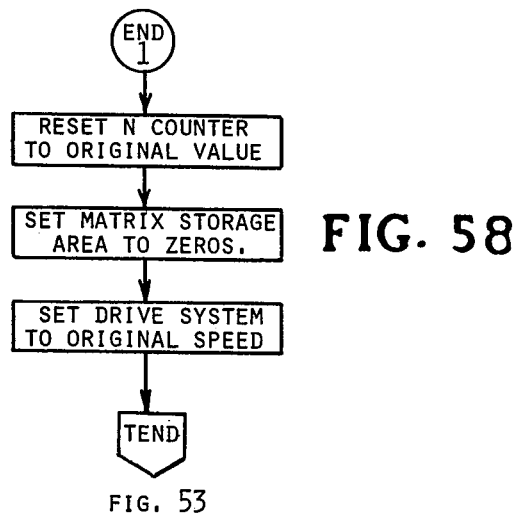

To appreciate the interaction of programmed logic with sensor detection and recognition, it is important to understand the function of the interface logic identified as the design transfer logic 182, the sensor detection logic 91, and the motor control logic 183. Sensor generated signals are recorded directly in the sensor detection logic circuits and have no permanently wired access to other portions of the computer. Subsequent recognition of the sensor signals is determined both in timing and extent by computer originated signals activating a matching logic device for each logging logic device associated with a sensor. As will be seen, control of response has been attained in the present invention by separating the recording of sensor-based signals from the signal recognition of the CPU, the latter condition being attained by program logic control. To maximize this separation, the interface logic circuitry is so constructed that program logic may respond essentially immediately, may delay response while other actions take place or may totally ignore a signal. The inherent flexibility of such an approach over conventional electrical circuitry will become apparent in the detailed explanation to follow. FIG. 54 is an illustrative example.

The design transfer logic 182 of FIG. 2 is shown in electrical diagram in FIG. 28 and the sensor detection logic 91 of FIG. 2 is shown in electrical diagram in FIGS. 28 and 29. These circuits in FIGS. 28 and 29 are diagrammed in accordance with American Standard Graphic Symbols for Logic Diagrams (two-state devices) ANSI Y 32.14—1973, except where specific devices have been labeled to provide additional clarity. While it is believed that with the explanation previously given the circuit functions illustrated in FIGS. 28 and 29 will be understood by one skilled in the art, operation of a representative portion of the sensor detection logic 91 shown in FIGS. 2 and 29 will next be discussed for illustration purposes.

RECORDING OF SENSED NEEDLE EXIT IN INTERFACE

The previously described needle position detector or sensor 16 (FIGS. 1, 2, and 12) is a two-state device. It achieves a logic level positive voltage (hereafter referred to as high) at the time the needle 50 enters the fabric, as illustrated in FIG. 31. This high is maintained until the needle exits the fabric. At needle exit, the needle sensor output voltage drops to approximately zero (or low) and enters the sensor detection logic 91 diagrammed in FIG. 29 via the line labeled "From Needle Position Sensor". This zero or low is maintained until the needle again enters the fabric. With further reference to FIG. 29, as the signal from needle position detector 16 drops from high to low voltage, the output of NAND gate 532 changes from low to high. This high state is imposed on element 546, a D flip-flop labeled "Needle Exit Flag" (NEXF). The needle exit flag 546 sets to a high condition and holds until such time as it is reset to zero, thereby recording the occurrence of the needle exit from the fabric. This example thus illustrates how a sensor signal is recorded. Further description will explain how such signals are recognized by the computer once recorded. Later description of programming logic will illustrate the separate response operation.

CPU RECOGNITION OF THE NEEDLE EXIT RECORD

Before dealing with how the computer recognizes the needle exit signal record specifically, a general explanation will be given of how the computer recognizes sensor signal records. Two methods are available and acceptable in the present invention to determine, via program logic, the occurrence of a sensor signal. The first method involves interrogating, under program control and at a predetermined interval, each of the recording elements in the sensor detection logic 91 diagrammed in FIGS. 2, 28 and 29. Execution speed of the computer makes this cyclic inquiry feasible especially when only one sewing assembly and movement system is being controlled by the computer. However, the extension of the documented program to multiple sets of sewing apparatus, measuring more than one set of plural sewing heads, each executing its own pattern, is recognized and the physical configuration of which is illustrated in FIG. 2A. The extension of the programming for multiple sets operation will be understood from the description otherwise set forth herein. In FIG. 2A, the same numeral designations are used as in FIG. 2 with the following exceptions. Computer 10' represents the same computer 10 modified to contain an additional set of interface logic 182', 91', and 183'. The interface logic illustrated in FIG. 2A essentially represents duplicate sets of the logic shown in FIGS. 28, 29 and 30 for employment with two sets of sewing apparatus, designated A and B in FIG. 2A with corresponding drive controllers A and B. A distinction should be noted of the independent operation of sewing apparatus A and B, in FIG. 2A, as opposed to a simple "slave" arrangement of multiple machines in which one machine tracks or duplicates another. One significant advantage of the invention system is that "slaving" is not necessary, as mentioned in Column 6 of U.S. Pat. No. 4,073,247, to gain additional production of the same pattern. Another and separate advantage obtained by the present invention is that of being able to operate multiple sets of sewing apparatus on different patterns as previously mentioned. In such an application and in the present embodiment, a more time conservative method, termed interrupt programming, is employed.

The interrupt programming and control is next explained and is believed to be unique and novel in many respects. One advantage relates to priorities and handling of priorities which has been previously referred to. In this respect the system of the invention stores priority indicators for the signals in memory. The CPU response analyzes the priorities to determine recognition and establish whether a shift of recognition priority should occur as indicated by flow diagram in FIG. 42. How such priorities are handled will next be explained in more detail as the description of the interrupt routines is explained.

Interrupt programming utilizes a signal line 350 designated in FIG. 29 as the Interrupt Request Line (INTR RQST) and which is directly connected to the CPU to indicate the presence of an external request for service. The interrupt request line 350 changes to low state when any signal is received at a sensor recording element provided both the CPU general interrupt system and the individual device interrupt flag have been enabled by the CPU. On receipt of the interrupt request, the CPU completes execution of its current program instruction, disables the interrupt system, saves the current program instruction address in a designated storage location and switches control to the program logic designated "Interrupt Handler Routines" as seen from the flow diagrams in FIG. 42. These routines poll the sensor detection logic 91 in a predetermined sequence to identify the source of the incoming signal and then, in turn, switch program control to the appropriate fault detection program 92 as illustrated by FIG. 50 for the needle exit. When the fault detection program 92 has completed its function, it returns the computer to the current program as designated by the stored address, enables the interrupt system and resumes current program execution. The servicing of sensor recognition on an occurrence basis provides the necessary computer time to drive multiple sewing apparatus as illustrated in FIG. 2A with two sets of apparatus.

Of special significance is the fact that no circuitry is provided in the sensor detection logic 91 diagrammed in FIGS. 28 and 29 to respond to the sensor signal. Rather, any response is determined by stored program logic directing the activity of the CPU and utilizing CPU-generated signals through independent circuits. Additionally, the CPU can disable any or all devices on the interrupt request line 350 under stored program control thereby allowing selective recognition of sensor originated signals, time delay of such recognition or ignoring of the signal iteself. Thus, the needle exit signal record being used as an example can be handled by any of these three methods, the choice being determined by the prevailing operating conditions.

Refer again to FIG. 29 and assume that needle exit flag (NEXF) 546 has been set high by the occurrence of a needle exit condition as previously described. This high condition of element 546 is thereby imposed upon one terminal of each of the AND gates 555 and 556. If the D flip-flop IEF 547 has been set high by the computer, the second input to AND gate 555 is high and the high is imposed on the NOR gate 561 and passes through an inverter 566. This causes one input to the NAND gate 567 to be set high. Since the other input to NAND gate 567 is permanently high, a low condition is transmitted by the NAND gate 567 onto the interrupt request line 350. This results in the interrupt service previously explained and illustrates an example of a computer directed decision to recognize such an occurrence immediately.

On the other hand, if the D flip-flop 547 has been set low by the CPU, a condition of delayed recognition, the logging of the needle exit signal will still occur at needle exit flag element 546 as previously described. However, only one input to the NAND gate 555 will be high and the NAND gate 555 output will be low. Assuming no other sensor devices are signaling through the NOR gate 561, the output from inverter 566 will be low. With one input low and the other high, NAND gate 567 will output a high condition onto the interrupt request line 350, indicating no interrupt signal. This illustrates selective delay imposed by the CPU as a result of program logic.

The CPU 181 can control the timing of sensor device recognition by setting the condition of the associated Interrupt Enable Flag, IEF 547. If the interrupt enable flag 547 is set high, recognition will occur within microseconds. If it is set low, recognition will be delayed until the interrupt enable flag 547 is set high or until some other interrupt signal of lower priority enables the interrupt request line 350. This latter condition is usually undesirable and is nullified by an additional interrupt control implemented in the Interrupt Handler Routines seen in FIG. 42. The system of device masks employed, and which are shown in the program flow chart documentation in FIG. 42, allows modification of the priority sequence of the Interrupt Handler under program control and prevents undesired recognition of delayed signals.

In addition to choices of immediate recognition or delayed recognition of a particular sensor signal occurrence, there is also the choice to permanently ignore or eliminate the occurrence record. Each pair of D flip-flops associated with a sensor is identified by the computer as a numbered device. In the case of "needle exit", D flip-flops 546 and 547 are identified, in the illustrated embodiment, as Device 32, a computer address. The CPU reaches any desired device through device selectors 500 and 501. These devices are binary to octal decoders whose input is received from the CPU via the data bus 180 in binary arithmetic form and whose output selectively enables a group of circuits associated with the addressed device. For example, when the CPU is directed by stored program logic to perform a function on Device 32, it places on the data bus 180, in this embodiment, a 12 binary bit word. The leftmost three bits are a data bus input/output command. The middle six bits, $\phi11\phi1\phi$, are a binary $32_8$ and are received by device selectors 500 and 501. The binary configurations $\phi11$ causes device selector 500 to output a logical low signal on its number 3 connector to gate elements 503 through 506. Simultaneously, the binary configuration $\phi1\phi$ causes device selector 501 to output a logical low on its number 2 connector to element 505. Gate element 505, having received a low signal on each of its inputs, outputs a high signal to one connection on each of the elements 518 through 521. These elements represent the circuit connectors to the D flip-flops 546 and 547, i.e., Device 32.

The three remaining binary bits on data bus 180 are received by the function decoder 502. The function decoder is another binary to octal decoder. On receipt of a binary $\phi1\phi$ output from the function decoder, connector 2 is low. On passage through the inverter 509, the signal is set high and one input to each of the elements 515, 520 and 524 are set high. Since the device selectors 500 and 501 have raised the input high only on elements 518 through 521, only the NAND gate 520 is triggered and its output becomes low. As a result of the initial bus input/output command, the line B INIT has been activated, one connection of which is to the AND gate labeled 525. Since NAND device 521 is imposing a signal on the second input of AND gate 525, it in turn imposes a signal on the D flip-flop 546. As a result, a signal is placed upon the clear terminal of D flip-flop 546 thereby eliminating the recorded sensor signal occurrence. Thus, there has been illustrated how, by a computer decision, a particular sensor signal occurrence, even though recorded, is eliminated.

The computer addressability has been illustrated by the previously-explained signal ignoring operation. The additional functions of setting or resetting the interrupt enable flag 547, previously noted, and the ability necessary to interrogate all of the needle flags from the interrupt handler system are provided by activating different function codes in the element 502, the function decoder. In the general case, each sensor recording and recognition circuit is a duplicate of the needle exit circuit and is addressed by its specific computer device number. Further, sets of logic circuits comparable to that illustrated in FIG. 29 can be connected to data bus 180 where connections are available.

These details illustrate the unique separation of sensor recording and sensor recognition along with the timing control or ignoring of recognition imposed through program logic by the CPU 181. This unique approach is a basic prerequisite to the fault identification and response programs 187, indicated in FIG. 2, which provide the novel responses to error conditions documented in the program flow diagrams, FIG. 34 to 66, and as illustrated by the foregoing and subsequent description.

DESIGN TRANSFER LOGIC

Unlike previous open loop systems where the movement system runs in direct response to design data, the closed loop system of the invention commences on a single "start" command generated by the computer plus two axes oriented directions extracted from the X-Y pattern data. Actual required position data is transmitted to the drive controller 12 which establishes positional data and the drive positioning actuators 250, 260 are allowed to run until a match is obtained within the drive controller between design data and the actual movement. The physical positioning of the matching circuitry can be other than in the drive controller. In embodiments where a single apparatus is driven, matching circuitry is easily established in the computer and the design transfer logic 182 is not required. In the broader application where multiple sewing units can be driven, the matching circuitry is more conveniently placed in the drive controller 12, as illustrated in FIG. 2, and data transfer is required.

The design transfer logic 182 is shown in an electrical diagram in FIG. 28. It constitutes the circuitry illustrated in FIG. 28 at the top of the drawing as Coordinate Interface, Section 1, and consists of an X coordinate output register 600 and a Y coordinate output register 601. The output registers are connected to the bus receiver 602 and are equipped with gates 603 and 604. The bus receiver 602 serves as temporary storage for computer transmitted information until one of the gates 603 or 604 is selected by the computer causing the transfer of information to the respective output register 600 or 601. Line 607 is activated by the computer "write" command to cause data transfer. Each of these output registers 600 and 601 are directly wired to the matching circuit memory for the appropriate axis in the drive controller 12.

In operation, the CPU 180, under program control, retrieves an X coordinate word from random access memory and transfers the data to the X coordinate register 600. This is accomplished by placing an output code on the data bus 180 which actuates line 3 of the Device Selector and Operation Decoder 605 in the Address and Function Control, Section 3 of FIG. 28, and also actuates line 607. Output from line 3 of the device selector and operation decoder 605 connects through line 615 to the gate 603. Activation of gate 603 causes the parallel transfer of data from bus register 602 into the X coordinate output register 600 and onto the associated lines to the drive controller 12. The operation is repeated when the CPU retrieves the Y coordinate word and activates line 3 of Device Selector and Operation Decoder 606 in Section 3 of FIG. 28. Gating of device 601 and data transfer occurs in the same manner as with device 600.

These transfers of data are parallel transfers of binary arithmetic data, 12 binary bits in size, from the registers to memory units in the drive controller 12. Only one of the 12 bits is used in actuation of the drive positioning actuator for each axis, i.e., X drive positioning actuator 250 or Y positioning actuator 260, and this establishes the direction of rotation. The other eleven bits are used by the matching circuitry to compare against feedback from the drive positioning actuators. Commands to "advance" or "hold" the movement of the drive controller 12 are routed through the Sensor and Control Interface, Section 2, of the design transfer logic 182 in FIG. 28 and are labeled "One Shot Advance", numbered 610, and "Hold Device Flag", numbered 611. They are actuated by program command through the CPU by addressing the Device Selector and Operation Decoder 606 with a binary instruction. Activation of line 617 occurs when a computer commanded 1φφ code is provided to device 606 which, in turn, causes device 610 to transmit an "advance" command pulse to the drive controller 12 thereby initiating X and Y movements. Movement continues until the controller makes a match between previously transmitted data from Coordinate Interface, Section 1, as previously described, and the feedback from the individual actuators 250, 260.

If program logic directs termination of a move prematurely or if it requires disabling of the drive controller 12, drive controller operation can be immediately terminated by imposing on it a hold command from device 611. This is accomplished by a computer directed code 11φ directed to device 606 which activates line 618 and, in turn, sets device 611 on. Device 611 retains this on condition until a computer-directed signal 111 is received by device 606 which activates line 619 and causes the device 611 to be turned off, thus removing the hold command.

As illustrated in the foregoing description, the appropriate X-Y move data has been transmitted to the controller and the advance triggered by device 610. Assuming that no hold condition has been imposed, the controller provides the appropriate polarity current to match the arithmetic signs of the move data to the actuators and they commence the move. At the time feedback from the actuators 250, 260 causes the drive controller 12 to have a match between the commanded and actual moves, the controller generates an in position signal on the axis where the match occurred. This signal is received on line 620 or line 621, in FIG. 28, depending on whether the match was on X or Y. Signal conditioning is obtained by Schmidt triggers 622, 623. Device 624 is an AND gate which outputs a signal into device 625 when in position has been received over both lines 620 and 621. This results in a recording of the in position signal in device 627 in the same manner as previously described for the needle exit signal recording. The matching computer-directed circuitry identical to that described as device 547 (FIG. 29) for the needle exit signal is provided by device 628. For completeness, devices 629, 630 are a second pair of sensor recorders and recognition devices identical to those described for needle exit and receives the start signal. The remaining unnumbered devices in Section 2 of FIG. 28 and which are associated with devices 628–630 are addressing components and interrupt controls previously described in connection with the FIG. 29 circuitry.

Output lines from devices 605 and 606, numbered 631–640, are address functions identical to those previously described. The mating input lines on devices in FIG. 28 are given the same numbers. The output from devices 627–630 are numbered in FIG. 28 as lines 641–644 and actuate the interrupt line 350 in the same manner as described for FIG. 29. Connection to the interrupt line is shown in Address and Function Control, Section 3, of FIG. 28. Lines numbered 633 and 639 represent the computer instruction to interrogate the in position and start devices respectively.

MOTOR CONTROL LOGIC

Motor control as used here refers to control of the single sewing head drive motor 45 and involves off-on switching, speed control and positioning of the motor to correspond with needle position on stop. Needle positioning on stop has already been described in connection with FIG. 33. The type of sewing head drive motor should be adapted to the needs of the application and may be single speed, multi-speed or variable speed in character. The invention system adapts to all three types. Variable and multi-speed motors are commercially available and are two basic types. A typical variable speed motor of the digital type receives a binary digital signal into its controller, usually referred to as a variable clamp speed network and translates this digital signal into a reference signal for the motor. Such a system is employed by both positioning actuators 250, 260 of the table movement system of the present invention. Provision for outputting such a digital signal is contained in the I/O Controller 193 (FIG. 2) and is identical in construction and operation to the output register 600 and its associated circuitry shown in FIG. 28. A digital type multi-speed motor is simply a restricted case of a digital motor of variable speed.

The second type of variable speed motor is one which receives a signal whose voltage is proportional to the received speed. In computer terminology, such as signal is termed "analog" in nature. Provision for outputting an analog reference signal to the motor for speed control has been made in the invention system using a commercially available digital to analog (D/A) converter illustrated on Pages 81–82 in the manual "Logic Handbood—1975–1976" by Digital Equipment Corporation and included here by reference. This board simply functions off the data bus 180 to receive a digital signal from the CPU and outputs an analog signal whose voltage is proportional to the size of the digital input. So far as the program logic is concerned whether an analog or digital type sewing motor is employed, the only change required in the program logic is that of addressing the proper device. The I/O controller 193 is addressed if motor 45 is digital and the D/A converter is addressed if motor 45 is analog. For all motors, including a single speed motor, an absolute off-on switch is desirable. Since this can be used with any type motor, the off-on circuitry is next described.

Modern computers are generally not used directly for high power demand switching. One technique which is employed here is that of using the computer signal to energize a relay which, in turn, switches the high power. Relay 335 in FIG. 33 serves this purpose and is under command of the computer.

Figure 30:
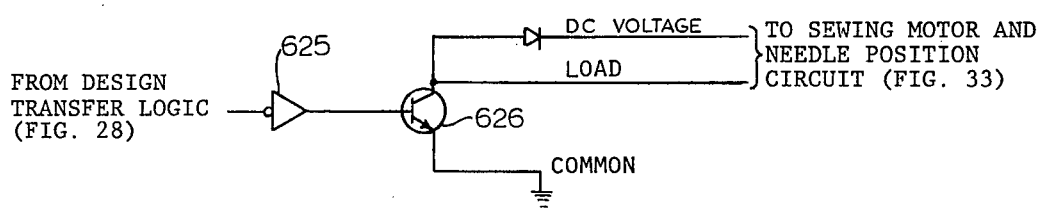
FIG. 30 is a schematic circuit diagram for a portion of the motor control logic illustrated in FIG. 2.

To explain how the computer controls on-off switching of motor 45, reference is again made to FIG. 28. To turn the motor on, the computer places an output command 11φ on device 605 causing an output on line 635 which causes motor device flange 645 to output a 5-volt signal to the motor control logic 183 (FIG. 2) diagrammed in FIG. 30. Referring to FIG. 30, the signal enters the inverter 625 which triggers transistor 626 thereby energizing the relay 335 of FIG. 33 through the three connecting lines shown in FIGS. 30 and 33. Note should be taken that device 645 (FIG. 28) retains the signal without further command and imposes a run state on the motor.

Reference will next be made to the off switching operation. In this regard the CPU imposes an output command 111 on device 605 (FIG. 28) which imposes a signal on line 636 and which acts to reset device 645 to zero. Output from device 645 drops to zero which results in transistor 626 (FIG. 30) opening and thereby de-energizing relay 335 in FIG. 33. As previously described with reference to FIG. 33, motor 45 will continue to run until the appropriate needle position has been attained and then will switch off.

APPLICATION OF MEMORY STORED PROGRAM AND PATTERN DATA

The capability of the invention system to record and recognize sensor signals, to transmit positional data to the drive controller 12, to provide speed data to the actuators 250, 260 and to the sewing drive motor 45 and to switch on and off both drive controller 12 and sewing drive motor 45 has now been explained. The description will next proceed to explaining how the program logic controls the CPU to coordinate and respond to the various elements of the system external of the CPU. Data control operations, termed programs, and pattern storage data reflect the designer commands for the particular pattern to be stitched.

In the following description, the format and structure of the pattern storage will be explained followed by the operation of the stored program logic on the pattern data and sensor based signals. Representative specific operation situations will also be explained.

PATTERN STORAGE

The pattern storage systems in the described embodiment commences in pattern storage 184 (FIG. 2) at storage location 02050 and runs sequentially to the maximum available memory location, allowing room in the present embodiment at maximum configuration for 15,359 stitches, repeat instructions or machine commands. Each instruction in the pattern is held in two consecutive storage locations treated as an "ordered pair". Each "ordered pair" is a command which can take one of the following three forms: (1) a specific instruction to the sewing machine and to a logic module in the computer to commence a specific set of operations, (2) a command to program logic internal to the computer to set up a recurrent pattern of stitches in the number specified by the command, or (3) coordinates of a stitch to be executed. As will become apparent in the subsequent programming description, these three data types can be intermixed at will to obtain desired results in a specific pattern. Examples of all three types will be given from which intermixing will be understood. Input of the pattern data will be discussed in later description dealing with the Edit, Load and Inquiry Programs 188.

| STITCH INSTRUCTION | |
|---|---|
| Location 1 | Location 2 |
| X move in 0.001" | Y move in 0.001" |

Data storage in a binary form, with the leftmost bit in each location a direction bit. In a 12 bit computer this allows positive moves up to and including 2.047" per stitch. Negative values which are stored in 2's complement arithmetic. Maximum negative moves are reduced by 0.512" due to the structure of the repeat command which is now illustrated.

REPEAT COMMAND

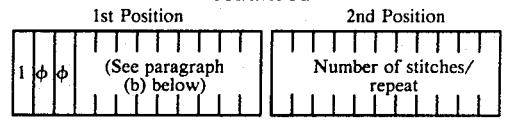

The repeat instruction is recognized by the computer logic through:

(a) a 1ϕϕ in the leftmost three positions of the 1st storage location, and (b) the presence of at least one zero and one 1 in the remaining 1st position storage location contents.

The program logic strips the top three bits from the first storage position and interprets the remaining 9 bits as the number of repeats that are to be made. Since the binary configuration of all zero's and all 1's is excluded, this allows a given stitch pattern to be repeated in a 12 bit configuration a maximum of 510 times by specifying it once. The second storage location indicates the number of stitches to be sequentially included in one repeat. This value may be a maximum of 2047 stitches. Nesting on one repeat within another is not allowed for in the present embodiment through provision for such could be incorporated if desired.

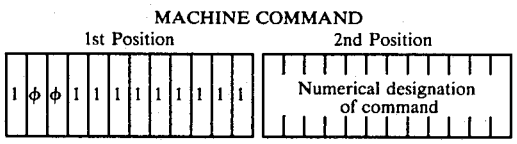

A machine commanded instruction is recognized by the computer logic through (a) a 1ϕϕ in the leftmost three positions of the 1st storage location and (b) all 1's in the remaining 1st storage locations contents.

The program logic interprets the second position value as the identifying number of an instruction to be executed. Upon doing so, it causes the computer program address registers to be modified, resulting in execution of a program logic string particular to the command. Upon completion, it then addresses the next applicable pattern storage location. A maxium of 4095 instructions are allowed in a 12 bit computer. Since each command logic sequence is modifiable by a standard computer language, the programmer can modify or add instructions to utilize features unique to a selected set of sewing heads. In some cases, some additional standard input and/or output hardware may be required to implement these instructions.

ILLUSTRATION OF REPEAT COMMAND

Figure 24:
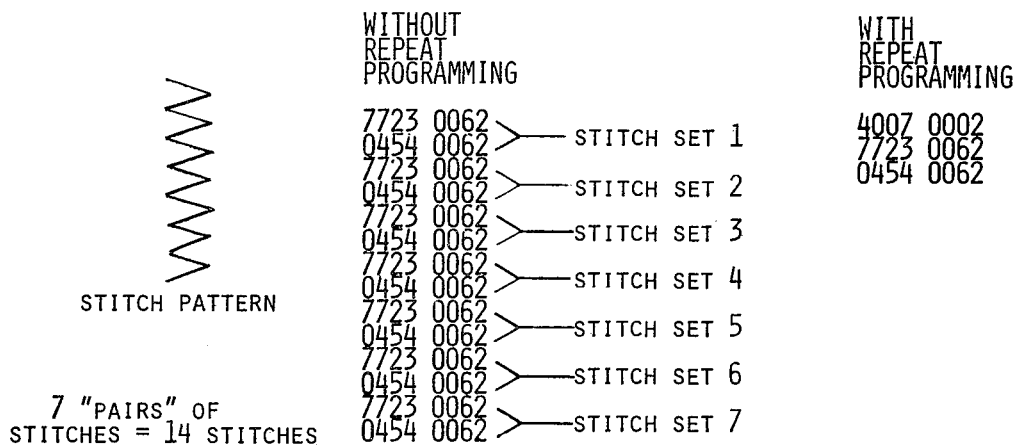
FIG. 24 illustrates a zig-zag stitch pattern and a comparison of the pattern language without repeat program and with repeat program according to the invention.
Figure 25:
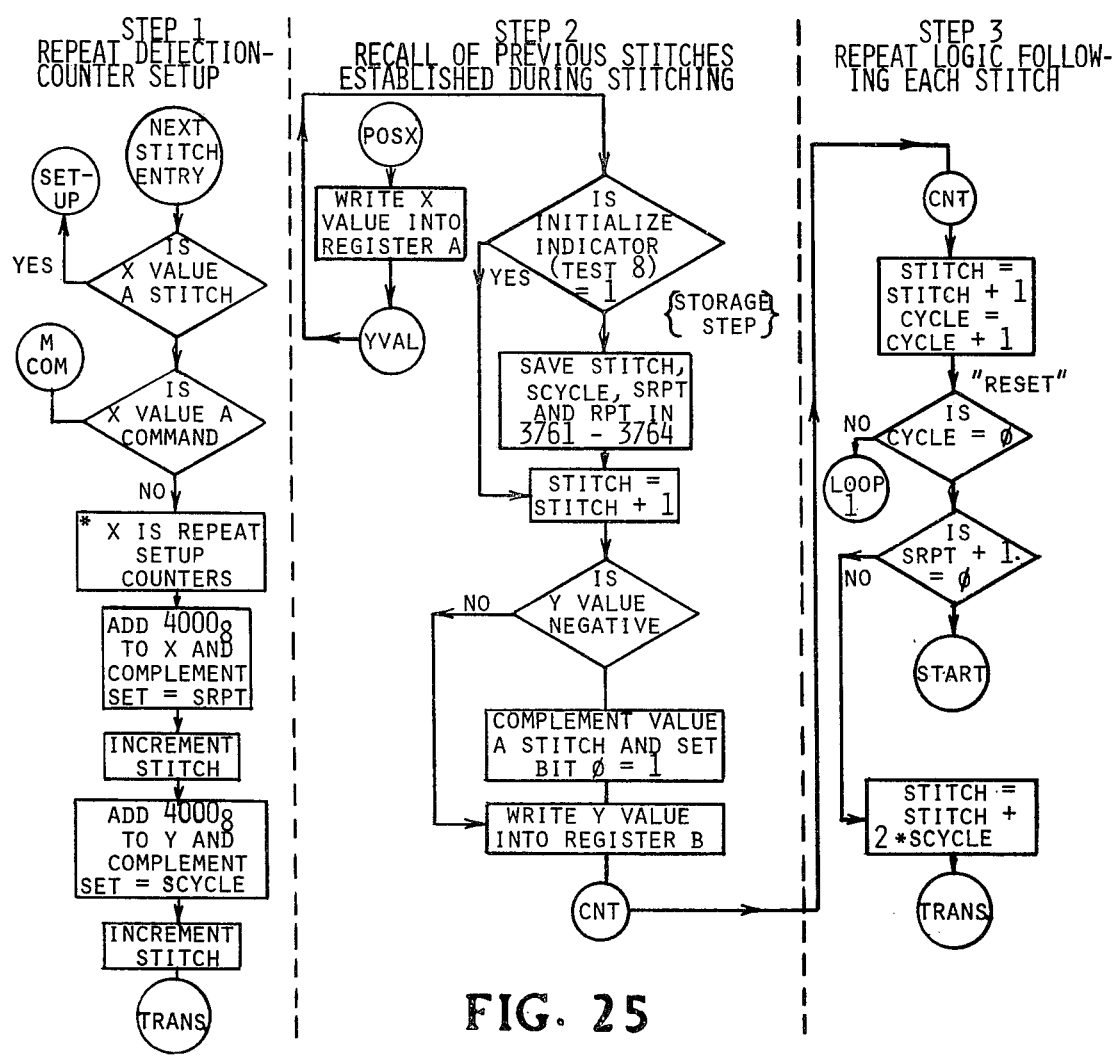
FIG. 25 is a flow diagram illustrating implementation of the repeat programming according to the invention.

A facet of the pattern language illustrated by FIGS. 24 and 25 is the ability to repeat stitches or sets of stitches by a single "repeat" command insertion at any point in the pattern. The command as illustrated in FIG. 24 logically is read "Repeat X times the following sequence of Y stitches" and is written in the X, Y data format as 4XXX, YYYY. These repeat commands are detected by a special program routine during execution of the stitch preceding the repeat command in pattern data as indicated in Step 1 of FIG. 25. Upon detection, control is then passed to a subprogram module as indicated in Step 2 of FIG. 25 which establishes the necessary counters to execute the repeated sequences properly as indicated in Step 3 of FIG. 25 and constructs data storage required to respond correctly if a thread break should occur within the cycle.

The repeat feature illustrated by FIGS. 24 and 25 reduces the data input required from the pattern designer. It significantly reduces the computer storage necessary (in some patterns as much as 90%) either reducing hardware costs or expanding the pattern size capable of being executed by a given investment in computer storage. Finally, the data compaction directly relates to the load time necessary to input a new pattern at a production change thereby converting setup time to productive cycles.

ILLUSTRATION OF NESTED MACHINE COMMANDS

Figure 20:
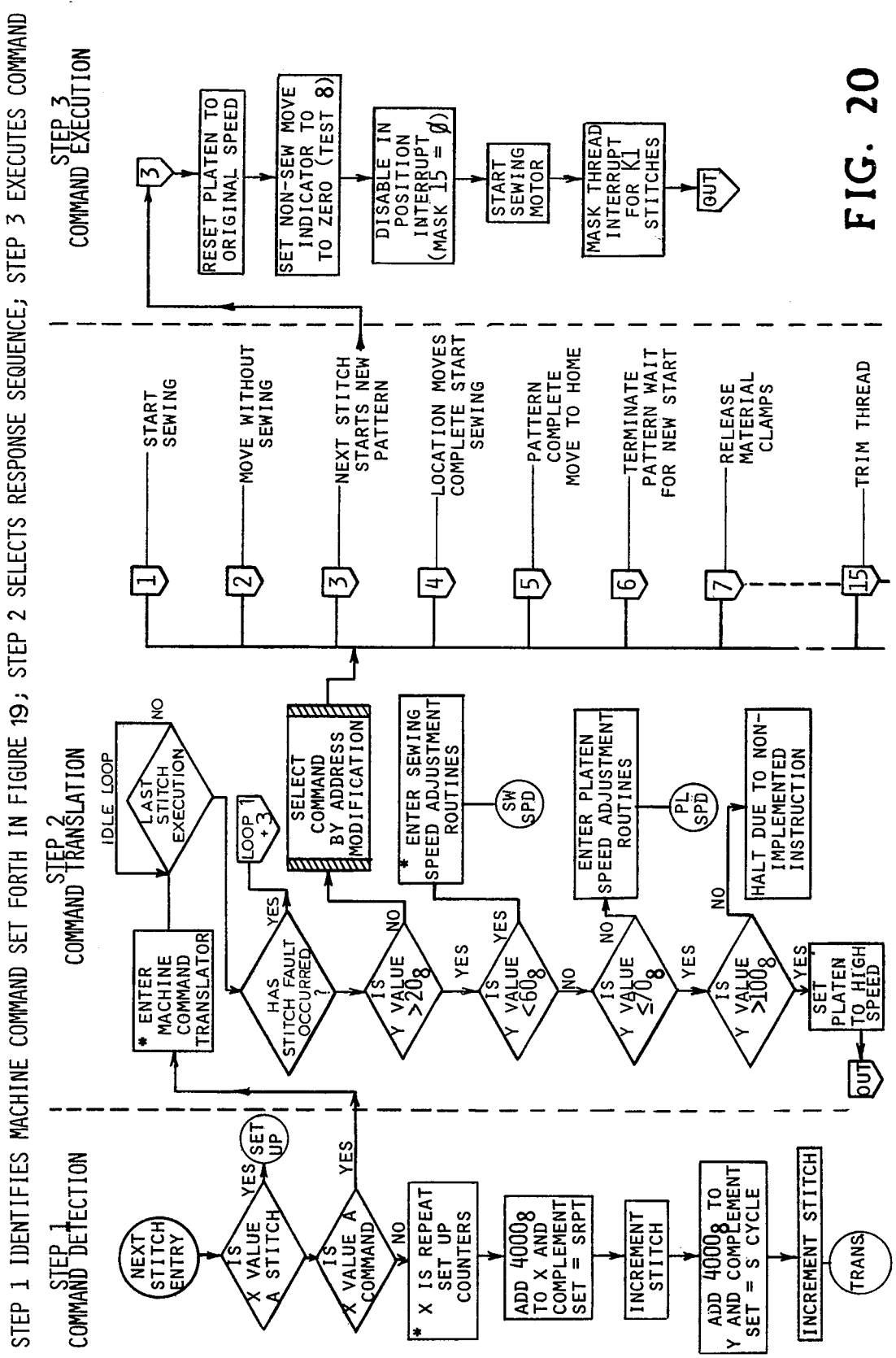
FIG. 20 is a flow diagram illustrating how a machine command is identified, a response selected, and a command executed.

The versatility of the previously described pattern storage language is utilized by the pattern builder who is allowed direct access to each machine control through the structure of machine commands. An example is illustrated in FIG. 19 of a machine command nested in stitch data and in FIG. 20 in a flow diagram the detection, translation and execution of such a command. Interspersed machine commands as illustrated by FIGS. 19 and 20 are in the same X, Y format as stitch data and therefore may be intermixed with pattern data. A special program routine indicated in Step 1 of FIG. 20 detects the presence of command data during execution of the stitch preceding it in the pattern and transfers control to a machine command translation subprogram indicated as Step 2 in FIG. 20. This subprogram selects the proper logic sequences to be executed and executes them within the stitch cycle as indicated as Step 3 in FIG. 20. Note should be taken of the depth of machine commands available and the allowance made for adding additional user constructed commands.

OVERVIEW OF PROGRAM OPERATION

The description has dealt thus far with those features of the invention system related to communication functions of the computer and in the immediately preceding description with the designer communication language for patterns. The description will next deal with the stored program logic which controls the CPU and provides system coordination.

As a guide in interpreting the illustrated programming, it may be noted that the operating logic provided through computer programming is divided into three basic sections: a pattern data translator with subprograms, a stitch sequencing and transmitting module and a sensor detector and associated fault response subprograms as illustrated by the system diagram of FIG. 2 and the flow chart diagram in FIGS. 34-66.

During normal sewing operations, a stitch sequencing counter in memory provides the next pattern data storage location. Data in this pair of locations is reviewed by the pattern data translator during the completion of the preceding stitch. Detection of a machine command nested in pattern data causes transfer of program control to a machine command identifier routine which, in turn, selects the appropriate subprogram response. After execution of the selected command subprogram, the sequencing counter is incremented and review starts again at the pattern data translator section.

Detection of a "repeat" command causes the pattern data translator section to construct a temporary stitch sequencer in memory from the Y coordinate value of the pattern data and a sequence repeat counter in memory from a translated value of the X coordinate data. These counters modify program control sequences and control execution as would a Fortran "Do" loop until reduced to zero. Control is then returned to the normal stitch sequencing counter and review starts at the pattern data translator section.

The stitch sequencing and transmitting section assumes control upon a detection of pattern coordinate data. Upon receipt of an in position signal from the drive controller 12 and a signal that the needle has entered the fabric, the translated X and Y coordinate values are transmitted via the design transfer logic 182 to the drive controller. At the needle exit signal, the move command is transmitted to the drive controller and the stitch sequence counter updated. Coordinates of the commanded move are stored in a revolving 3×4 array in case backup for repair is required, sequence repeat and temporary stitch counters updated if necessary and control returned to the pattern data translator section. Note may be taken that if the needle position detector 16 fails, the sequential appearance of needle entrance, needle exit would not occur and therefore no further moves would be commanded by the CPU.

To insure appropriate response time while the sewing device is running asynchronously with respect to the X-Y motion table, the sensor detectors function from the computer interrupt system. Detection of any sensor signal immediately results in computer control being given to the sensor detector subprogram. It scans the sensor in predetermined priority sequence to determine the signal source and transfers control to the appropriate subprogram. Each subprogram provides a normal response condition when the detected sensor response is anticipated by previous conditions and one or more fault responses which assume control when sensor conditions are abnormal, e.g., occurrence of a stitch fault signal at "TDC" on the sewing devices. Control is retained by the fault response subprogram until all conditions are satisfied and then returned to the pattern data translator section. "TDC" as used means "Top Dead Center".

Machine command and fault detection subprograms used depend upon machine hardware and user application. Provision has been made for expansion of each type where user needs dictate.

NORMAL SEWING OPERATIONS AFTER START-UP

Figure 34:
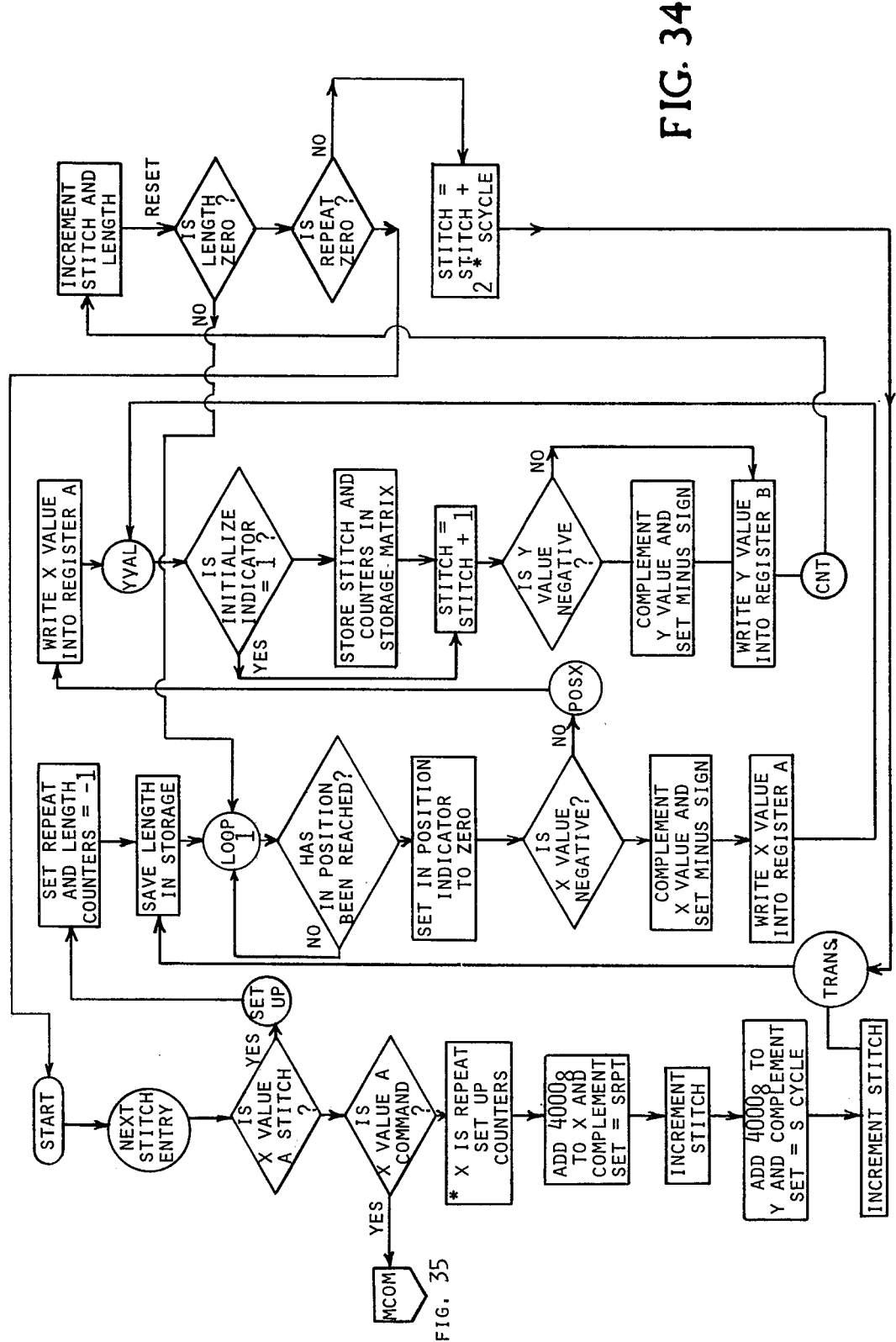

To illustrate a normal sewing operation, reference is made to FIG. 34. It will be assumed that the actuators 250,260 are moving, that the needle is out of the fabric, that the sewing machine motor is running, and that the stitch counter in memory is pointed to the next required pattern data storage. At this point, control has been given to the pattern data translator section indicated by the symbol START in FIG. 34.

Assuming the pattern data storage locations contain a set of stitch coordinates, program logic control passes to the section labeled SETUP, then checks to see that in position has been reached from the previous stitch. If an in position signal has not been attained, program execution will delay at this point. When the in position signal is recorded in the interface, FIG. 28, a signal will be originated on the interrupt request line 350 causing the computer to interrupt operations on the logic of FIG. 34 and switch control to the fault detection program shown in FIG. 42. As will be seen from such flow diagram, identification of the signal as in position will switch control to the fault response program SER INP in FIG. 52.

Assuming all previous sewing stitches had been successfully completed, this routine in FIG. 52 merely sets the in position indicators, disables the in position interrupt system and returns to the main program illustrated in FIG. 34. This interrupt then has established that the previous move is complete and that the drive controller 12 is prepared to accept the next required move. Since the in position has been received, the computer enters the stitch coordinate translation program in FIG. 34 and transmits through the design transfer logic 182 the next stitch coordinates to the drive controller 12.

The stitch counter in memory is next incremented to point to the next pattern data pair and program control begins again at the pattern data translator section and continues until the in position delay is again incurred. The next occurrence is the occurrence of a needle entrance interrupt which causes control again to be transferred to the fault identification routines in FIG. 42. This routine identifies the interrupt as a needle entrance signal and switches control to the FIG. 48 program which verifies that the previous move has been successfully completed, verifies that the thread break protection is established and returns the control to the in position delay portion of FIG. 34. This delay will continue until a needle exit signal occurs, at which time control is again passed to the program of FIG. 42 and subsequently to the fault response program SER NUP in FIG. 50. This routine establishes that no previous errors have occurred, instructs the drive controller 12 to commence the move previously transmitted to it, saves the data from the stitch just completed in case backup is required, re-enables the in position interrupt and returns to the delay portion of the program. The described cycle is repeated for each commanded stitch that is completed in a normal manner.

Figure 26:
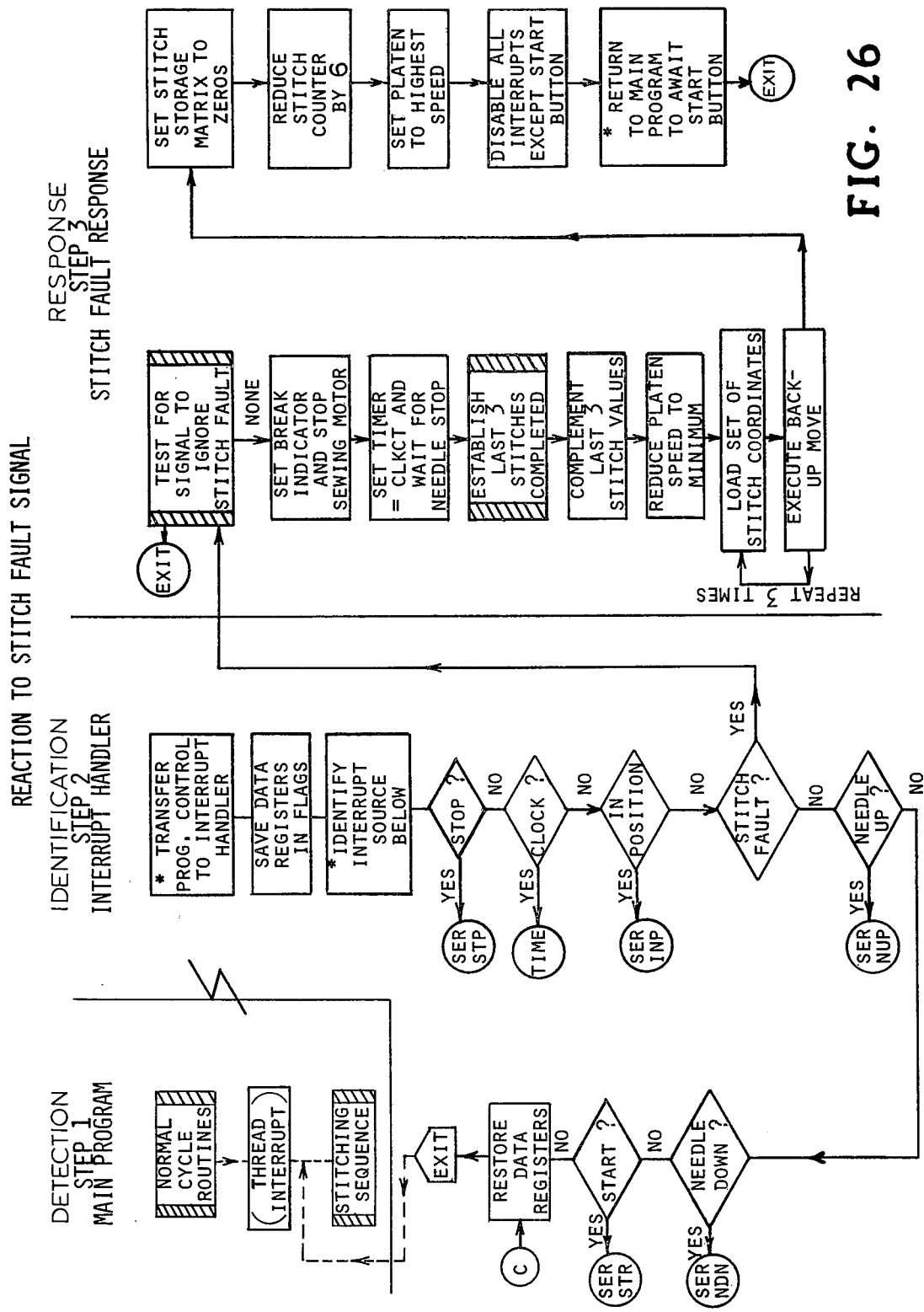
FIG. 26 is a flow diagram illustrating reaction to a stitch fault signal.
Figure 27:
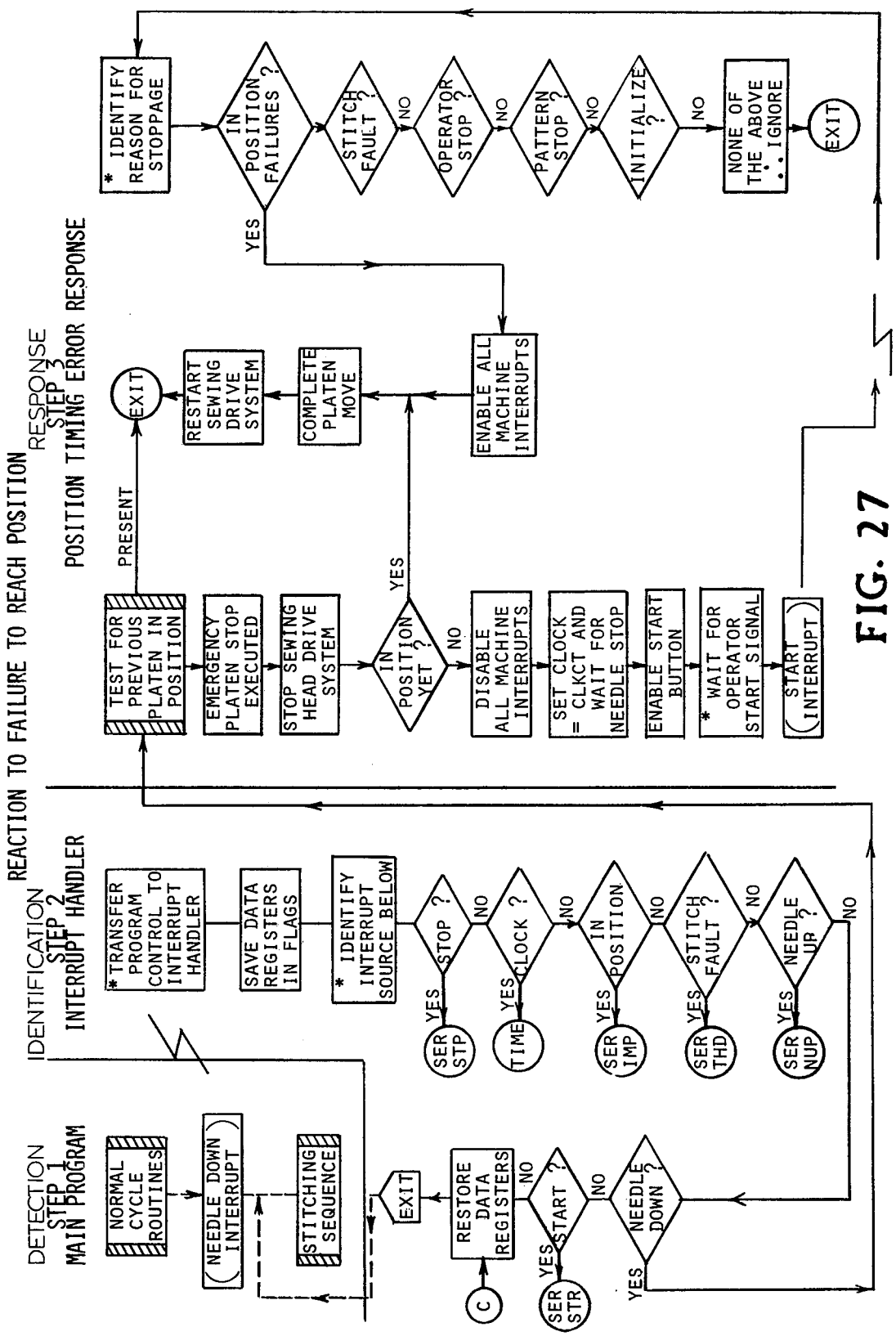
FIG. 27 is a flow diagram illustrating programming for reaction to failure to reach position.

Normal sewing performance is considered by the program logic to be an in position signal, followed by a needle entry signal, followed by a needle exit signal, and in this order and without an intervening stitch fault signal. It will, of course, be understood that the flow diagrams, FIGS. 34–66, provide descriptions of various fault responses as well as command and repeat structure identification. Segments of the flow diagram have been extracted to illustrate by example such responses. These are shown in FIGS. 26 and 27, dealing with fault responses and in FIGS. 20 and 25 dealing with identification from the pattern data of repeat and command structures.

ILLUSTRATIONS OF RESPONSE TO ABNORMAL SEWING CONDITIONS

Figure 43:
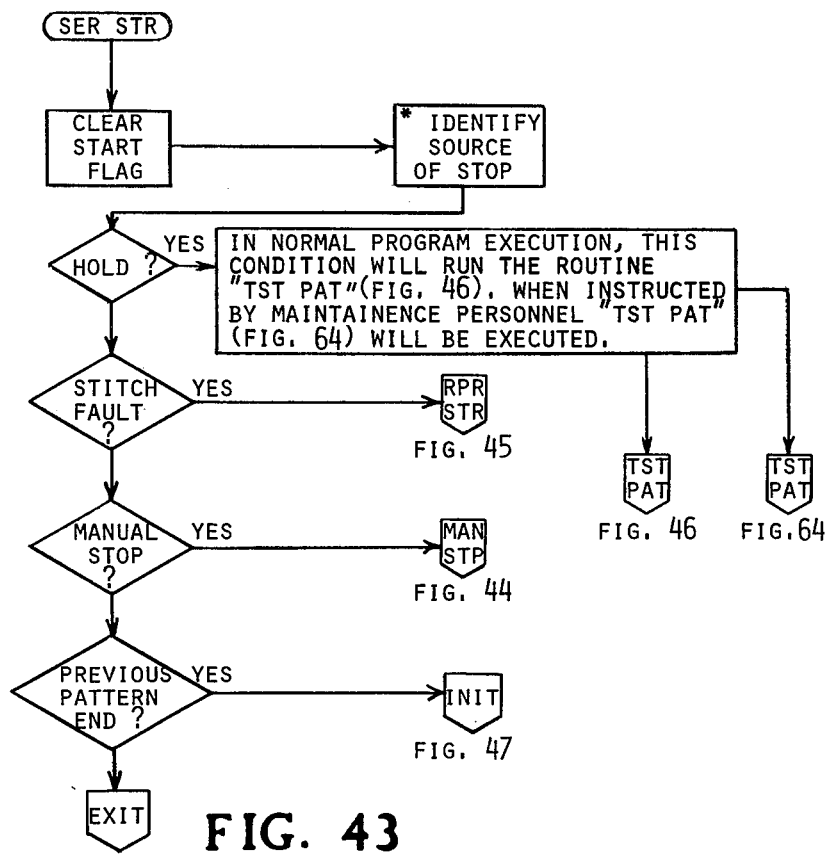
Figure 44:
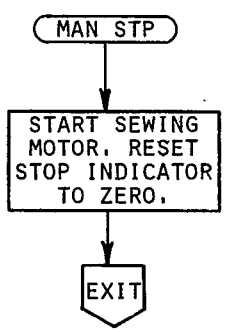
Figure 45:
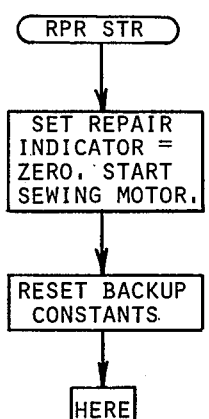
Figure 46:
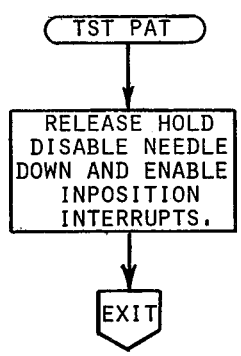

Receipt of a needle entry signal in the absence of an in position signal indicates to the computer that the previous move has not been successfully completed during the time the needle was out of the fabric. As illustrated in FIG. 27, the needle entry signal causes control to be passed to the interrupt handler which identifies the signal as needle down and transfers control to the needle down service routine indicated as Step 3 in FIG. 27. This routine establishes that the in position has not been received, executes an emergency stop of the drive controller 12 by initiating the hold device 611 (FIG. 28), stops the sewing motor 45 and checks again to see if the in position has been attained. Approximately forty-two millionths of a second passes during these transactions. If the in position has been attained during such period the program logic judges this to be an inconsequential movement failure and after a program delay removes the hold on the drive controller 12, restarts sewing motor 45 and continues normal sewing. If the in position has not been received, all sensor recognition interrupts are turned off. A programmed delay of approximately one second is executed to allow the sewing heads to stop and the needle data device 510 (FIG. 29) is interrogated to see if the needle is out of the fabric. If not, all operations will cease until the needle is manually withdrawn. If it is, the computer will enable the start button interrupt only and will await an operator-initiated start signal. Without extensive detail, the flow chart diagram in FIG. 43 illustrates that the start button response would recognize that a failure to reach position had occurred and would switch control to a routine TST PAT shown in FIG. 46. This would attempt to complete the move and if done successfully, sewing would resume. If not successful, total shutdown of the system would occur.

The clock used in the system to time delays such as those used to allow the sewing heads time to coast to a stop is a commercially available device specified by Digital Equipment Corporation as a portion of the DKC8-AA option board, page 1–3 of the PDP8/A Minicomputer Handbook (1976). This unit, when activated, provides one pulse every ten milliseconds. These pulses are monitored by program logic illustrated in FIG. 53 of the flow diagram. The routine reacts when the pulse count has reached a program determined level.

Referring next to FIG. 26, assume that a stitch fault interrupt has occurred. The interrupt would again cause transfer of control to the fault identified program shown in FIG. 26 as Step 2 and after identifying it as a stitch fault would switch control to a stitch fault response illustrated as Step 3 in FIG. 26. After assuring that a previous instruction to ignore a stitch fault had not been issued, this routine turns off all sensor interrupts and stops the sewing motor 45. A one second delay is then imposed and the needle data device 510 (FIG. 29) is again interrogated to insure that the needle is out of the fabric. Since one or more machines will still have intact thread, the computer then reduces the X-Y drive system to minimum speed to prevent further thread breaks and then recalls the last three stitches previously executed. The moves are reversed from the previous execution and the drive controller 12 is instructed to back up at low speed and make these reversed moves. When this has been completed, the X-Y drive controller 12 is set to its original speed, the start button is enabled, the stitch counter in memory is reduced to correspond to the current position of the needle, and the computer awaits an operator initiated start signal. When the start signal is depressed following rethreading of the needle, the fact that the stoppage was caused by a thread break will be recognized by the FIG. 43 routine and the break will be repaired by reusing the backed-up stitches through the RPR STR routine in FIG. 45. Normal sewing will then recommence automatically.

While it may be recognized in a multiple head machine that those heads on which the thread did not break are sewn twice by this procedure, stitch registration on the high precision motion table employed essentially laps on stitch over the top of the other. For practical purposes, the repair is invisible.

Other fault responses are illustrated in the flow diagram of FIGS. 34–66 and will be understood by those knowledgeable with programming in view of the foregoing examples and description.

INITIAL START-UP PROCEDURE

Figure 47:
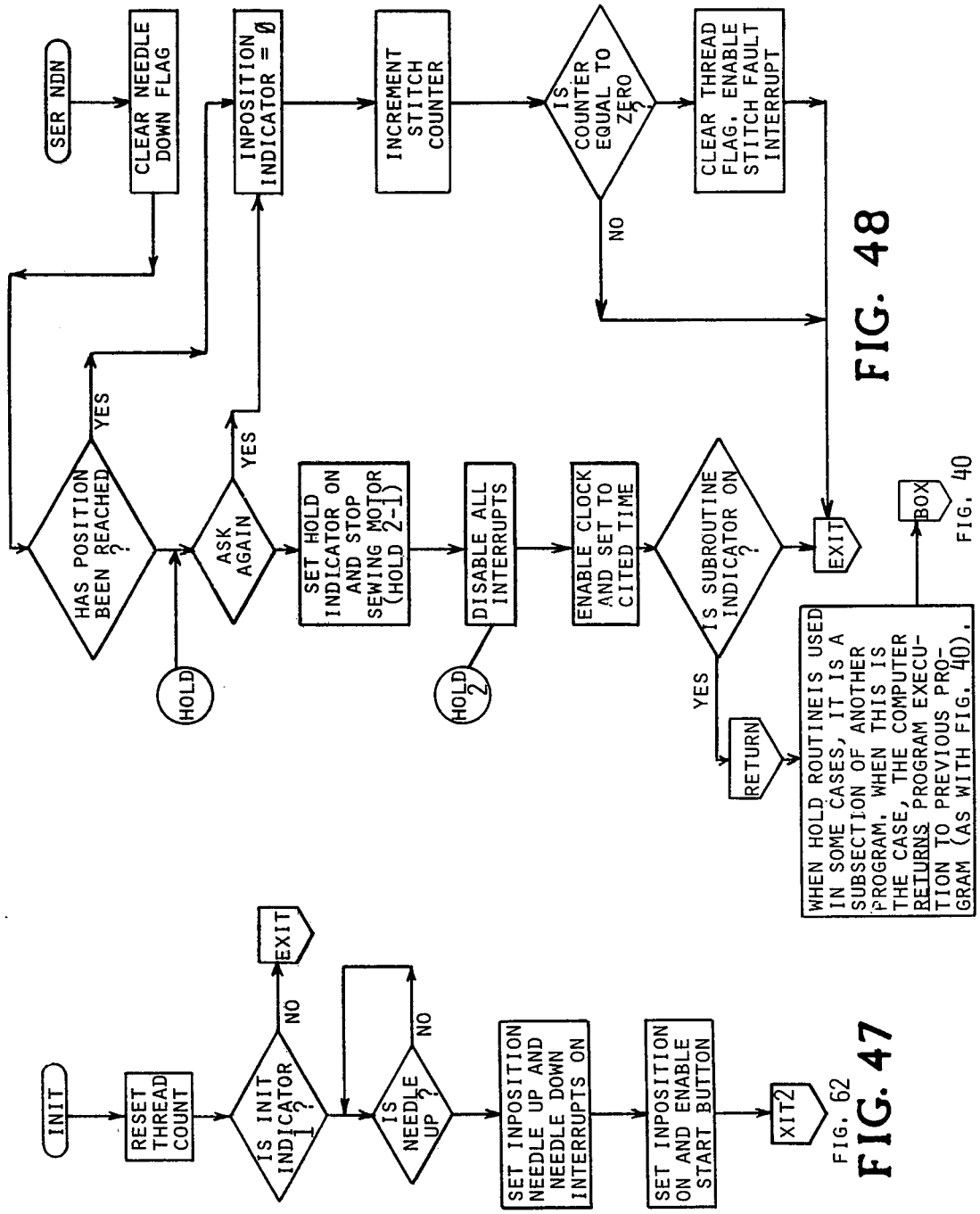
Figure 53:
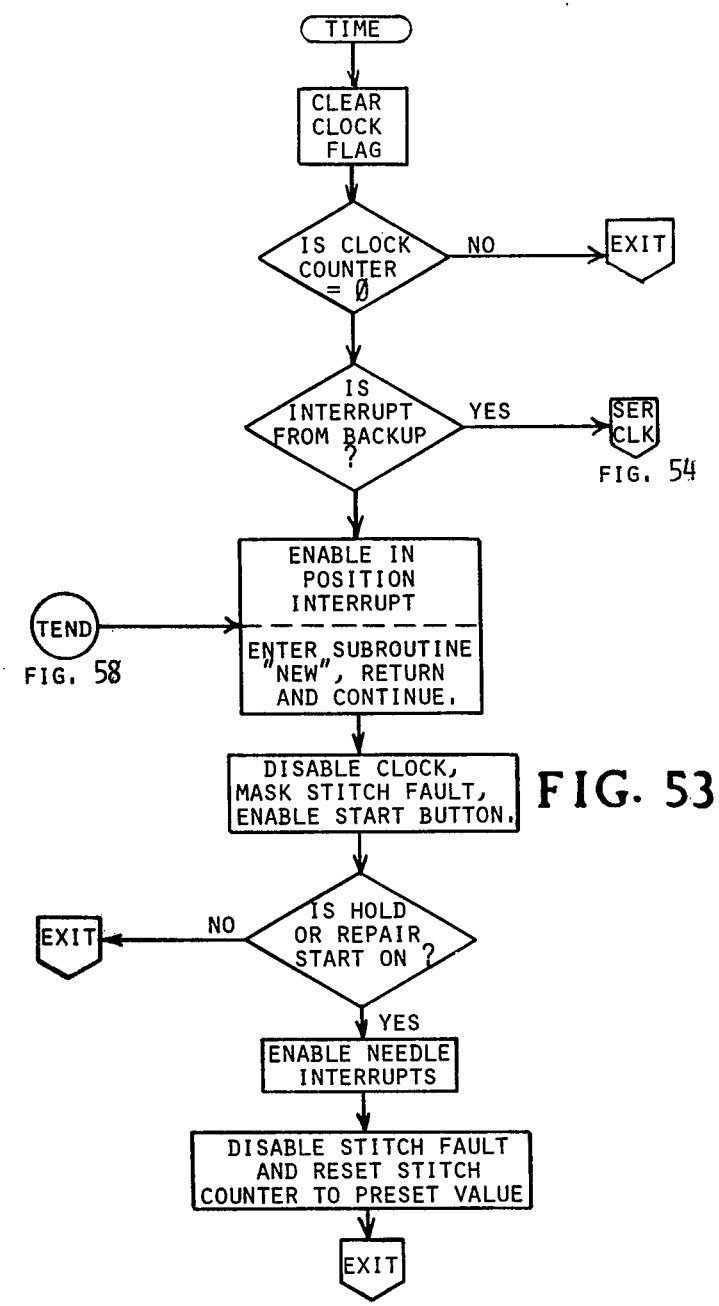
Figure 66:
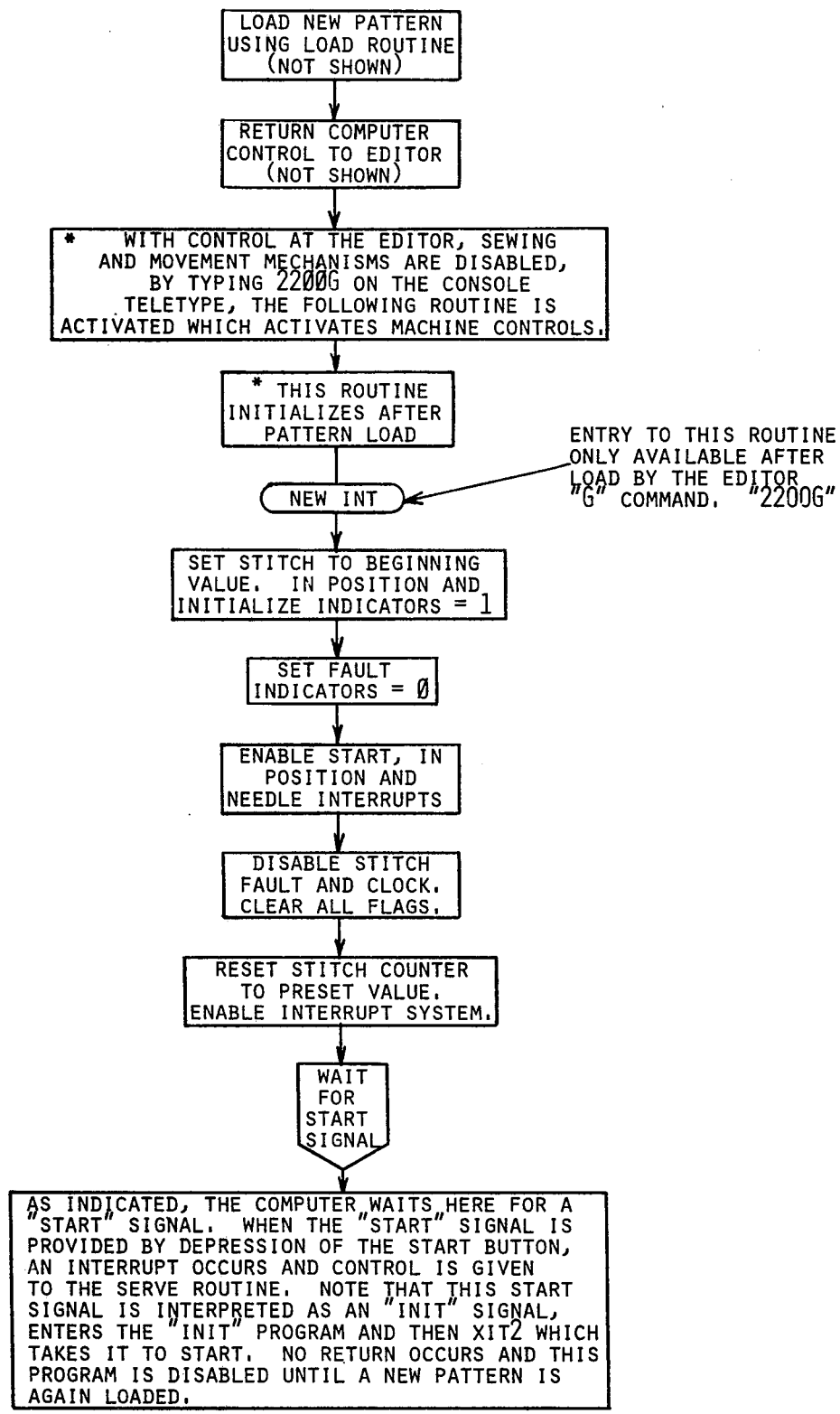

If a pattern has been run and completed immediately prior to a particular start, depression of the start button will result in the program of FIG. 43 identifying this as a second or greater run of the same pattern, will switch control to the flow diagram of FIG. 47, reset all indicators to zero, reset the stitch address to the beginning of the stored pattern and execute the opening move commanded by the pattern data. Control then returns to the pattern data translator section of FIG. 34. If a new pattern has just been loaded, all controls are disabled and the computer is under control of the Edit routine 188. Initialization is accomplished as shown in FIG. 66 by typing a selected code, e.g., 22φφG, on the console teletype 25 seen in FIG. 1 and the FIG. 66 routine initiates pattern execution as indicated.

FAULT IDENTIFICATION AND MAINTENANCE AIDS

Figure 64:
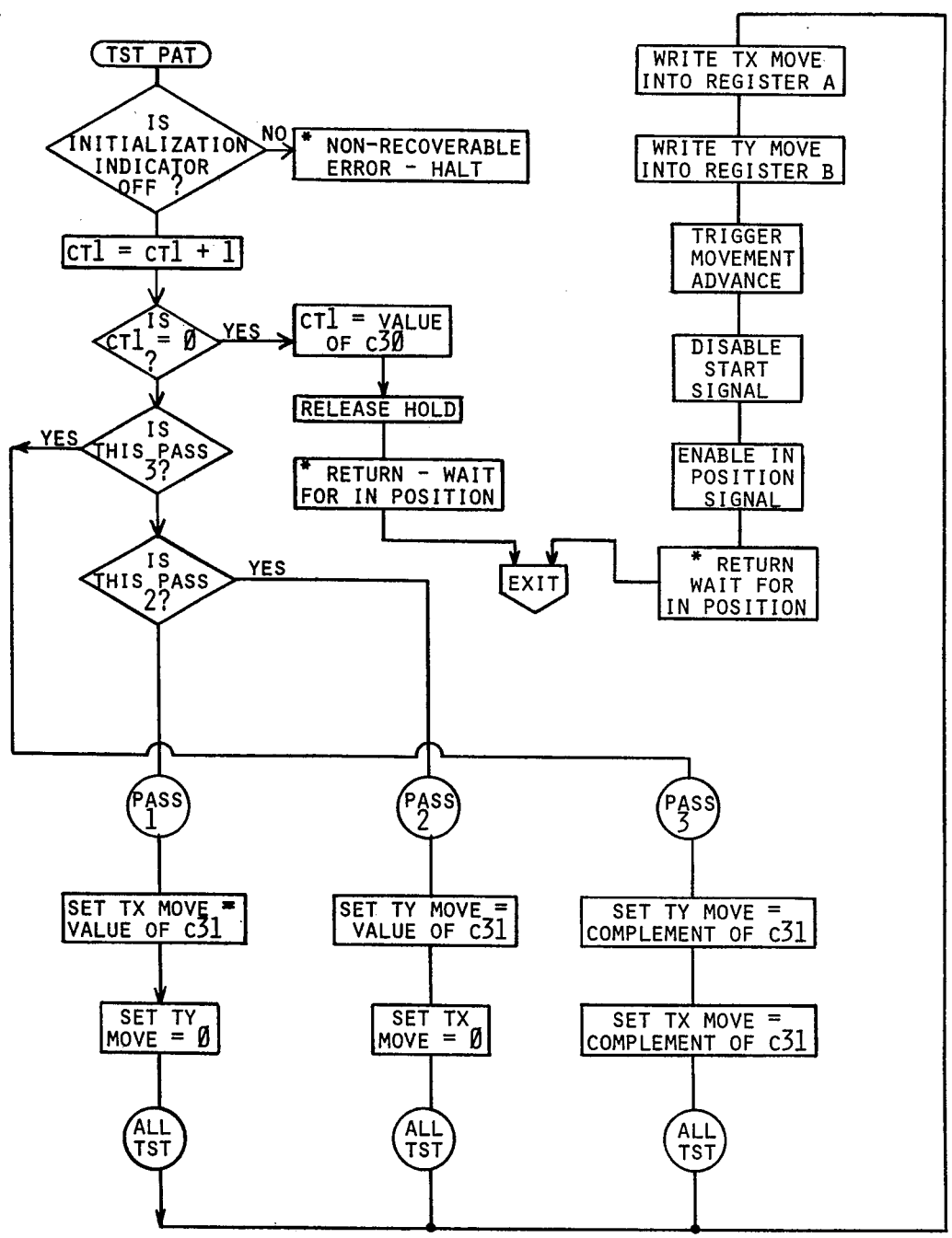
Figure 65:
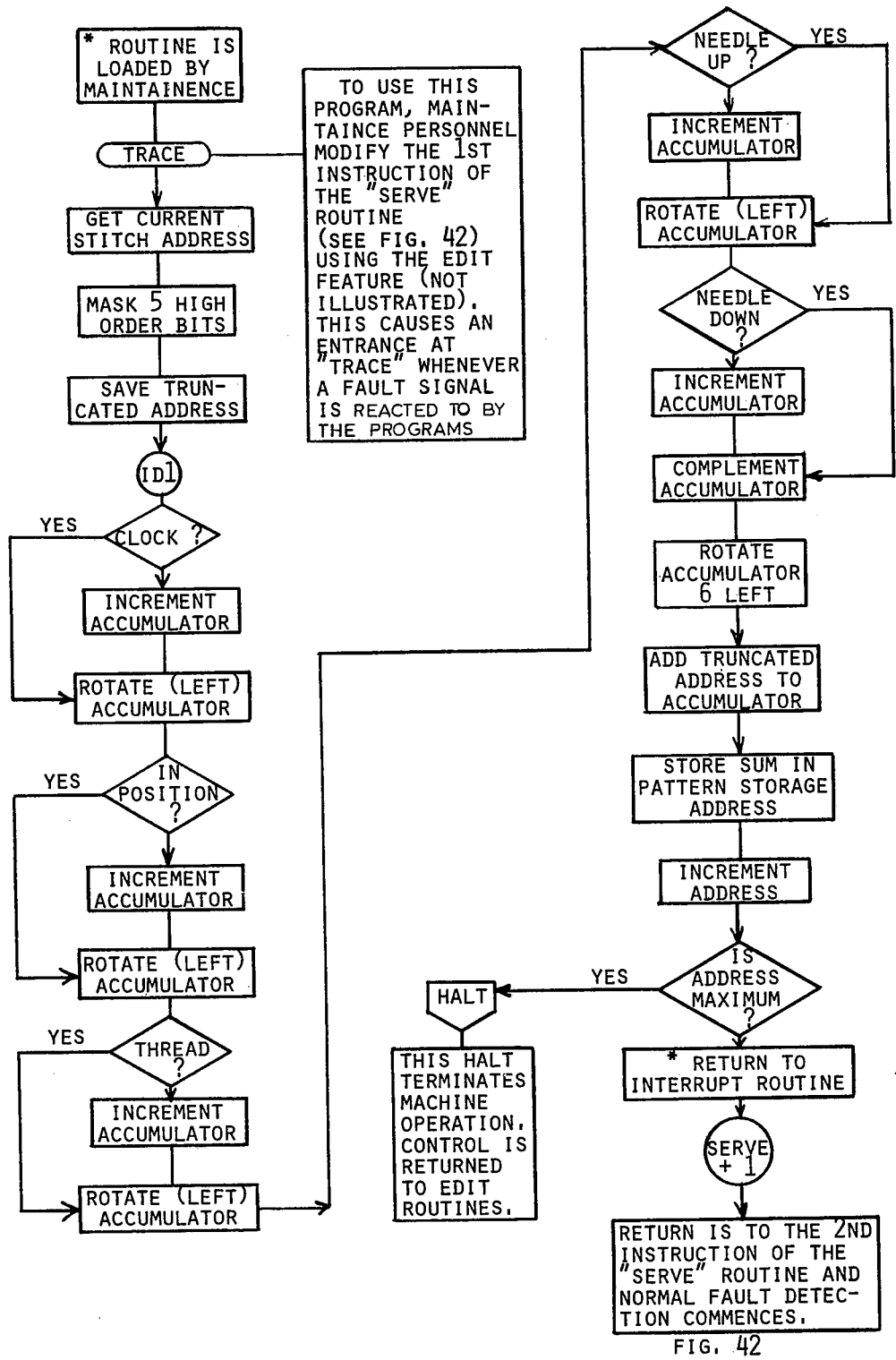

Three fault identification and maintenance aids are provided. First, the disable switch 22 (FIG. 1) on the stitch fault control 90 (FIG. 2) allows the mechanic to set up individual machines while other sewing heads are declutched and non-functional. Second, the special set of fault identification and response programs 187 in FIG. 2 and within the fault detection program 92 can be enabled by the maintenance personnel via the edit program 188. These subprograms provide, on a "Failure to Reach Position" illustrated in FIG. 27, as previous discussed, a condition sometimes responded to in normal operation, a prescribed set of three non-sewing moves in the shape of a right triangle, the legs of which are concurrent with the movement axes. Each move is followed by a halt command and the subsequent move reinitiated by signaling the computer 10 with the start button indicated in FIG. 2. If all three moves are completed successfully, the current pattern execution continues automatically. A flow diagram of this response is shown in FIG. 64.

Such maintenance routine allows the maintenance personnel, under dynamic run conditions, a method of evaluating which axis is causing the "Failure To Reach Position" and apply corrective action to the workholder movement or drive system whichever is at fault. Less obvious is use of the maintenance routine in checking the design translation circuits and cabling. Two important facts must first be noted. Drive controller 12 has separate on-off controls for each axis. A "Failure To Reach Position" can be induced simply by turning off one or both axial controls of drive controller 12 during operation. Also, the dimensions of the right triangle can be altered by the operator via the Edit Program 188. By changing the triangle size, any combination of the 12 binary bit "word" used as an axis coordinate can be selected. Since each X and Y move in this routine is tested independently and the move terminates at each step, a commanded move is represented by a measurable physical motion on the workholder. Failure of any design translation circuit is easily identified and isolated to an axis by this procedure.

Third, the maintenance aids allow for monitoring the proper recognition and timing of interrupt signals which is most essential to proper machine operation. Since interrupt signals are received by the CPU several times each 30 milliseconds, sensor or sensor detection logic failures and sometimes difficult to identify and especially under intermittent failure conditions. To meet these conditions a special program, loaded into memory via load routines when required, has been provided and is identified in FIG. 2 as Machine Maintenance Routines 195 and is flow-charted in FIG. 65. This routine includes a special pattern of repeat stitches which uses little of the pattern storage area. The pattern is executed during a normal machine run. When the machine is started, each interrupt is recorded in memory. The log contains both the interrupt identify and the address of the pattern step being executed when the interrupt occurred. When the pattern run halts, this logged record can be printed out and compared with normal interrupt sequences to identify any malfunctioning sensor-sensor detection circuit. Since this routine logs into the pattern storage area and the log can exceed memory capacity allocated for this purpose, the program halts machine and logging operations when pattern storage allocation has been used.

The ability of analytically "observe" machine operations under dynamic conditions is essential to rapid problem isolation. The described two approaches illustrate families of such routines that could be applied in individual applications of the invention. Thus, the incorporation of "diagnostics" into machine design provides a unique capability in sewing apparatus and is facilitated by the read/write memory capability.

FLOW CHART AND PROGRAM COMMENTS

FIGS. 34 through 66, when read in sequence, provide an overall program flow chart for the embodiment described. From the foregoing description, it will be appreciated that the program language structure employed and illustrated in FIGS. 34-66 allows for implementation of many of the features previously described. For example, the ability to move without sewing, the ability to selectively ignore thread break signals, to command different sewing head and/or table motion speeds, to execute extended moves, to repeat patterns and like operations are all provided for by being able to embed commands in the same X-Y format as stitch data, through the pattern data. The repeat structure in itself allows ease of programming, minimizes storage required for a given pattern and reduces load time when patterns are being changed. The "ordered pair" structure of the language as illustrated, for example, in FIG. 19 also matches input requirements to that of an X-Y digitizer so that automated pattern input and compatibility with standard digitizers is easily achievable. As illustrated in flow diagram form by FIGS. 19-20, for example, a special program routine detects the presence of command data during execution of the stitch preceding it in the pattern and transfers control to a machine command translation subprogram. This subprogram selects the proper logic sequences to be executed and completes them within the stitch cycle.

While regarded as self-explanatory, special attention is drawn to command translation, Step 2, of FIG. 20 which illustrates the variety of commands that can be obtained including X, Y motion table speeds, sewing motor speeds, and release of the work clamp. Note also that provision has been made for many additional instructions.

What also bears emphasis as another facet of the pattern language is the ability to repeat stitches or sets of stitches by a single "repeat" command insertion at any point in the pattern. The command logically is read "Repeat X times the following sequence of Y stitches" and is written in the X-Y data format as 4XXX, YYYY. These repeat commands are detected by a special program routine during execution of the stitch preceding the repeat command in pattern data. Upon detection, control is then passed to a subprogram module which establishes the necessary counters to execute the repeated sequences properly and construct data storage required to respond correctly if a thread break should occur within the cycle. Obviously, this last-mentioned feature reduces the data input required for the pattern designed. It significantly reduces the computer storage necessary and in some patterns by as much as 90%. Hardware costs or expansion of the pattern size capable of being executed by a given investment in computer storage can be realized. The data compaction also directly relates to the load time necessary to input a pattern at a production change and thus converts previous setup time to productive cycles.

Representative flow charting symbols and legends are illustrated in FIGS. 18 and 18A. Direct reference to constants has been eliminated in the flow charts, FIGS. 34-66, when not deemed necessary to an understanding of the program operations. Since there is some dependence of logic sequence on the particular computer used and since fault and command responses used are a function of application and to some extent a function of available hardware, the illustrated flow diagram as seen in FIGS. 34-66 is, of course, specific to a particular application or machine embodiment. Command and/or fault detection responses other than those illustrated will be apparent to a skilled programmer and are considered as being within the scope of the invention. No flow diagrams for Load, Inquiry or Edit have been included since these are computer manufacturer supplied and are generally known. What should be specially noted here is that even though Load, Inquiry and Edit programs are known in computer technology, no prior known program controlled stitching apparatus has been designed to utilize such programs to obtain the many advantages of the present invention.

OTHER SIGNIFICANT FEATURES

In various and relatively recent prior art apparatus, e.g., as found in U.S. Pat. No. 4,051,794, sequential addressing of storage locations is employed. However, it should be noted that the sequential use of random access memory is equivalent to the mechanical advance of a tape and negates the random access capability of the memory system. Repair cycles and repeat stitching are precluded by such a system. As applied in the hardware of the present invention system, sequential addressing is not used nor does the term "predetermined sequence" apply. The addressing of memory occurs as a result of the CPU requiring another instruction from a program sequence, from an instruction requiring data from within memory (including, as data, pattern storage, arithmetic constants, data representing addresses of different subprograms, etc.) and as a response to activation of an interrupt request. In routine operation, memory addressing for program instructions occurs at the average rate of 60,000 per second. As can be seen on the general flow diagram (FIGS. 34-66), these memory addressing sequences average 10-12 instructions sequentially followed by an address modification to move to a new routine. Interspersed within these 10-12 instructions are an average of 3 data requests per set or approximately 18,000 additional memory address references per second. Among these 18,000 are approximately 60 stitch references per second (2/stitch@1000 stitches/min). As can be seen, only about 0.01% of the memory references refer to stitch data in any given second and memory reference tends to be random in nature. Additionally, even stitch data considered separately is not designed to be referenced sequentially but it is stored in a predetermined order.

The ability of the computer to include a pattern instruction to repeat certain stitches as sequences of stitches modifies any sequential reading in order that repeated patterns within the overall design may be executed by a single set of instructions. Thus, the full random nature of the memory is used to compact the stitch patterns and minimize load time and stitches are nonsequential but in a predetermined order. Another feature of the machine allows pattern modification as a result of fault conditions on the machine. The most outstanding of these pattern modifications is the stitch fault response which essentially inserts into the pattern up to six additional moves at occurrence of a stitch fault. Up to three of these moves are arithmetical complements of existing stitches but are never specifically represented in the pattern data. The other one-half of the six are repeats of previously-executed stitches. Since this event (as others with similar responses) can occur at random, the execution of the pattern may not follow the predetermined sequence.

As can be seen, execution of memory addressing is:

(a) essentially random due to the multiple uses of memory for program instructions, arithmetic constants, pattern data, etc.;

(b) non-sequential within pattern data due to inclusion of repeat instructions and the fault response programs; and (c) executable in the predetermined sequence only if no fault condition responses are involved.

As another feature, provision is also made to disable the thread break circuitry illustrated in FIG. 32 automatically at start-up of sewing and run through a number of stitches before enabling it. This is desirable since the bobbin thread is not always picked up on the first stitch and one or two additional stitches are sometimes necessary before thread tension is stabilized. Recognition is also given to the fact that initial stitches can be critical to a pattern and that four stitches after a thread break would leave a gapping hole. While disabling of thread break circuitry as start-up has been previously employed by others, it has, so far as is known, been based on a constant value and with no means to alter such operation. A significant improvement in such type circuitry is highly desirable. By using the flexibility of read/write memory and the illustrated stored program logic, two operational solutions are available: (1) the operator can modify the count value using the edit routines when the need is only occasional or (2) when the need is frequent, a machine command can be implemented to allow modification from pattern data. This latter approach is illustrated by flow diagram in FIG. 48 and is deemed preferable since it allows one value to be set for initial sewing and then to be reset to another value for thread break. For example, a very non-critical start-up could be allowed six stitches and then be changed to two stitches immediately following a repair, where only three back-up stitches might be allowed.

Another further feature relates to automatic thread cutting. While the present embodiment is not illustrated as having thread cutting devices, a separate thread cut command has been provided as illustrated in Step 2 of FIG. 20 and which can be implemented with commercially available sewing heads equipped with any of the many available thread cutting devices. The ability to modify the illustrated program logic without substantial expense is another significant advantage of the system's illustrated stored program logic and read/write memory.

The reason for providing the mentioned separate thread cutting command is a negative one. Occasionally, it becomes necessary to make an extremely long X or Y axis move carrying thread to make a stitch. For example, this may be required to match the unique "long throw" of one popular type of embroidery machine. This type of operation thus requires a stop sewing move and start sewing again sequence without trimming the thread. A circuit identical to that provided for the sewing motor control, FIG. 30, has been provided to execute the thread cutting operation for machines which are so equipped. A corresponding command response program is not illustrated since the same is equipment dependent.

Another feature relates to captive work clamp release. Mention has elsewhere been made of the computer controlled work clamp release system illustrated in FIGS. 3, 4 and 14-16 and which completely frees the work clamp. A captive clamp is usually not used on a multiple sewing head machine because of time loss associated with sequential load, sew operations. However, mechanisms have been designed and command structure provided in the present invention system for a pattern commanded release of the multiple holder to minimize operator insertion-removal time. This has been, provided as a separate command, as illustrated in Step 2 of FIG. 20, since with some work holders liki pocket flap holders illustrated in FIG. 14A, it may be preferable to load work at the machine and release therefore would be undesirable. A control circuit identical to that illustrated in FIG. 30 is provided for such captive work clamp release.

An elsewhere noted, another valuable feature relates to the command structure allowing machine commands to be embedded between stitch or repeat instructions. Some instructions, like, sew, move without sewing, stop sewing, et cetera, are "state" instructions which apply without repeating unitl superceded. Hence, instructions are only included where needed. Since computer program logic identifies the instruction by its Y coordinate value and executes a string of program logic peculiar to that instruction, 2047 instructions could be contained in the embodiment described and with each being tailored to the specific application.

Most importantly, it should again be recognized that the sensors, like all signals to and from the computer, are terminated at the computer without connection to other parts of the machine. When a sensor signal is detected, the computer halts its normal program execution, identifies the source of the sensor signal, and executes a predetermined sequence of program logic. This logic might, dependent on total machine conditions, ignore the signal, log the occurrence for future reference, or respond with an output to the running sewing heads and/or positioner actuators.

SEWING HEAD AND MOTION TABLE SPEED CONTROL

An important aspect of the invention resides in the ability to independently control the speed of the sewing heads variable speed drive motor 45 as well as independently control the maximum speed of movements of the X and Y positioning actuators 250,260. That is, stitching speed and maximum X-Y motion speed can each be controlled independently of each other by computer command. Among the significant advantages arising from such form of speed control is that of minimizing the total time required for a move, optimizing thread handling and stitching conditions to minimize thread breaks and other stitch faults and minimizing overruns of the motion table in either X or Y directions. Some of these features and advantages have been previously described and other relates features and advantages are next described.

Mention has already been made of the fact that independent control of the maximum operational rate by the "pattern" data is achieved in both X and Y direction for each move. An adjustable method of setting acceleration and deceleration is also available such that a constant rate can be held in each case. This is obtained by a feedback control system for measuring rate of acceleration in both X and Y directions and which is used to adjust the current of each axis' motor independently. On deceleration, a reverse polarity current is applied as a braking force to minimize overrun. This configuration minimizes the total time necessary to make a prescribed move and is responsible for the high sewing speeds attained in operation.

The described program controlled system for X and Y motions has other advantages. The ability to adjust acceleration rate allows matching the impact of initial acceleration to the maximum strength characteristics of the thread on a batch basis. This, of course, alters the response of the system and influences the maximum sewing speed. The linear nature of the acceleration more importantly minimizes the buildup of heat resulting from friction between the needles 50 and the thread 51 as each X and Y movement is executed. In the normal X-Y table motion acceleration pattern, thread passage through needle 50 starts slowly and reaches a maximum rate far exceeding that obtained during constant acceleration. Furthermore, the maximum heat imposed on the thread during constant acceleration is less than that in the normal acceleration pattern and the chance of thread break is substantially less. While thread breakage can happen both during sewing and non-sewing moves, the most likely time is during extended positioning moves when thread movement is large and esentially continuous. Thus, X and Y motion speed control becomes very significant.

Program controlled X-Y motion speed deceleration also has the advantage of being able to calculate the point at which programmed X-Y motion speed must terminate in order to achieve the determined position without overrun. Not only does this supply minimum actual positioning time but it simplifies the logic necessary to assure that position has been achieved, i.e., desired move−actual move=$\phi$is in position. In normal X or Y positioning after the above zero value has been reached, either an extended time period must be used to allow oscillation of the particular X or Y positioning actuator to stop or continuous monitoring must occur to insure that oscillation has stopped.

In the automated sewing of pocket flaps without thread runners it is desirable to position the work aid, as seen in FIG. 14A, clear of the needle to facilitate loading and this operation serves as a useful example. As extended move without sewing is necessary in such an operation to achieve the start sewing position. A second extended set of moves is necessary at sewing termination to clear work aid obstructions and reposition equipment for another cycle. The move pattern for this example is shown in FIG. 22.

Referring to FIG. 22 during move A, a maximum X and/or Y drive rate is acceptable since no thread is being drawn and is desirable for shortest cycle time. In another situation, involving an extended move, thread may be drawn and this move would approximate move F. With continued reference to FIG. 22, in moves B-E, thread 51 is being drawn through needle 50 at approximately 0.105" per stitch. While that draw occurs in approximately 0.017 seconds at 1,000 stitches/minute, the total time before the next draw is 0.060 seconds. The effective draw rate is 0.105"/0.060 seconds or 1.75 inches/second. On move F, thread is drawn through the needle equivalent to the asterisk line from $F_1$ to $F_2$. This length is 5.001". 0.002 seconds delay occurs between each segment of the six part move. Actual moves at high speed occupy 0.228 seconds so that lapsed time is 0.298 seconds. Thread draw is therefore 16.78 inches/second or the equivalent of sewing at 9,588 stitches/minute. This operational speed is beyond the needle heat sink capability and maximum temperature that can be imposed on the thread for most needle-thread combinations. Dependent on needle size and thread construction, the pattern constructor might, for example, choose to reduce this by 50% to an equivalent of 5,000 stitches/minute or perhaps to 10% to approximate the stitching conditions used in the pattern—thus minimizing the thread breakage due to needle heat buildup.

Another advantage and function of the invention apparatus and method relates to continuous sewing operations. By continuous sewing operations is meant sewing in sequences in which each revolution of the sewing head results in a completed stitch in the fabric. Specifically excepted are the elaborate mechanical mechanisms used to generate "skip" stitches at the sacrifice or sewing speed in order to extend movement. In continuous sewing operations, the maximum stitch length obtainable is determined by the maximum commandable move (1.536") or the capability of the X-Y motion table to move the prescribed distance during the period the needle is disengaged from the fabric. Hence, the maximum move is usually limited by the operation speed of the sewing machine. At 1,000 stitches per minute, this stitch is approximately 0.500 inches. In conventional machines, this stitch length becomes an absolute limit for continuous sewing since the machine speed is fixed. Even if the machine speed were not fixed, the X-Y motion table speed is tied to the mechanical sewing speed and a similar limit is obtained.

In the apparatus of the invention both X-Y motion table and sewing head motor speed are independently controlled. One method of sewing patterns with extended stitching would be to mechanically or electrically reduce the sewing speed for the pattern to the slowest speed necessary to achieve the longest stitch, subject in the embodiment being described to 1.536" maximum. This may needlessly extend the sewing cycle and increase cost of operation. Therefore, provision is made for adjusting the sewing head speed at any point in the pattern and as many times as desired during the pattern through control commands in the pattern data imposed by the pattern maker. By this mechanism, run time can be optimized. Consider, for example, as assumed 3,000 stitch embroidery of a pine tree and fence where the ½" maximum limit is exceeded in the lower branches but no more than two stitches across the tree is desired as illustrated in FIG. 23.

Referring to FIG. 23, it may be assumed that approximately 10% of the stitches are in excess of the ½" limit but to reach the maximum move at level (B) in FIG. 23 a stitching speed of 800 stitches/minutes would be required. If the entire pattern were run at this speed, pattern run time would extend from 3 minutes for 3,000 stitches to 3.75 minutes or a 25% increase. By commanding an 800 stitch speed at level A in FIG. 23 and a return to 1,000 stitches at point B the run time becomes 2.7 minutes (at 1,000 stitches/minutes) and 0.375 minutes (at 800 stitches) for a total run time of 3.075 minutes or 2.5% increase.

Adjustable sewing head speed sometimes must be used in conjunction with X-Y table motion speed to reduce thread breakage. During extended moves with certain needles—thread combinations, excessive heat buildup will result in thread breakage. To minimize this effect, X-Y table motion speed reduction is called for during that extended move. This in turn may require sewing head speed adjustment to complete the stitch. The abilities to adjust sewing head speed and X-Y motion speed independently thus minimizes sewing time.

The time available for stitching in the system of the invention is dependent only on the actual operating speed of the sewing heads. Since sewing head speed is commandable at any point in the pattern, excessively long stitches can be executed at a lower sewing head speed and then sewing speeds can be returned to highest values. Additionally, since protection is provided by the fault detection program from poor pattern design as well as machine failure, a command structure can be implemented which allows very large stitches, e.g., 1.56" negative, 2.047" positive, even when selecting the smallest increment, e.g., 0.001", a feature it is believed has not heretofore been achieved in program controlled profile stitching apparatus.

Figure 38:
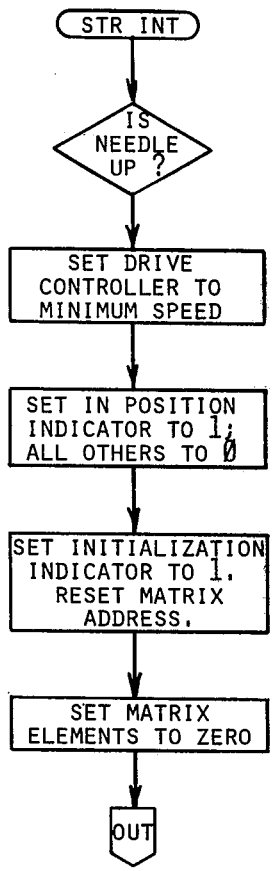
Figure 39:
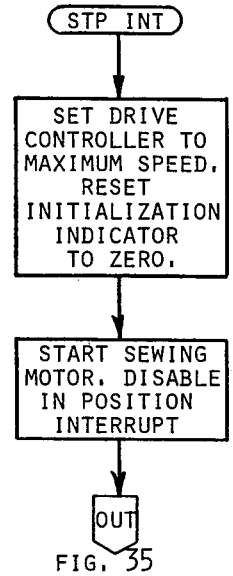
Figure 41:
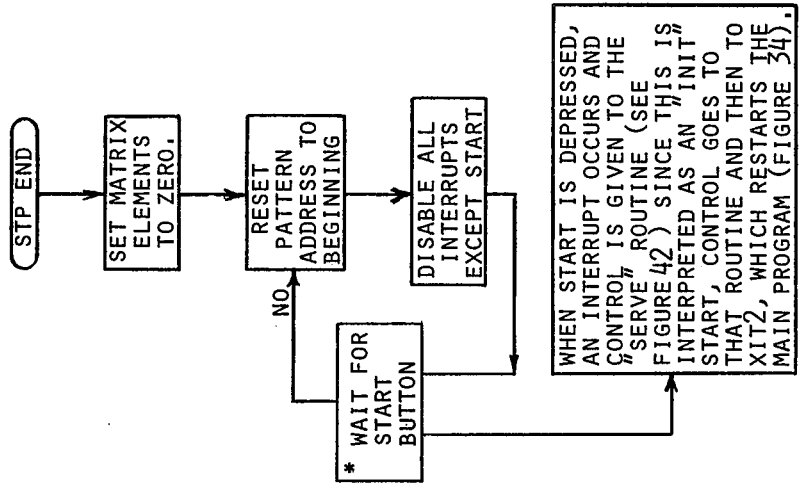
Figure 40:
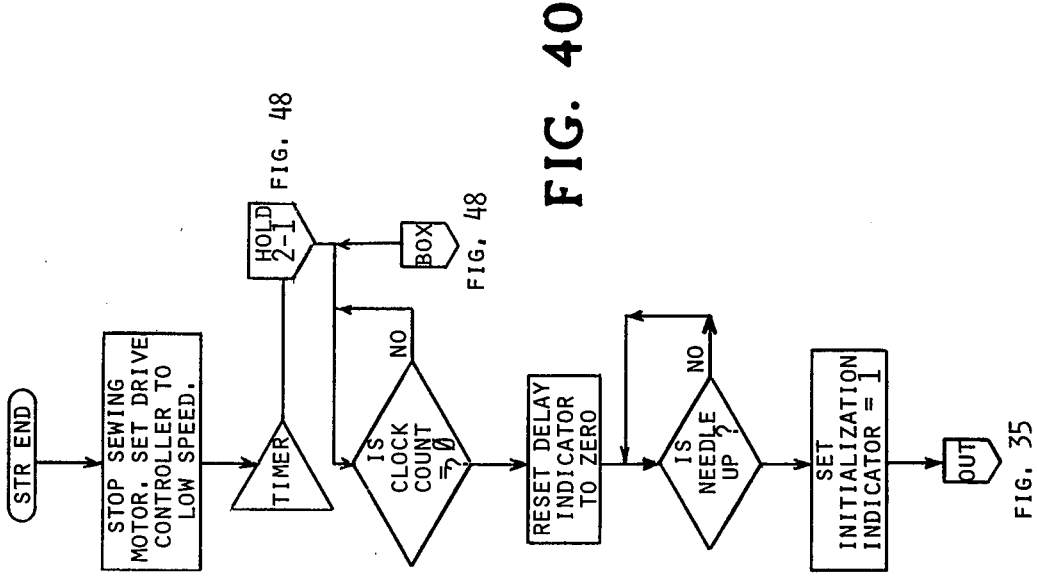

A "move without stitching" operation is also available for which a command structure, shown in FIG. 38, is provided and in which the needle position signal is processed differently in contrast to a "move with stitching" operation. Motion table speed is controlled during this operation. Such command structure in the invention system imposes, with a single command, a constant state condition which the computer "remembers" until modified. On receipt of such a command, the computer switches to a logic which requires no needle signal. Multiple moves therefore continue uninterrupted until the state imposed by the original command is overridden. This technique allows higher levels of data compaction and gives room for the large move format elsewhere noted.

Some sewing devices have provided an additional mechanism to allow stitch extension by a "skip stitch"—essentially a mechanical disconnect of the needle bar during one or more cycles. These elaborate mechanisms are replaced in the present invention by a zero speed logic command followed by whatever moves are desired and a command to resume sewing. Each command facility is included in the pattern language. The maximum stitch length obtainable is therefore limited only by the clamp holding the work or by the maximum table motion whichever is less. The independent nature of X-Y table motion speed may be required during such a move in order to prevent heat buildup on the needle.

SUMMARY

In summary, the following significant features of the invention are achieved:

(a) A programmable memory provides the ability to change the stored stitch configuration.

(b) Non-stitching responses, such as thread breaks, incomplete X or Y motions, power failures, and the like, and responses to other situations requiring a repair cycle, become possible.

(c) Fabric motions can be executed completely independent of a stitching action and in both directions under computer control.

(d) A closed loop, digital positioning system provides precise positioning and controlled acceleration of the X-Y DC servo drive-controllers in a bi-directional manner.

(e) The controlled acceleration, independently on X and Y motion, allows a selected point on the fabric being sewn to traverse a least time path in combination with substantially uniform thread tension, in contrast to the straight line nypotenuse moves traversed by conventional stepping mechanisms.

(f) The machine sewing speed and the X-Y motion speed may be commanded independently.

(g) The sewing speed control feature enables substantially increased stitch length to be obtained.

(h) The machine is given a new capability on a thread break or skip stitch to stop the sewing head and back the material to a point preceding the break and with the pattern to facilitate automatic repair operations.

(i) The capability of moving the material under command without sewing at any point in the pattern provides substantial versatility, e.g., stopping between parts of a design such as stitching out the word "STOP". The ability to move without sewing also allows the use of simple metal templates.

(j) Sewing operations can be performed which are not "closed", meaning that the fabric can be returned to a starting point without sewing. This also allows sewing of pocket flaps, and the like, where stop and start points are different.

(k) The fabric is actually stopped between moves which means that the needle is never required to bend in the fabric.

(l) Inclusion of operator logic intermixed with pattern storage enables a pattern designer to provide machine command logic that can command the machine to do what the designer would himself otherwise do whereas prior art apparatus generally exhibits only the ability to include this kind of command to the level of stopping the machine.

(m) The invention apparatus establishes no electrical connection between the thread break detector and the machine turn-off switch. Neither the manually-operated start button nor the manually-operated stop button is electrically connected to the sewing head drive motor. Rather, each is interpreted as a "sensor" or signal source.

(n) If the table motion fails to reach a desired position before the needle enters the fabric, such table motion can be stopped. Further, such table motion can be stopped in the event of a thread break; a skip stitch, meaning a failure to lock the stitch; or by depletion of the bobbin or needle thread supply. Further, there can be a manual-induced operator stop or a pattern commanded stop induced by machine command section of the pattern language.

(o) The pattern data format is in the nature of ordered pairs of X-Y rectangular coordinates which are readily compatible with the output of standard digitalizers. Each "ordered pair" is a command which can take the form of being either a specific instruction to the sewing apparatus and to the logic module to commence a specific set of operations, a command to the program logic internal of the computer to set up a recurrent pattern in the number specified by the command, or coordinates of a stitch to be executed.

(p) Maintenance is facilitated by provision of a disable switch on the stitch fault controller which allows the mechanic to set up individual machines while other sewing heads are declutched and non-functional. Furthermore and unique to the invention is provision of a special set of subprograms within the fault detection program that can be enabled only by maintenance personnel via the edit program to locate the source faults, verify correct pattern executions and ascertain proper recognition and timing of interrupt signals.

(q) Essentially any standard sewing head can be used since the invention does not require special purpose sewing machinery.

(r) With the apparatus and method of the invention, a single computer may run more than one set of sewing apparatus.

(s) A third level of interrupt control is provided which allows suppression of selected signals during those special conditions encountered in fault detection.

(t) The drive controller matching circuitry may be moved interior to the computer, if desired.

(u) As compared to prior art work holder devices, simplified work holders can be employed because of the sensor and program control system employed.

(v) The requirements of the invention are such as to make maximum use of a form of randomly addressable memory.

(w) A computer program release controlled workholder facilitates concurrent stitching and loading operations for operating efficiency.

(x) Multiple head machine operation is facilitated by the relatively high torque and close control tolerances of the X-Y motion control aspects of the invention and the ability to respond through logic and program control.

(y) Initialization of an operation at a fixed location occurs automatically through program logic at machine start-up and pattern end.

(z) The continuous nature of the needle position signal during the dwell of the needle in the fabric in conjunction with the illustrated interface logic makes possible interrogation of needle position at any time required by operating conditions. Additionally, this arrangement provides useful and unique signaling for fault detection and identification.

(aa) Program releasable work frames having plural workpiece clamps of one type are made interchangeable with program releasable work frame having plural workpiece clamps of another type.

(bb) The mentioned third level of interrupt control enables the system to store priority indicators for the signals in memory and the CPU response to analyze the priorities to determine recognition and establish whether a shift of recognition priority should occur.

What is claimed is:

1. An automatic sewing machine, comprising:
   (a) at least one sewing head with at least one sewing needle, thread supply, take-up means and associated stitch forming apparatus to form successive stitches in a workpiece;

(b) signal controllable drive means for driving said sewing head;

(c) a work holder adapted to hold a workpiece for operation thereon by said needle and mounted on an X-Y motion table having controllable positioner means associated therewith;

(d) signaling means productive of signals indicative of successively obtained positions of said positioner means and the needle;

(e) circuit means for terminating and recording selected characteristics of signals from said signaling means and for providing selective access to the record of such signals by a central processing unit;

(f) randomly addressable memory means containing logical sequences of instructions for control of a central processing unit and pattern data interpretable by a central processing unit as directions for executing a pattern including, as required for such pattern, directions for said drive means, directions for said positioner means, directions for selection of central processing unit control instruction sequences and directions for selecting sequences of pattern data; and (g) a central processing unit operatively associated with said memory means and adapted to serialize and execute said control instructions to direct its own operation and to control recognition and to recognize signals present in said circuit means and in coordination therewith to issue other signals for control of said sewing head drive and work holder positioner means whereby to reproduce by stitching with said needle the pattern represented in said pattern data.

2. An automatic sewing machine as claimed in claim 1 wherein said randomly addressable memory means includes a read/write portion and said read/write portion contains said logical sequences of instructions for control of a central processing unit.

3. An automatic sewing machine as claimed in claim 1 wherein said signal controllable driving means for driving said sewing head comprises an electric motor and logic control therefor.

4. An automatic sewing machine as claimed in claim 3 wherein said electric motor comprises a variable speed motor, said pattern data includes directions for controlling the speed thereof and said logic control includes signaling means adapted to change such speed during the course of executing said pattern.

5. An automatic sewing machine as claimed in claim 1 wherein said signal controllable positioner means comprise bi-directional DC motor positioner actuators and drive controller means and said drive controller means provides said sensing means indicative of successively obtained positions of said DC actuators whereby to establish a closed loop system therewith.

6. An automatic sewing machine as claimed in claim 5 wherein said drive controller means includes adjustable acceleration control means enabling the acceleration of said DC motor positioner actuators to be held substantially constant and at a rate coordinated with the break characteristics of said thread whereby to minimize breakage thereof during execution of said pattern.

7. An automatic sewing machine as claimed in claim 1 wherein said work holder includes an electrically releasable mounting means therefor, said pattern data includes directions for release of said work holder mounting means from the machine at the end of said pattern and work holder release control means associated therewith operable to release said work holder mounting means from said machine at the end of said pattern.

8. An automatic sewing machine as claimed in claim 7 wherein said electrically releasable mounting means includes mechanically releasable connector means between said work holder mounting means and motion table and a solenoid control mechanism associated with said connector means and work holder release control means.

9. An automatic sewing machine as claimed in claim 8 including a manual switch connected to operate said solenoid control mechanism for manual release of said work holder mounting means.

10. An automatic sewing machine as claimed in claim 1 wherein said signaling means includes stitch fault signaling means productive of signals indicative of a stitch fault condition, said circuit means including means for recording selected characteristics of such stitch fault signals and for providing selective access to the record of such recorded stitch fault signals by said central processing unit.

11. An automatic sewing machine as claimed in claim 10 wherein said stitch fault signaling means includes optical sensing means arranged so as to be productive of said stitch fault signals only upon the simultaneous occurrence of said take-up means being in a maximum raised condition and the path of the thread being sensed as abnormal.

12. An automatic sewing machine as claimed in claim 11 wherein said optical sensing means includes first optical sensing means productive of signals dependent on positioning of said take-up means, second optical sensing means productive of signals dependent on positioning of a pivotal thread guide proximate said needle and circuitry means for detecting the simultaneous absence of signals from both said sensing means and producing said stitch fault signals currently therewith.

13. An automatic sewing machine as claimed in claim 1 wherein said signaling means includes operator controlled start-stop signaling means for initiating start-stop signals to said circuit means, said circuit means including means for recording selected characteristics of such start-stop signals and providing selective access to the record of such recorded start-stop signals by said central processing unit.

14. An automatic sewing machine as claimed in claim 1 including limit switch signaling means productive of signals and indicative of overtravel in either X or Y directions.

15. An automatic sewing machine as claimed in claim 14 wherein said limit switch signaling means includes a limit switch having an electrical contact surface with a support therefor shaped to correspond to the shape of said work holder and a conductive probe member mounted to move with said motion table out of contact with said surface during normal travel of said motion table and to complete a limit switch circuit with said contact surface upon overtravel of said motion table in either X or Y direction.

16. An automatic sewing machine as claimed in claim 14 wherein said probe member includes a resilient mounting therefore allowing said overtravel to occur without damage to said limit switch.

17. An automatic sewing machine as claimed in claim 1 wherein said work holder comprises a template arrangement having a profile slot adapted to be moved in register with the needle to sew a profile stitching pattern corresponding to the slot and said pattern data gives directions for such profile stitching.

18. An automatic sewing machine as claimed in claim 1 wherein said pattern data includes directions for maximum speeds of said drive and positioner means and wherein said central processing unit is adapted to issue signals to set and vary such speeds according to such speed directions in coordination with execution of the pattern.

19. An automatic sewing machine as claimed in claim 1 wherein said pattern data includes directions for maximum speed of said drive means and wherein said central processing unit is adapted to issue signals to set such speed according to such drive means speed directions and until further such directions correct such speed in coordination with execution of the pattern.

20. An automatic sewing machine as claimed in claim 1 wherein said pattern data includes directions for maximum speed of said positioner means and wherein said central processing unit is adapted to issue signals to set and vary such speed according to such positioner means speed directions in coordination with execution of the pattern.

21. An automatic sewing machine as claimed in claim 1 wherein said pattern data includes directions in a format enabling said sewing head drive means to be stopped with a single command and to maintain such stopped condition during execution of plural X-Y positional moves pending receipt of a correctional command whereby to facilitate sewing operations such as moves without sewing, non-closed patterns and multiple patterns on the same workpiece.

22. An automatic sewing machine as claimed in claim 1 wherein said signaling means includes needle position signaling means adapted to provide a detectable continuous signal of one character during presentation of said needle in said workpiece and a detectable continuous signal of another character during separation of said needle from the workpiece.

23. An automatic sewing machine as claimed in claim 22 wherein said circuit means in response to said needle position signals develops and records signals indicative of each change in the character of said signals.

24. An automatic sewing machine as claimed in claim 22 wherein said circuit means in response to said needle position signals develops a signal accessible to said central processing unit indicative of the character of the signal at any time.

25. An automatic sewing machine as claimed in claim 1 wherein said central processing unit is adapted in response to the information provided by said circuit and memory means to cause each X-Y move pair for each stitch to be executed in the time interval bounded by needle exit from and entrance into the workpiece and to stop such move when not executed in such time interval.

26. An automatic sewing machine, comprising:
(a) at least one sewing head with at least one sewing needle, thread supply, take-up means and associated stitch forming apparatus to form successive stitches in a workpiece;
(b) controllable drive means for driving said sewing head including an associated digital signal responsive control therefor;
(c) an X-Y work holder adapted to hold a workpiece for operation thereon by said needle and having and X-Y motion table, controllable positioner means associated therewith and an associated digital signal responsive control for said positioner means;
(d) means for providing control signals in the course of executing a pattern indicative of successively obtained positions of selected moving components of the machine;
(e) circuit means including means for receiving said signals singularly or plurally, stored digital program logic adapted for analyzing the relation between the signals themselves and between the signals and other digital data including pattern data stored in said program logic developing a central processing unit digital control instruction sequence therefrom defining a central processing unit response corresponding to the results of such analysis; and
(f) a central processing unit associated with said circuit means and adapted to serialize and execute said control instructions to direct its own operation and to control recognition and to recognize such said signals as are received in said circuit means and in coordination therewith to issue digital signals corresponding to said defined response for control of said drive means and positioner means whereby to reproduce by stitching with said needle the pattern represented in said pattern data.

27. A control system adapted for controlling an automatic sewing machine with a needle, digital signal controllable needle drive, work holder and digital signal controllable work holder positioners and needle positioning and work holder positioning signaling devices productive of signals indicative of successive positions obtained by the needle and work holder in the course of executing a pattern, said system comprising:
(a) circuit means having interface logic and memory including means for receiving needle and work holder position signals singularly or plurally, stored digital program logic adapted for analyzing the relation between the signals themselves and between the signals and other digital data including pattern data stored in said program logic and means for developing a central processing unit digital control instruction sequence therefrom to define a central processing unit response corresponding to the results of such analysis; and
(b) a central processing unit associated with said circuit means and adapted to serialize and execute said control instructions to direct its own operation and to control recognition and to recognize signals in said circuit means and in coordination therewith to issue digital signals corresponding to said defined response for control of said needle drive and work holder positioners during execution of a pattern by said machine.

28. A control system as claimed in claim 27 wherein said memory includes a randomly addressable read/write portion and said read/write portion contains said logical sequences of instructions.

29. A control system as claimed in claim 27, said automatic sewing machine having stitch fault signaling devices productive of control signals indicative of stitch faults and wherein said circuit means includes means for receiving said stitch fault signals and analyzing the same as with said needle and work holder position signals.

30. A control system as claimed in claim 27 wherein said signaling devices include stitch fault signaling means productive of control signals indicative of stitch faults incurred in the course of executing said pattern and wherein said circuit means having said stored digital program logic and pattern data for controlling said machine includes digital programs and encoded data, comprising:

(a) pattern storage having selectively intermixed classifications of stored designer determined digital data representing as one class positional work holder coordinates, as another class pattern data sequence modifiers for repeating sequences of work holder coordinate positions, and as a third class commands to selected included programs for establishing a selected set of operating conditions for said machine; and (b) a set of programs executable by the central processing unit including:

(i) a pattern interpretation program associated with said pattern storage having logical sequences capable of identifying and isolating the said three classes of pattern storage data to cause execution by the central processing unit to begin on a program sequence corresponding to each identified class of data;

(ii) a stitch coordinate translation program adapted to operate on said positional work holder coordinates to translate the stored digital data into a form acceptable for transfer by said central processing unit through said interface logic to provide control signals for positioning the work holder of the machine;

(iii) a machine command program adapted to operate on said commands to identify the particular set of machine conditions identified by the command data and to form a program sequence for the central processing unit to execute and develop as an output of signals through the said interface logic for establishing said machine conditions; and (iv) a pattern repeat cycle program adapted to operate on said sequence modifiers so as to change the order in which said pattern interpretation program accesses pattern storage data for a stitch count interval specified by the modifiers causing the pattern interpretation program to repeat the sequences of stitches whose stitch count and number of repeats corresponds to said modifiers.

31. A control system as claimed in claim 30, including:

(a) a fault detection program adapted to operate on and control recognition of control signals whereby to analyze the sequence and relation between such signals, the relation of such signals to other digital data stored in the fault detection program and to switch control of the pattern interpretation program when no abnormal pattern has been detected and when the abnormal pattern is detected to switch control to a fault identification and response program; and (b) a fault identification and response program adapted to operate on the product of the fault detection program and identify the cause of the fault and to construct a set of program instructions for the central processing unit defining a satisfactory response to offset the fault condition for execution by the central processing unit to output signals through said interface logic necessary to implement the defined response.

32. A control system as claimed in claim 31 wherein said circuit means includes means enabling an operator to command a routine pattern execution and means to print a log thereof and including:

a machine maintenance routine program adapted to operate overlapped with the normal system of programs in such a manner as to cause prescribed mechanical motions of the work holder and needle on particulr fault detections enabling when desired the recognition and response to said control signals to be logged during an operator commanded routine pattern execution and the log to be printed after sewing termination in order to compare to expected signal recognition and response.

33. A control system as claimed in claim 30 including:
load, edit and inquiry programs adapted to provide pattern replacement in whole or part, program additions and modifications, operator retrievable pattern and program information and operator commandable initial start conditions.

34. A control system as claimed in claim 27 wherein said signaling devices include stitch fault signaling means productive of control signals indicative of stitch faults incurred in the course of executing said pattern and wherein said circuit means having said stored digital program logic and pattern data for controlling said machine includes digital programs and encoded data, comprising:

(a) pattern storage having selectively intermixed classifications of stored designer determined digital data representing as one class positional work holder coordinates, and as another class pattern data sequence modifiers for repeating sequences of work holder coordinate positions; and (b) a set of programs executable by the central processing unit including:

(i) a pattern interpretation program associated with said pattern storage having logical sequences capable of identifying and isolating the said dual classes of pattern storage data to cause execution by the central processing unit to begin on a program sequence corresponding to each identified class of data;

(ii) a switch coordinate translation program adapted to operate on said positional work holder coordinates to translate the stored digital data into a form acceptable for transfer by said central processing unit through said interface logic to provide control signals for positioning the work holder of the machine; and (iii) a pattern repeat cycle program adapted to operate on said sequence modifiers so as to change the order in which said pattern interpretation program accesses pattern storage data for a stitch count interval specified by the modifiers causing the pattern interpretation program to repeat the sequences of stitches whose stitch count and number of repeats correspond to said modifiers.

35. A control system as claimed in claim 27 wherein said signaling devices includes stitch fault signaling means productive of control signals indicative of stitch faults incurred in the course of executing said pattern and wherein said circuit means having said stored digital program logic and pattern data for controlling said machine includes digital programs and encoded data, comprising:

(a) pattern storage having selectively intermixed classifications of stored designer determined digital data representing as one class positional work holder coordinates and as another class commands to selected programs forming the system for establishing a selected set of machine operating conditions; and (b) a set of programs executable by the central processing unit including:

(i) a pattern interpretation program associated with said pattern storage having logical sequences capable of identifying and isolating the said dual classes of pattern storage data to cause execution by the central processing unit to begin on a program sequence corresponding to each identified class of data;

(ii) a stitch coordinate translation program adapted to operate on said positional work holder coordinates to translate the stored digital data into a form acceptable for transfer by said central processing unit through said interface logic to provide control signals for positioning the work holder of the machine; and (iii) a machine command program adapted to operate on said commands to identify the particular set of machine conditions identified by the command data and to form a program sequence for the central processing unit to execute and develop as an output of signals through the said interface logic for establishing said machine conditions.

36. A control system as claimed in claim 27 wherein said signaling devices include stitch fault signaling means productive of control signals indicative of stitch faults incurred in the course of executing said pattern and wherein said circuit means having said stored digital program logic and pattern data for controlling said machine includes digital programs and encoded data, comprising:

(a) pattern storage having stored designer determined digital data; and (b) a set of programs executable by the central processing unit including:

(i) a fault detection program adapted to operate on and control recognition of control signals whereby to analyze the sequence and relation between such signals, the relation of such signals to other digital data stored in the fault detection program and to switch control to the pattern interpretation program when no abnormal pattern has been detected and when an abnormal pattern is detected to switch control to a fault identification and response program; and (ii) a fault identification and response program adapted to operate on the product of the fault detection program and identify the cause of the fault and to construct a set of program instructions for the central processing unit defining a satisfactory response to offset the fault condition for execution by the central processing unit to output signals through said interface logic necessary to implement the defined response.

37. A control system as claimed in claim 36 in which said fault identification and response program includes the capability of developing a response in the event of a stitch fault effective to cause said central processing unit to command a stoppage of said needle drive, with the needle in a raised position, reversal of the workpiece for a distance equivalent to a predetermined number of stitches immediately preceding the fault and following the pattern in reverse, and wherein said work holder positioners operate bi-directionally.

38. A control system as claimed in claim 37 wherein said machine includes means to provide an operator initiated start signal and wherein said response developed is effective to further cause the central processing unit to reset its pattern data reference to the terminus of the reverse position upon an operator provided start signal.

39. A control system as claimed in claim 36 wherein said stitch fault detection program provides the capability of responding to an initial stitch fault signal, responding only after a selected number of consecutive fault signals during routine stitching and to ignore for a number of stitches any stitch fault signal where the number is preselected at program initiation and is adapted for being modified by the operator or by a pattern embedded machine command.

40. An automatic sewing machine, comprising:

(a) at least one sewing needle, thread supply and associated stitch forming apparatus to form successive stitches in a workpiece;

(b) program controllable drive means for driving said sewing head;

(c) a work holder including support structure mounting clamp means for holding a preloaded workpiece for operation thereon by said needle and having on said support structure an electrically operable connector to an associated X-Y motion table positioned by program controllable positioner means associated with said table;

(d) needle and work holder position signaling means productive of control signals indicative of successive positions obtained by the needle and work holder in the course of executing a pattern; and (e) program means having a stored pattern program including a command signal coordinated with the execution of said pattern and adapted to receive and process said signals to control said drive and positioner means according to such pattern program and at the termination of such pattern utilizing said command signal being productive of a work holder release signal to release said connector thereby enabling said support structure to be released from said X-Y motion table for replacement by another said support structure mounting another said preloaded workpiece and similarly connectable to said table.

41. An automatic sewing machine as claimed in claim 40 wherein said work holder mounting structure comprises a work holder frame with said clamp means secured thereto, said connector comprises a spring loaded releasable detent type connector having a movable member connected to a solenoid for releasing said detent connector and said release signal operates to energize said solenoid for releasing said connector.

42. An automatic sewing machine as claimed in claim 41 including manual switch means connected to energize said solenoid to release said connector.

43. An automatic sewing machine, comprising:

(a) a plurality of sewing heads arranged for being synchronously driven, each having a needle, thread supply, takeup means and associated stitch forming apparatus to form successive stitches in a workpiece to form a stitched pattern thereon;

(b) signal controllable drive means for synchronously driving said sewing heads;

(c) a motion table adapted for X-Y positioning and mounting thereon work holders for releasably holding a workpiece at each said sewing head and having associated therewith signal controllable X-Y bi-directional positioner means;

(d) needle positioning, work holder positioning and stitch fault signaling devices productive of control signals indicative of successive positions obtained by the needle and work holder associated with each said sewing head and of stitch faults incurred at any of said sewing heads in the course of executing a pattern;

(e) circuit means having interface logic and memory including means for receiving needle and work holder position signals singularly or plurally, stored program logic adapted for analyzing the relation between the signals themselves and between the signals and other data including pattern data stored in said program logic and means for developing a central processing unit digital control instruction sequence therefrom to define a central processing unit response corresponding to the results of such analysis; and (f) a central processing unit associated with said circuit means and adapted to serialize and execute said control instructions to direct its own operation and to control recognition and to recognize signals received in said circuit means and in coordination therewith to issue signals corresponding to said defined response for control of said needle and work holder positioning during execution of a pattern by said machine at each of said heads.

44. An automatic sewing machine, comprising:

(a) a plurality of sewing heads arranged for being synchronously driven, each having a needle, thread supply, take-up means and associated stitch forming apparatus to form successive stitches in a workpiece;

(b) signal controllable drive means for synchronously driving said sewing heads;

(c) a motion table adapted for X-Y positioning and mounting thereon work holders for releasably holding a workpiece at each said sewing head and having associated therewith signal controllable X-Y positioner means;

(d) needle positioning, workholder positioning and stitch fault signaling devices productive of control signals indicative of successive positions obtained by the needle and work holder associated with each said sewing head and of stitch faults incurred at any of said sewing heads in the course of executing a pattern;

(e) circuit means for terminating and recording selected characteristics of signals from said signaling means and providing a route for selective access to the record of such recorded signals by a central processing unit;

(f) randomly addressable memory means containing logical sequences of instructions for control of a central processing unit and pattern data interpretable by a central processing unit as directions for executing a pattern including as required for such pattern, directions for said drive means, directions for said positioner means, directions for selection of central processing unit control instruction sequences and directions for selecting sequences of pattern data; and (g) a central processing unit operatively associated with said memory means and adapted to serialize and execute said control instructions to direct its own operation and to control recognition and to recognize signals present in said circuit means and in coordination therewith to issue other signals for control of said sewing head drive and work holder positioner means whereby to reproduce by stitching with said needle the pattern represented in said pattern data.

45. An automatic sewing machine as claimed in claim 44 wherein said randomly addressable memory means includes a read/write portion and said read/write portion contains said logical sequences of instructions for control of a central processing unit.

46. An automatic sewing machine as claimed in claim 44 wherein said signal controllable driving means for driving said plurality of sewing heads comprises an electric motor and logic control thereof.

47. An automatic sewing machine as claimed in claim 46 wherein said electric motion comprises a variable speed motor, said pattern data includes directions for controlling the speed thereof and said logic control includes signaling means adapted to change such speed during the course of executing said pattern.

48. An automatic sewing machine as claimed in claim 44 wherein said pattern data at the end of the pattern provides pattern termination data, said motion table includes electrically controlled releasable frame means thereon and mounting said work holders and release means responsive to said termination data to release said frame means from said motion table.

49. An automatic sewing machine as claimed in claim 44 wherein said signal controllable X-Y positioner means comprises a set of DC drive motor bi-directional position actuators and a drive controller therefor providing a closed loop type system.

50. An automatic sewing machine as claimed in claim 49 wherein said signal controllable positioner means includes means for adjusting the acceleration rate of said actuators to be substantially constant and adjustable to the break characteristics of the thread employed and the moves of said pattern.

51. An automatic sewing machine as claimed in claim 49 wherein said positioner means acts to cause said motion table to execute movements during stitching of said pattern along a least time path.

52. The method of sewing a stitched pattern in a workpiece comprising the steps of:

(a) locating the workpiece to be sewn on a sewing machine equipped with a driven needle and positionable work holder and with means to develop control signals indicative of positions obtained by and the instantaneous location of both the needle and work holder and of stitch faults incurred as the pattern progresses;

(b) operating said machine and continuously monitoring and analyzing said control signals with program logic during each stitch as the pattern proceeds and with said program logic having the capability of modifying the pattern being stitched dependent on said analysis and without operator intervention; and (c) utilizing said program logic analysis without operator intervention for selective continuation, termination and modification of stitching said pattern as determined by the nature of each said fault and the analysis thereof by said logic.

53. The method of claim 52 including the steps:
   (a) at the end of said pattern effecting an automatic programmed release of the workpiece from the work holder; and
   (b) during said pattern upon the occasion of receiving a stitch fault signal executing a reverse repeat of said pattern for some predetermined number of stitches and then stopping said machine.

54. The method of claim 53 including the steps of:
   (a) effecting each motion of said work holder under substantially constant acceleration; and
   (b) prior to initiating said pattern establishing a control setting for effecting said constant acceleration.

55. The method of claim 52 including the step of: utilizing a central processing unit to eff3ect such analysis.

56. The method of claim 55 including the step of: utilizing said logic to distinguish between normal and abnormal analysis and continuing said stitching to the completion of said pattern in the circumstance of normal analysis being continued throughout the pattern and selectively altering or terminating the normal stitching of said pattern upon the occurrence of an abnormal analysis.

57. The method of claim 52 wherein said means to develop control signals includes means to develop a continuous needle position signal of one character when the needle is in the workpiece and of another character when out of the workpiece and including a commandable step of interrogating the needle position as required by said program logic and executing moves of the workpiece only when the needle is out of the workpiece.

58. The method of claim 52 including the step of: terminating said control signals is a logic circuit, developing and recording other signals characteristic of the terminated signals and utilizing a central processing unit having access to such recorded signals to effect said analysis.

59. The method of claim 52 including the step of: independently changing the speed of operating said drive needle and the speed of moving said work holder in correspondence with executing selected portions of said pattern and without disruption of said program logic analysis.

60. An automatic sewing apparatus, comprising:
   (a) a selected number, at least one, of sewing heads each with a needle, thread supply, take-up means and associated stitch forming apparatus to form successive stitches in a workpiece as a pattern;
   (b) signal controllable drive means for driving a selected number of said sewing heads synchronously;
   (c) a corresponding number for work holders, one for each sewing head and adapted to hold a respective workpiece for operation thereon by a respective said needle and mounted on an X-Y motion table adapted to support said number of work holders and having controllable bi-directional positioner means associated therewith;
   (d) signaling means productive of signals indicative of successively obtained positions of said positioner means and each said needle;
   (e) circuit means for receiving and transmitting said signals singularly or plurally and developing recorded signals therefrom having characteristics corresponding thereto;
   (f) a stored program logic means adapted to access and analyze said signals, the relation between such signals and other operating conditions; and
   (g) computer means adapted to develop responses to said signals as the pattern proceeds to control said drive and positioner means and the execution of said pattern and during said execution adapted to utilize said program logic analysis without operation intervention for selective continuation, termination, and modification of said pattern as determined by the nature and analysis of said signals by said logic means.

61. An automatic sewing apparatus as claimed in claim 60 wherein:
   (a) said number of sewing heads comprises a plural number divided into plural sets of sewing heads with each set being adapted to operate synchronously;
   (b) said controllable drive means comprises separate drive means for independently driving each said set;
   (c) said work holders comprise plural sets of work holders for each set of sewing heads and with each set of work holders being mounted on an X-Y motion table associated with a respective set of sewing heads and with each said X-Y motion table having independent, controllable positioner means associated therewith;
   (d) said signaling means comprises a set of signal means for each set of sewing heads and with each set of signaling means being productive of signals indicative of successfuly obtained positions of the positioner means and needles associated with a respective set of sewing heads;
   (e) said circuit means includes means for receiving and terminating said signals from all sets of said sewing heads;
   (f) said stored program logic means includes logic means adapted to access and analyze said signals from all of said sewing heads; and
   (g) said computer means is adapted to develop responses to all of said signals from all of said sets of sewing heads as individual patterns proceed on each individual set of sewing heads to control operations of all of said sets of sewing heads and the execution of all of said patterns thereon.

62. An automatic sewing apparatus as claimed in claim 60 wherein:
   (a) said circuit means comprises interface logic circuit means constructed in a manner enabling associated program logic to develop either an immediate response to a said control signal, a delayed response to a said control signal while other machine operations are performed or to ignore any said control signal; and
   (b) said stored program logic means is associated with said interface logic circuit means adapting said stored program logic means to develop either said immediate response, said delayed response, or said ignoring of said signal.

63. An automatic sewing apparatus as claimed in claim 62 wherein:
   (a) said stored program logic stores priority indicators for said control signals; and
   (b) said stored program logic in developing said responses acts to analyze said priorities to determine recognition of any said signal and establish whether recognition should occur.

64. An automatic sewing machine, comprising:
(a) at least one sewing needle, thread supply and associated stitch forming apparatus to form successive stitches in a workpiece;
(b) program controllable drive means for driving said sewing head;
(c) a work holder arrangement including clamp means for holding a workpiece for operation thereon by said needle and having an electrically controllable connector to an associated X-Y motion table positioned by program controllable positioner means associated with said table, said work holder arrangement including a work holder frame with said clamp means secured thereto, said connector comprising a spring loaded releasable detent type connector having a movable member connected to a solenoid for releasing such detent connector and said release signal operating to energize said solenoid for releasing said connector;
(d) needle and work holder position signaling means productive of control signals indicative of successive positions obtained by the needle and work holder in the course of executing a pattern; and
(e) program means having a stored pattern program adapted to receive and process said signals to control said drive and positioner means according to such pattern program and at the termination of such pattern productive of a work holder release signal to release said connector.

65. An automatic sewing machine as claimed in claim 64 including manual switch means connected to energize said solenoid to release said connector.

66. The method of sewing a stitched pattern in a workpiece comprising the steps of:
(a) locating the workpiece to be sewn on a sewing machine equipped with a driven needle and positionable work holder and with means to develop control signals indicative of positions obtained by the needle and work holder and of stitch faults incurred as the pattern progresses;
(b) operating said machine and continuously monitoring and analyzing said control signals with program logic during each stitch as the pattern proceeds;
(c) stitching and terminating stitching of said pattern utilizing said program logic analysis for control and according to said monitoring;
(d) at the end of said pattern effecting an automatic programmed release of the workpiece from the work holder; and
(e) during said pattern upon the occasion of receiving a stitch fault signal executing a reverse repeat of said pattern for some predetermined number of stitches and then stopping said machine.

67. The method of claim 66 including the steps of:
(a) effecting each motion of said work holder under substantially constant acceleration; and
(b) prior to initiating said pattern establishing a control setting for effecting said constant acceleration.

68. The method of claim 66 including the step of: utilizing said logic to distinguish between normal and abnormal analysis and continuing said stitching to the completion of said pattern in the circumstance of normal analysis being continued throughout the pattern and altering the normal stitching of said pattern upon the occurrence of an abnormal analysis.

69. The method of claim 66 wherein said means to develop control signals includes means to develop a continuous needle position signal of one character when the needle is in the workpiece and of another character when out of the workpiece and including a commandable step of interrogating the needle position as required by said program logic and executing moves of the workpiece only when the needle is out of the workpiece.

70. The method of claim 66 including the step of: changing the speed of operating said driven needle and moving said work holder in correspondence with executing selected portions of said pattern and without disruption of said logic analysis.

71. The method of sewing a stitched pattern in a workpiece comprising the steps of:
(a) locating the workpiece to be sewn on a sewing machine equipped with a driven needle and positionable work holder and with means to develop control signals indicative of positions obtained by the needle and work holder and of stitch faults incurred as the pattern progresses;
(b) operating said machine and continuously monitoring and analyzing said control signals with program logic during each stitch as the pattern proceeds;
(c) stitching and terminating stitching of said pattern utilizing said program logic analysis for control and according to said monitoring; and
(d) terminating said control signals in a logic circuit, developing and recording other signals characteristic of the terminated signals and utilizing a central processing unit having access to such recorded signals to effect said analysis.

72. An automatic sewing apparatus, comprising:
(a) a plural number of sewing heads divided into plural sets of sewing heads with each set being adapted to operate synchronously, each with a needle, thread supply, take-up means and associated stitch forming apparatus to form successive stitches in a workpiece as a pattern;
(b) signal controllable drive means providing separate drive means for independently driving each said set and the sewing heads thereof synchronously;
(c) plural sets of work holders for each set of sewing heads, one for each sewing head and adapted to hold a respective workpiece for operation thereon by a respective said needle, each set of work holders being mounted on an X-Y motion table associated with a respective set of sewing heads and with each said X-Y motion table having independent, controllable bi-directional positioner means associated therewith;
(d) signaling means comprising a set of signal means for each set of sewing heads and with each set of signaling means being productive of signals indicative of successfully obtained positions of the positioner means and needles associated with a respective set of sewing heads;
(e) circuit means for receiving and transmitting said signals singularly or plurally and developing recorded signals therefrom having characteristics corresponding thereto, said circuit means including means for receiving and terminating said signals from all sets of said sewing heads;
(f) a stored program logic means adapted to access and analyze said signals, the relation between such signals and other operating conditions, said stored program logic means including logic means adapted to access and analyze said signals from all of said sewing heads; and (g) computer means adapted to develop responses to said signals as the pattern proceeds to control said machine and the execution of said pattern, said computer means being adapted to develop responses to all of said signals from all of said sets of sewing heads as individual patterns proceed on each individual set of sewing heads to control operations of all of said sets of sewing heads and the execution of all of said patterns thereon.

73. An automatic sewing apparatus, comprising:
(a) a selected number, at least one, of sewing heads each with a needle, thread supply, take-up means and associated stitch forming apparatus to form successive stitches in a workpiece as a pattern;
(b) signal controllable drive means for driving a selected number of said sewing heads synchronously;
(c) a corresponding number of work holders, one for each sewing head and adapted to hold a respective workpiece for operation thereon by a respective said needle and mounted on an X-Y motion table adapted to support said number of work holders and having controllable bi-directional positioner means associated therewith;
(d) signaling means productive of signals indicative of successively obtained positions of said positioner means and each said needle;
(e) circuit means for receiving and transmitting said signals singularly or plurally and developing recorded signals therefrom having characteristics corresponding thereto, said circuit means comprising interface logic circuit means constructed in a manner enabling associated program logic to develop either an immediate response to a said control signal, a delayed response to a said control signal while other machine operations are performed or to ignore any said control signal;
(f) a stored program logic means adapted to access and analyze said signals, the relation between such signals and other operating conditions, said stored program logic means being associated with said interface logic circuit means adapting said stored program logic means to develop either said immediate response, said delayed response, or said ignoring of said signal; and
(g) computer means adapted to develop responses to said signals as the pattern proceeds to control said machine and the execution of said pattern.

74. An automatic sewing apparatus, comprising:
(a) a selected number, at least one, of sewing heads each with a needle, thread supply, take-up means and associated stitch forming apparatus to form successive stitches in a workpiece as a pattern;
(b) signal controllable drive means for driving a selected number of said sewing heads synchronously;
(c) a corresponding number of work holders, one for each sewing head and adapted to hold a respective workpiece for operation thereon by a respective said needle and mounted on an X-Y motion table adapted to support said number of work holders and having controllable bi-directional positioner means associated therewith;
(d) signaling means productive of signals indicative of successively obtained positions of said positioner means and each said needle;
(e) circuit means for receiving and transmitting said signals singularly or plurally and developing recorded signals therefrom having characteristics corresponding thereto;
(f) a stored program logic means adapted to access and analyze said signals, the relation between such signals and other operating conditions, said stored program logic being adapted to store priority indicators for said control signals and in developing said responses acts to analyze said priorities to determine recognition of any said signal and establish whether recognition should occur; and
(g) computer means adapted to develop responses to said signals as the pattern proceeds to control said machine and the execution of said pattern.

75. An automatic sewing machine, comprising:
(a) at least one sewing head with at least one sewing needle, thread supply, take-up means and associated stitch forming apparatus to form successive stitches in a workpiece;
(b) signal controllable drive means for driving said sewing head;
(c) a work holder adapted to hold a workpiece for operation thereon by said needle and mounted on a X-Y motion table having controllable positioner means associated therewith, said work holder including an electrically releasable mounting means therefor;
(d) work holder release control means associated with said work holder operable to release said work holder mounting means from said machine;
(e) signaling means productive of signals indicative of successively obtained positions of said positioner means and the needle;
(f) circuit means for terminating and recording selected characteristics of signals from said signaling means and for providing selective access to the record of such signals by a central processing unit;
(g) randomly addressable memory means containing logical sequences of instructions for control of a central processing unit and pattern data interpretable by a central processing unit as directions for executing a pattern including, as required for such pattern, directions for said drive means, directions for said positioner means, directions for selection of central processing unit control instruction sequences, directions for release of said work holder mounting means from the machine and directions for selecting sequences of pattern data; and
(h) a central processing unit operatively associated with said memory means and adapted to serialize and execute said control instructions to direct its own operation and to control recognition and to recognize signals present in said circuit means and in coordination therewith to issue other signals for control of said sewing head drive and work holder positioner means whereby to reproduce by stitching with said needle the pattern represented in said pattern data.

* * * * *

UNITED STATES PATENT AND TRADEMARK OFFICE
CERTIFICATE OF CORRECTION

PATENT NO. : 4,221,176
DATED : September 9, 1980
INVENTOR(S) : Calvin H. Besore and Charles J. Wampler, deceased It is certified that error appears in the above—identified patent and that said Letters Patent is hereby corrected as shown below:

Col. 1, line 49, "threaded" should be --thread--.

Col. 1, line 52, "slot" should be --slow--.

Col. 3, line 9, "handwired" should be --hardwired--.

Col. 5, line 12, "now" should be --not--.

Col. 6, line 14, Insert --with-- after "holder".

Col. 7, line 5, "full" should be --fully--.

Col. 9, line 53, Insert --and-- after "construction".

Col.10, line 32, Insert --general-- after "somewhat".

Col.12, line 49, "OPcon" should be --Opcon--.

Col.13, line 2, "switch" should be --stitch--.

Col.13, line 54, "When" should be --With--.

Col.14, line 11, "Dics" should be --Disc--.

Col.14, line 22, "neelde" should be --needle--.

Col.17, line 42, "to" (first occurrence) should be --at--.

Col.20, line 23, "believe" should be --believed--.

Col.26, line 13, "iteself" should be --itself--.

UNITED STATES PATENT AND TRADEMARK OFFICE
CERTIFICATE OF CORRECTION

PATENT NO. : 4,221,176
DATED : September 9, 1980
INVENTOR(S) : Calvin H. Besore and Charles J. Wampler, deceased It is certified that error appears in the above—identified patent and that said Letters Patent is hereby corrected as shown below:

Col. 28, line 36, "circuit" should be --circuitry--.

Col. 30, line 23, "as" should be --a--.

Col. 30, line 29, "bood" should be --book--.

Col. 30, line 53, "flange" should be --flag--.

Col. 31, line 59, The phrase "in a" should be --is in--.

Col. 32, line 34, "commanded" should be --command--.

Col. 32, line 45, "maxium" should be --maximum--.

Col. 36, line 65, "on" should be --one--.

Col. 37, line 32, "previous" should be --previously--.

Col. 38, line 1 , "and" (first occurrence) should be --are--.

Col. 40, line 48, "as" should be --at--.

Col. 41, line 35, "liki" should be --like--.

Col. 41, line 46, "unitl" should be --until--.

Col. 41, line 54, "sensores" should be --sensors--.

Col. 42, line 13, "relates" should be --related--.

Col. 42, line 17, "direction" should be --directions--.

UNITED STATES PATENT AND TRADEMARK OFFICE
CERTIFICATE OF CORRECTION

PATENT NO. : 4,221,176
DATED : September 9, 1980
INVENTOR(S) : Calvin H. Besore and Charles J. Wampler, deceased It is certified that error appears in the above—identified patent and that said Letters Patent is hereby corrected as shown below:

Col. 42, line 67, "As"(second occurrence) should be --An--.

Col. 43, line 29, "5000" should be --500--.

Col. 43, line 40, "or" should be --of--.

Col. 43, line 67, "as" should be --an--.

Col. 47, line 7 , "an" should be --a--.

Col. 48, line 65, "therefore" should be --therefor--.

Col. 47, line 55, Insert --signals-- before "indicative".

Col. 51, line 57, "of" should be --to--.

Col. 51, line 59, "the" should be --an--.

Col. 52, line 8 , "system" should be --systems--.

Col. 52, line 11, "particulr" should be --particular--.

Col. 52, line 47, "switch" should be --stitch--.

Col. 54, line 34, "operable" should be --controllable--.

Col. 56, line 24, "motion" should be --motor--.

Col. 57, line 18, "eff3ect" should be --effect--.

Col. 57, line 38, "is" should be --in--.

UNITED STATES PATENT AND TRADEMARK OFFICE
CERTIFICATE OF CORRECTION

PATENT NO. : 4,221,176
DATED : September 9, 1980
INVENTOR(S) : Calvin H. Besore and Charles J. Wampler, deceased It is certified that error appears in the above—identified patent and that said Letters Patent is hereby corrected as shown below:

Col. 57, line 57, "for" (first occurrence) should be --of--.

Col. 58, line 34, "successfuly" should be --successfully--.

Signed and Sealed this

Twenty-eighth Day of July 1981

[SEAL]

Attest:

Attesting Officer

GERALD J. MOSSINGHOFF

Commissioner of Patents and Trademarks